US009066333B2

(12) United States Patent
Mourad et al.

(10) Patent No.: US 9,066,333 B2
(45) Date of Patent: Jun. 23, 2015

(54) METHOD AND APPARATUS FOR TRANSMISSION AND RECEPTION OF DATA STREAMS IN DIGITAL VIDEO BROADCASTING SYSTEMS

(71) Applicant: Samsung Electronics Co. Ltd., Suwon-si, Gyeonggi-do (KR)

(72) Inventors: Alain Mourad, Staines (GB); Sung-Ryul Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 13/857,830

(22) Filed: Apr. 5, 2013

(65) Prior Publication Data

US 2013/0265957 A1 Oct. 10, 2013

(30) Foreign Application Priority Data

May 10, 2012 (GB) .................................. 1208389.5
Aug. 24, 2012 (GB) .................................. 1215128.8

(51) Int. Cl.

| | |
|---|---|
| ***H04W 72/04*** | (2009.01) |
| ***H04L 5/00*** | (2006.01) |
| ***H04L 29/06*** | (2006.01) |
| ***H04N 5/38*** | (2006.01) |
| ***H04N 21/2362*** | (2011.01) |
| ***H04N 21/61*** | (2011.01) |

(52) U.S. Cl.

CPC ............. *H04W 72/04* (2013.01); *H04L 5/0053* (2013.01); *H04L 65/60* (2013.01); *H04L 5/0064* (2013.01); *H04N 5/38* (2013.01); *H04N 21/2362* (2013.01); *H04N 21/6131* (2013.01)

(58) Field of Classification Search

USPC .................................. 370/329, 246, 537, 389
See application file for complete search history.

(56) References Cited

U.S. PATENT DOCUMENTS

| | | | | |
|---|---|---|---|---|
| 6,741,618 | B1 * | 5/2004 | Chang et al. | 370/537 |
| 6,879,563 | B1 * | 4/2005 | Tomita et al. | 370/246 |
| 2002/0141407 | A1 * | 10/2002 | Takamichi | 370/389 |
| 2004/0013102 | A1 | 1/2004 | Fong et al. | |
| 2004/0072572 | A1 | 4/2004 | Nakamura et al. | |
| 2008/0170545 | A1 * | 7/2008 | Kim et al. | 370/329 |
| 2009/0088173 | A1 | 4/2009 | Motegi et al. | |
| 2009/0109905 | A1 | 4/2009 | Ahmadi | |
| 2010/0014479 | A1 | 1/2010 | Kim | |
| 2010/0085985 | A1 | 4/2010 | Pekonen et al. | |

OTHER PUBLICATIONS

DVB Organization:"TM-NGH976 Samsung Sony LI 0verhead. pdr",DVB, Digital Video Broadcasting, C/0 EBU—17A Ancienne Route—CH-1218 Grand Saconnex, Geneva—Switzerland, Jul. 13, 2011.

DVB Organization:TM-NGH795 continuous N periodic LI sul. pdf\DVB, Digital Video Broadcasting, C/0 EBU—17A Ancienne Route—CH-1218 Grand Saconnex, Geneva—Switzerland, Apr. 10, 2011.

* cited by examiner

*Primary Examiner* — Albert T Chou

(74) *Attorney, Agent, or Firm* — Jefferson IP Law, LLP

(57) ABSTRACT

A method for mapping of one or more logical channels onto a radio frequency channel in a communication system is provided. The method includes determining a logical channel type from a plurality of logical channel types, and mapping at least one logical frame of the determined logical channel type to at least one physical frame on at least one Radio Frequency (RF) channel based on the determined logical channel type.

20 Claims, 38 Drawing Sheets

| Field | | Size (bits) |
|---|---|---|
| subslices_x_frame | | 15 |
| Num_PLP_config | | 8 |
| Num_Aux | | 4 |
| Aux_Config_RFU | | 8 |
| for i=0..NUM_RF-1{ | | |
| | RF_IDX | 3 |
| | FREQUENCY | 32 |
| } | | |
| if S2=="xxx1"{ | | |
| | FEF_TYPE | 4 |
| | FEF_LENGTH | 22 |
| | FEF_INTERVAL | 8 |
| } | | |
| for i=0.. Num_PLP_config-1{ | | |
| | PLP_ID | 8 |
| | PLP_TYPE | 3 |
| | PLP_PAYLOAD_TYPE | 5 |
| | FF_FLAG | 1 |
| | FIRST_RF_IDX | 3 |
| | FIRST_FRAME_IDX | 8 |
| | PLP_GROUP_ID | 8 |
| | PLP_COD | 3 |
| | PLP_MOD | 3 |
| | PLP_ROTATION | 1 |
| | PLP_FEC_TYPE | 2 |
| | PLP_NUM_BLOCKS_MAX | 10 |
| | FRAME_INTERVAL | 8 |
| | TIME_IL_LENGTH | 8 |
| | TIME_IL_TYPE | 1 |
| | INBAND_FLAG | 1 |
| | RESERVED_1 | 16 |
| | L1Config_Repetition_Length | 4 |
| } | | |
| Reserved | | 32 |
| for i=0..NUM_AUX-1{ | | |
| | AUX_RFU | 32 |
| } | | |

| | Field | | bits | |
|---|---|---|---|---|
| | subslices_x_frame | | 15 | |
| | Num_PLP_Config | | 8 | 302a |
| | NUM_PLPMODES | | 6 | |
| | Num_Aux | | 4 | |
| | Aux_Config_RFU | | 8 | |
| | for i=0..NUM_RF-1{ | | | |
| | | RF_IDX | 3 | |
| | | FREQUENCY | 32 | |
| | } | | | |
| | if S2=="xxx1"{ | | | |
| | | FEF_TYPE | 4 | |
| | | FEF_LENGTH | 22 | |
| | | FEF_INTERVAL | 8 | |
| 302 | } | | | |
| | for i=0..NUM_PLPMODES-1{ | | | |
| | | PLP_TYPE | 3 | |
| | | PLP_PAYLOAD_TYPE | 5 | |
| | | PLP_COD | 3 | |
| | | PLP_MOD | 3 | |
| | | PLP_ROTATION | 1 | |
| | | PLP_FEC_TYPE | 2 | |
| | | PLP_NUM_BLOCKS_MAX | 10 | |
| | | FRAME_INTERVAL | 8 | |
| | | TIME_IL_LENGTH | 8 | |
| | | TIME_IL_TYPE | 1 | |
| | | INBAND_FLAG | 1 | |
| | | | | |
| | for i=0..NUM_PLP_Confgi-1{ | | | |
| | | PLPMODE_ID | 6 | |
| | | PLP_ID | 8 | 306 |
| | | FF_FLAG | 1 | |
| 304 | | FIRST_RF_IDX | 3 | |
| | | FIRST_FRAME_IDX | 8 | |
| | | PLP_GROUP_ID | 8 | |
| | | RESERVED_1 | | |
| | | L1Config_Repetition_Length | | 308 |
| | } | | | |
| | Reserved | | 32 | |
| | for i=0..NUM_AUX-1{ | | | |
| | | AUX_RFU | 32 | |
| | } | | | |

FIG.12

| Field | Bits | |
|---|---|---|
| **OPTIONS_FLAG** | 8 | ~1300 |
| NUM_PLP_MODES | 8 | |
| NUM_PLP_PER_SUPERFRAME | 8 | |
| **NUM_PLP_PER_FRAME** | 8 | |
| LNC_NUM_RF | 3 | |
| LNC_NUM_LF | 8 | |
| LNC_LF_SIZE | 22 | |
| IF OPTIONS_FLAG="xx1xxxxx"{ | | ~1302 |
| **PARTITION_CYCLE_LENGTH** | 4 | ~1304 |
| **PARTITION_NUM_ADD_PLP** | 4 | ~1306 |
| } | | |
| IF  OPTIONS_FLAG="xxxxxxx1"{ | | |
| SUB_SLICES | 15 | |
| } | | |
| for i=0..LNC_NUM_RF  -1{ | | |
| LNC_RF_IDX | 3 | |
| FREQUENCY | 32 | |
| } | | |
| | | |
| for i=0..NUM_PLP_PER_FRAME{ | | |
| PLP_ID | 8 | |
| PLP_MODE_ID | 6 | |
| PLP_ANCHOR_FLAG | 1 | |
| PLP_IN_BAND_A_FLAG | 1 | |
| PLP_GROUP_ID | 8 | |
| FIRST_LF_IDX | 8 | |
| IF PLP_TYPE="011" { | | |
| REUSE_FACTOR | 4 | |
| REUSE_ID | 4 | |
| } | | |
| IF PLP_TYPE="100" { | | |
| ALPHA | 3 | |
| REUSE_FACTOR | 3 | |
| REUSE_SNUM | 3 | |
| } | | |
| IF OPTIONS_FLAG="xxxxx1xx"{ | | |
| RESERVED_1 | 8 | |
| } | | |
| IF OPTIONS_FLAG="xx1xxxxx"{ | | |
| **PLP_PARTITION_CLUSTER_ID** | 2 | ~1308 |
| } | | |
| } | | |
| IF OPTIONS_FLAG="xx1xxxxx"{ | | |
| for i=0..PARTITION_NUM_ADD_PLP{ | | |
| RESERVED_2 | 32 | ~1310 |

FIG. 13a 304 (rows 1–6); 1312 (RESERVED_3); 1314 (PLP_PARTITION_CLUSTER_ID)

| | |
|---|---|
| **IF OPTIONS_FLAG="xxxxx1xx"{** | |
| **RESERVED_3** | **8** |
| } | |
| **PLP_PARTITION_CLUSTER_ID** | **2** |
| } | |
| } | |
| | |
| for i=0..NUM_PLP_MODE -1{ | |
| PLP_MODE_ID | 6 |
| PLP_TYPE | 6 |
| PLP_PAYLOAD_TYPE | 8 |
| PLP_COD | 3 |
| PLP_MOD | 3 |
| PLP_ROTATION | 1 |
| PLP_FEC_TYPE | 2 |
| PLP_NUM_BLOCKS_MAX | 10 |
| FRAME_INTERVAL | 8 |
| TIME_IL_LENGTH | 8 |
| TIME_IL_TYPE | 1 |
| IF OPTIONS_FLAG="xxxx1xxx"{ | |
| RESERVED_4 | 8 |
| } | |
| } | |
| | |
| IF OPTIONS_FLAG="xxxxxx1x"{ | |
| NUM_AUX | 4 |
| AUX_CONFIG_RFU | 8 |
| for i=0..NUM_AUX -1{ | |
| AUX_RFU | 32 |
| } | |
| } | |
| | |
| IF OPTIONS_FLAG="xxx1xxxx"{ | |
| RESERVED_5 | 8 |
| } | |

FIG.13B

| | | |
|---|---|---|
| TYPE | 8 | |
| BWT_EXT | 1 | |
| S1 | 3 | |
| S2 | 4 | |
| aP1 | 7 | |
| FEF_PREAMBLES | 12 | |
| FEF_LENGTH | 22 | |
| FEF_INTERVAL | 8 | |
| GUARD_INTERVAL | 3 | |
| PILOT_PATTERN | 4 | |
| OLSI_PILOT_PATTERN | 3 | |
| OLSI_START_SYMBOL | 12 | |
| OLSI_NUM_SYMBOLS | 9 | |
| PAPR | 4 | |
| POWER_IMBALANCE | 3 | |
| PH_FLAG | 1 | |
| L1_POST_MOD | 4 | |
| L1_POST_COD | 2 | |
| L1_POST_FEC_TYPE | 2 | |
| L1_REPETITION_FLAG | 1 | |
| L1_POST_EXTENSION | 1 | |
| L1_POST_SIZE | 18 | |
| L1_POST_CONF_SIZE | 12 | |
| L1_POST_DYN_CURRENT_SIZE | 12 | |
| L1_POST_DYN_NEXT_SIZE | 12 | |
| L1_POST_EXT_SIZE | 8 | |
| L1_POST_AP_RATIO_CURRENT | 2 | |
| L1_POST_AP_SIZE_NEXT | 18 | |
| L1_POST_MIMO | 4 | |
| L1_POST_NUM_BITS_PER_CHANNEL_USE | 3 | |
| L1_POST_DELTA | 24 | |

| | |
|---|---|
| TX_ID_AVAILABILITY | 8 |
| CELL_ID | 16 |
| NETWORK_ID | 16 |
| SYSTEM_ID | 16 |
| NUM_FRAMES | 8 |
| NUM_SYMBOLS | 12 |
| FRAME_INTERVAL | 24 |
| FRAME_IDX | 8 |
| REGEN_FLAG | 3 |
| LC_GROUP_ID | 2 |
| LC_NUM | 3 |
| LC_ID | 3 |
| LC_TYPE | 3 |
| LC_NUM_RF | 3 |
| LC_CURRENT_FRAME_RF_IDX | 3 |
| LC_CURRENT_FRAME_RF_POS | 3 |
| LC_NEXT_FRAME_RF_IDX | 3 |
| LC_NEXT_FRAME_DELTA | 24 |
| NGH_VERSION | 4 |
| RESERVED | 3 |
| CRC_32 | 32 |

| Value | LC Type | Description | |
|---|---|---|---|
| 000 | LC Type A | A logical channel type A corresponds to the case when each logical frame of the logical channel is mapped to only one NGH frame on a single RF channel. | 2802 |
| 001 | LC Type B | A logical channel type B corresponds to the case when each logical frame of the logical channel is mapped to multiple (N) NGH frames on a single RF channel. The NGH frames shall be of equal length. Each logical frame may therefore map in parts onto multiple NGH frames on the same RF channel. | 2804 |
| 010 | LC Type C | A logical channel type C corresponds to the case when each logical frame of the logical channel is mapped to multiple (N) NGH frames on multiple (M) RF channels. The NGH frames from different RF channels may be of different lengths. Each logical frame may therefore map in parts onto multiple NGH frames on multiple (M) RF channels. | 2806 |
| 011 | LC Type D | A logical channel type D corresponds to the case when each logical frame of the logical channel is mapped one-to-one to multiple (N) equal-length and time-synchronised NGH frames on multiple (N) RF frequencies. Each NGH frame contains cells from only one logical frame and each logical frame is available on all simultaneous NGH frames | 2808 |
| 100 to 111 | Reserved for future use | Reserved for future use | 2810 |

FIG.28

METHOD AND APPARATUS FOR TRANSMISSION AND RECEPTION OF DATA STREAMS IN DIGITAL VIDEO BROADCASTING SYSTEMS

PRIORITY

This patent application claims the benefit under 35 U.S.C. §119(a) of a United Kingdom patent application filed on Aug. 24, 2012 in the United Kingdom Intellectual Property Office and assigned Serial No. GB 1215128.8, and a United Kingdom patent application filed on May 10, 2012 and assigned Serial No. GB 1208389.5, the entire disclosure of each of which is hereby incorporated by reference.

BACKGROUND OF THE INVENTION

1. Field of the Invention

The present invention relates to wireless communication systems. More specifically, but not exclusively, the present invention relates to signal processors, communication units, a communication system and methods relating to transmission and reception of data streams in digital video broadcasting systems.

2. Description of the Related Art

A wireless broadcast system, such as a Digital Video Broadcasting (DVB) system, may transmit data in the form of a sequence of frames. A digital video broadcasting system may, for example, operate according to a DVB-T2 (Terrestrial 2nd Generation) standard, a Digital Video Broadcasting Next Generation Handheld (DVB-NGH) standard, or for example, to the following families of standards: Advanced Televisions Systems Committee (ATSC), Integrated Services Digital Broadcasting (ISDB), or Digital multimedia Broadcasting (DMB). Each frame typically comprises a preamble section and a data section, the preamble section and the data section being time-multiplexed. The data section may carry data that is arranged in the form of a number of data streams that may be referred to as Physical Layer Pipes (PLP). A physical layer pipe may carry, for example, a service such as a video channel provided to a user. Reception of data from the frames, and reception of the data streams, may be assisted by signaling, which may typically be carried in the preamble of the frame, in which case the signaling may be referred to as Out-of-Band (OB) signaling and/or the signaling may be carried in the data section, typically of the preceding frame, in which case the signaling may be referred to as In-Band (TB) signaling. The signaling may be referred to as physical layer signaling, or Layer 1 (L1) signaling.

The preamble section of a frame may include various parts, including an L1-Config (configuration) part and an L1-Dyn (dynamic) part. The L1-config part typically carries information which is valid for each frame of the super-frame, and is typically the same for each frame of the super-frame. The L1-Dyn part carries information which may vary from one frame to the next.

With increasing use of signal compression techniques, and provision of lower data rate services that may be more robust in particular in mobile environments, the number of PLPs carried by a sequence of frames is potentially large, for example in DVB-T2 up to 255 PLPs may be supported. As at least some of the information transmitted varies between the different PLPs, the signaling information transmitted in the preamble portion may represent a large overhead per frame in terms of data capacity. In particular, the L1-Config part typically takes up a high proportion (for example, more than 60%) of the signaling information of the preamble section; the overhead resulting from the L1-Config is therefore particularly high.

Digital video broadcasting systems supporting provision of multimedia content, such as DVB-T2 (Digital Video Broadcasting-Terrestrial version 2), have in general the following resources: a number (N) of Radio Frequencies (RF) (where N≥1), each with a given Bandwidth (B); and where the signal on each RF frequency occupies a given time Duration (D).

FIG. 1 illustrates a generic frame structure for provision of transport streams of data according to the related art.

Specifically, FIG. 1 illustrates a generic frame structure 100 for provision of transport streams of data. The data services 102, 104 are generally arranged in transport streams, e.g. stream of data packets 106, for delivery over a target digital video broadcasting system. One goal in designing a multimedia data structure such as in DVB-NGH is to organize efficiently and flexibly the delivery of the transport streams within the physical resources of the digital video broadcasting system.

Each transmitted frame (and therefore the subsequently received frame) 118 typically comprises a preamble section 112 and a data section 114; the preamble section 112 and the data section 114 being time-multiplexed. The transmitted received frames 118 are sent on two radio frequencies, RF1 108, RF2 110 in this simple illustration. The data section 114 may carry data that is arranged in the form of a number of data streams that may be referred to as Physical Layer Pipes (PLP). A physical layer pipe may carry, for example, a service such as a video channel provided to a user. Reception of data decoded from the received frames may be assisted by use of signaling fields/data/bits, etc., which may typically be carried in the preamble section 112 of the frame. The signaling is often referred to as physical layer signaling, or L1 signaling. The signaling may indicate a modulation or coding scheme to be used for decoding data, and it may for example indicate sections of a data field to be decoded, or the location of a data stream within the data section.

Digital Video Broadcasting frame structures may provide physical slots within the DVB physical frame structure, which are reserved in a standard for future use, for example referred to as Future Extension Frame (s) slots 116, which are time multiplexed with a given DVB-T2 signal. For example, Future Extension Frame slots 116 may be provided for transmission of signals intended for reception by mobile Digital Video Broadcasting receivers in addition to transmission of signals intended for reception by conventional fixed Digital Video Broadcasting receivers.

Digital video broadcasting systems may provide for the transmission of signals specifically intended for reception by hand held devices, as such as NGH receivers. Such signals may be, for example, of lower bandwidth and have more robust modulation and coding than signals intended for reception by fixed receivers.

There have been recent proposals to use the additional physical slots in DVB-T2, such as the FEF slots, for the transmission of DVB-NGH signals intended for reception by handheld receivers. Typically, a frame for the transmission of a signal intended for reception by a handheld receiver would be transmitted within the additional physical slot of a sequence of frames for the transmission of a signal intended for fixed receivers, including signaling information for the frame, which would be typically transmitted as a preamble in each FEF slot 116.

However, such a scheme will suffer from a limited capacity, due to the short physical slot duration and relatively high signaling overhead. Furthermore, such a scheme will be limited in terms of achievable statistical multiplexing gain, due to the limited capacity that may be achieved as a consequence of the relatively few physical layer pipes being available for use.

Thus, a need exists for signal processors, communication units, a wireless system and methods relating to transmission and reception of data streams in digital video broadcasting systems that may address one or more deficiencies in the known art.

The above information is presented as background information only to assist with an understanding of the present disclosure. No determination has been made, and no assertion is made, as to whether any of the above might be applicable as prior art with regard to the present invention.

SUMMARY OF THE INVENTION

An aspect of the present invention is to address at least the above-mentioned problems and/or disadvantages and to provide at least the advantages described below. Accordingly, an aspect of the present invention is to provide techniques for the transmission and reception of data streams in digital video broadcasting systems.

In accordance with an aspect of the present invention, a method for mapping of one or more logical channels onto a radio frequency channel in a communication system. The method includes determining a logical channel type from a plurality of logical channel types, and mapping at least one logical frame of the determined logical channel type to at least one physical frame on at least one Radio Frequency (RF) channel based on the determined logical channel type.

In accordance with another aspect of the present invention, a wireless communication unit comprising a transmitter and a signal processor. The signal processor is arranged to determine a logical channel type from a plurality of logical channel types, and map at least one logical frame of the determined logical channel type to at least one physical frame on at least one RF channel based on the determined logical channel type.

In accordance with yet another aspect of the present invention, integrated circuit comprising a signal processor and a signal processor. The signal processor is arranged to determine a logical channel type from a plurality of logical channel types, and map at least one logical frame of the determined logical channel type to at least one physical frame on at least one RF channel based on the determined logical channel type.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 3B is a table showing an example of data carried in an L1-Config signaling portion of a frame according to an exemplary embodiment of the present invention;

FIG. 12 is a table showing a second example of data carried in an L1-Config signaling portion of a frame according to an exemplary embodiment of the present invention;

FIGS. 13A and 13B show a table indicating an example of data carried in an L1-Config signaling portion of a frame according to an exemplary embodiment of the present invention;

FIGS. 27A and 27B illustrate one example table of a L1-Pre signaling field in a logical channel structure according to some exemplary embodiments of the present invention;

FIG. 28 illustrates one example table of a L1-Pre signaling format for a logical channel type according to some exemplary embodiments of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By way of example, exemplary embodiments of the invention will now be described in the context of a Digital Video Broadcasting Next Generation Handheld (DVB-NGH) standard based on the 2nd generation terrestrial DVB-T2 system. However, it will be understood that this is by way of example only and that other exemplary embodiments may involve other wireless broadcast systems; exemplary embodiments are not limited to the use for transmission of digital video signals.

In some exemplary embodiments of the invention, data is transmitted using Orthogonal Frequency-Division Multiplexing (OFDM). The following examples refer to the transmission of data in Physical Layer Pipes (PLPs); however, it will be understood that the invention is not limited to such arrangements, and other types of data streams may be used.

Figure 1:
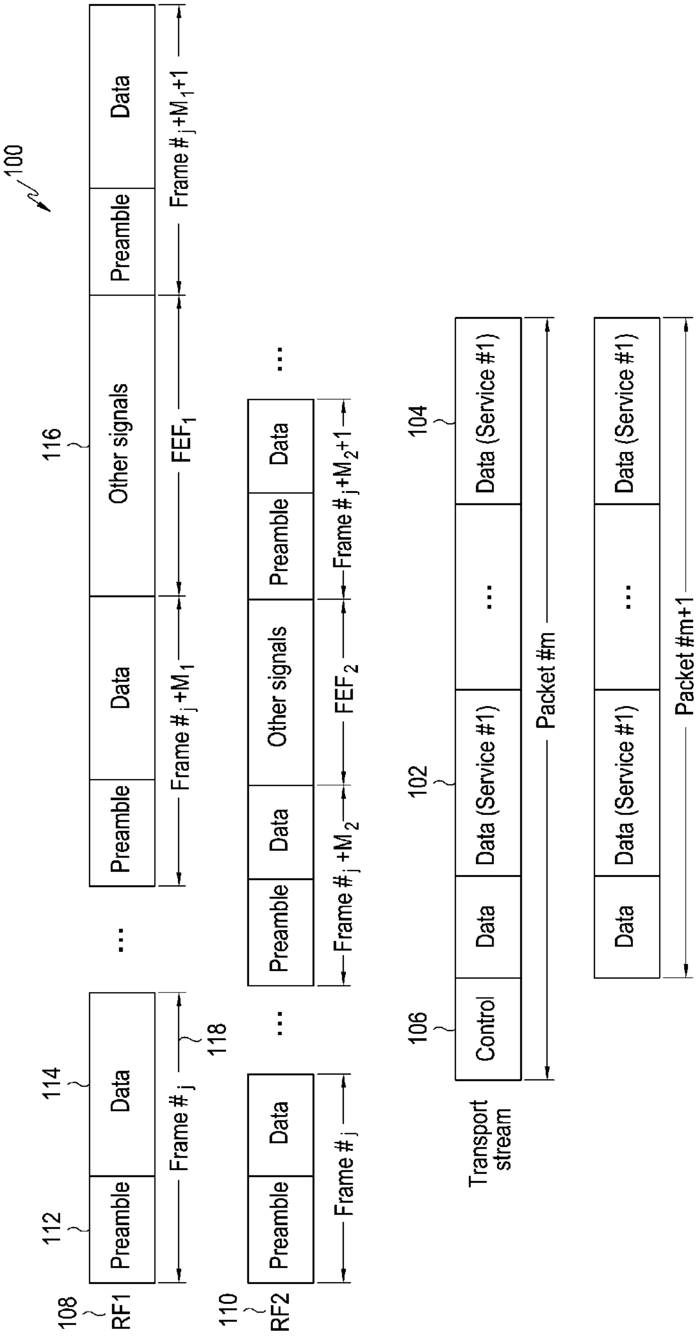
FIG. 1 illustrates a generic frame structure for provision of transport streams of data according to the related art.
Figure 2:
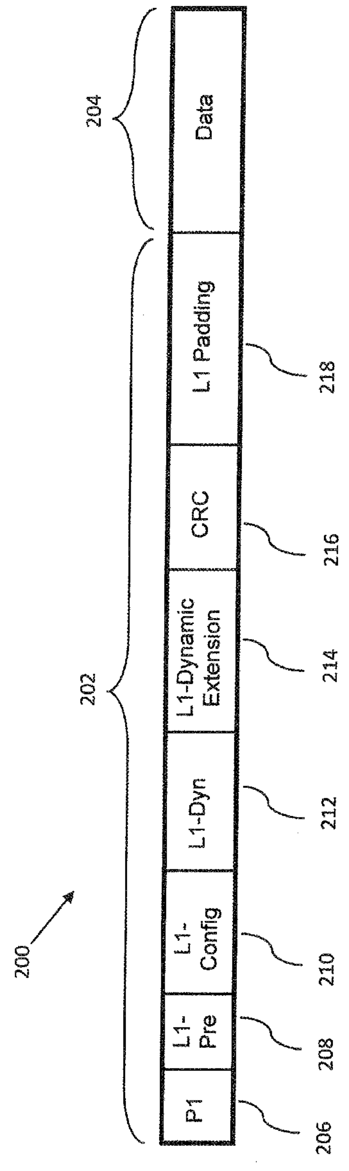
FIG. 2 is a schematic diagram showing a data frame for use according to an exemplary embodiment of the present invention.

FIG. 2 shows an exemplary frame 200 for use in transmitting data according to exemplary embodiments of the present invention. The frame 200 comprises a preamble section 202 and a data section 204, the preamble section 202 comprising signaling portions "P1" 206, "L1-pre" 208, "L1-Config" 210, "L1-Dyn" 214, "L1-Dynamic Extension" 214 and "CRC" (Cyclic Redundancy Check) 216 and "L1 Padding" 218. The data section carries payload data such as data transmitted in PLPs; although not shown in FIG. 1, the data section 204 also typically includes multiple portions for transmitting different types of payload data.

Typically, the P1 signaling portion 206 contains data identifying the preamble. The L1-Pre signaling portion 208 typically contains signaling information relating at least to the modulation and coding scheme needed to receive the remainder of the preamble.

As described above, the L1-Config signaling portion 210 carries information that is valid for each frame 200 of a given superframe, and is typically the same for each frame of the superframe; the information carried by the L1-Config signaling portion 210 includes configuration data such as data items indicating a number of PLPs carried within the superframe, or the modulation type used by an associated PLP. Further examples of the configuration data items carried in the L1-Config part 210 are described below. The term "configuration data item" as used herein may refer, for example, to all configuration data included in the signaling part of a given frame relating to a given PLP, or it may refer to a part of such data, for example.

As described above, the L1-Dyn signaling portion 212 carries information that varies from frame to frame, and relates to decoding the PLPs within the frame 200. It may include an index of the frame 200 within the superframe and or a start address of a PLP, for example.

The L1-Dynamic Extension signaling portion 214 allows for the inclusion of further signaling information not included in the other portions. The CRC part 216 includes CRC-codes for the detection of transmission errors at the receiver. The L1 Padding part 218 is a variable-length field and is inserted following the CRC field to ensure that multiple LDPC blocks of the L1-post signaling (i.e. the parts subsequent to the Pre signaling portion 208) have the same information size when the L1-post signaling is segmented into multiple blocks and these blocks are separately encoded.

Different signaling portions of the preamble 202 may be encoded for transmission together, or separately. For example, the L1-Config signaling portion 210 may be coded together with, or separate from, the L1-Dyn portion 212.

As mentioned above, the data section 204 carries data arranged in PLPs. However, it will be understood that each PLP is not necessarily mapped to every frame 200.

In exemplary embodiments of the present invention, different repetition lengths are set for different types of configuration data item so that different types of configuration item are repeated according to different lengths within a frame structure comprising multiple frames.

Figure 3A:
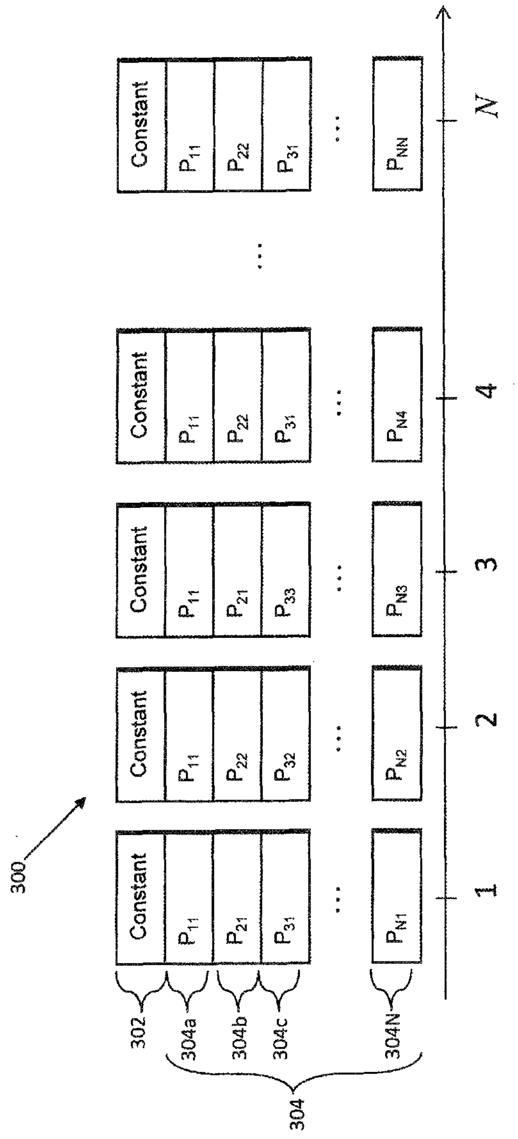
FIG. 3A is a schematic diagram showing a frame structure according to an exemplary embodiment of the present invention.

FIG. 3A shows an exemplary frame structure 300 comprising n frames in which different configuration data items Pnm are transmitted in each frame of the frame structure 300 according to an exemplary embodiment of the present invention. FIG. 3 shows data included in the L1-Config signaling portion 210 of each frame; the other parts of the frames are omitted for conciseness.

The data included in the L1-Config signaling portion 210 comprises constant data 302 and configuration data 304. The constant data 302 comprises configuration information which is independent of any particular PLP; typically, the constant data 202 comprises signaling information items, such as Time Frequency Slicing (TFS) items, Future Extension Frame (FEF) signaling information items and/or auxiliary streams information items, which are required to be transmitted in each frame.

The configuration data 304 includes configuration data items which each relate to one or more PLPs, and are for use in receiving the one or more PLPs to which they relate. The configuration data items are separated into different types 304*a* . . . 304N, with different repetition lengths being set for each of the different types of configuration data item. In the notation used herein, Pnm indicates configuration data items having a repetition length n such that they are repeated every n frames, and which are first transmitted in frame m. Although not shown in FIG. 3A, the frames may also include additional data, such as dummy data relating to dummy PLPs. Such data may also be assigned a repetition length, as is described in detail below.

Thus, in the example of FIG. 3A, configuration data items $P_{11}$ are repeated in every frame, configuration data items $P_{21}$ are repeated in frames 1, 3, 5 . . . , configuration data items $P_{22}$ are repeated in frames 2, 4, 6 . . . , and so on. In the example shown, the lowest repetition length set is that for the configuration data items $P_{Nm}$ which are repeated every n frames. The repetition length n thus defines a number of frames (n−1) which sequentially follow in the frame structure before a type of configuration data item having a repetition length n is repeated.

Accordingly, each configuration data item is included at least once in the frame structure 300. However, since not all of configuration data items are repeated during each frame of the frame structure 300, less data is required to be transmitted during each frame, resulting in a saving in terms of signaling overhead compared to prior art methods in which all configuration data items are transmitted in every frame.

Further, since different repetition lengths are set for different types of configuration data item, the delay in decoding which occurs at the receiver at, for example, initialization or in the event of changing channels ("zapping" delay), can be controlled according to, for example, the service requirements of the PLP to which a given configuration data item relates (the average delay in receiving a configuration data item which is repeated every n frames being n/2 times the length of each frame). Thus, configuration data items relating to PLPs for which a long delay is undesirable may be allocated a lower repetition length than configuration data items relating to PLPs for which a delay may be tolerable.

In some cases it may be desirable to set different repetition lengths for different PLPs carrying data relating to different parts of the same service, so that, for example, a basic version of the service can be provided with minimal expected delay, with an enhanced version of the service becoming subsequently available. The basis version of the service may use a Single-Input and Single-Output (SISO) configuration, with the enhanced version using a Multiple-Input and Multiple-Output (MIMO) configuration of the same service, for example. In the case of transmission using a Scalable Video Coding (SVC) scheme, configuration data items for receiving the base layer of the scheme may be transmitted at a higher repetition length than the configuration data items for receiving the enhanced layer of the scheme, so that the receiver may initially decode the base stream, and display the transmission to the user, immediately that the configuration data items for the base layer have been received, without having to wait for those relating to the enhanced layer.

Although the frame structure 300 shown in FIG. 3A includes only N frames (a number equal to the longest repetition length for the transmission), it will be appreciated that there is no limit to the length of a frame structure according to which data is transmitted in accordance with exemplary embodiments of the present invention. For example, in some exemplary embodiments, the length of the frame structure may be equal to the lowest common multiplier of all frame repetition lengths. The frames of the frame structure may be arranged into superframes. The maximum repetition length, or maximum cycle length, set for the transmission may be selected such that the length of a superframe is equal to, or a multiple of, N.

FIG. 3B is a table showing an example of the constant data 302 and configuration data 304, along with exemplary corresponding data sizes, included in the L1-Config signaling portion 210 of a frame according to an exemplary embodiment of the present invention. In particular, the constant data 302 includes the data item "Num_PLP_config" 302*a* which indicates the number of PLPs for which configuration data 304 is included in each frame. The configuration data 304 includes various configuration data items. It should be understood that the term "configuration data items" may relate to either data included in a single field within the configuration data, or to data included in a set of related fields. In this exemplary embodiment, an identifier of the PLP is identified in the configuration data item "PLP_ID" 306. In a new field in accordance with an exemplary embodiment, the configuration data item "L1Config_Repetition_Length" 308 indicates the repetition length of the configuration data items relating to the PLP identified. Although shown as a new field here, in some exemplary embodiments the "L1Config_Repetition_Length" 308 is included in an extension field such the "Reserved_1" field.

In some exemplary embodiments of the present invention, the configuration data items are ordered for transmission on the basis of their repetition length, so that configuration data items having a lower repetition length are transmitted before those having a higher repetition length. Configuration data items having the same repetition length may further be ordered so that they are transmitted in order of the PLP_ID 306 of the PLP to which they relate; for example the configuration data items may be arranged in ascending order. By ordering the configuration data items in a predictable way, the receiver may anticipate the PLPs to which configuration data items transmitted in subsequent frames relate, as is described in more detail below.

First Exemplary Transmission Method

Figure 4:
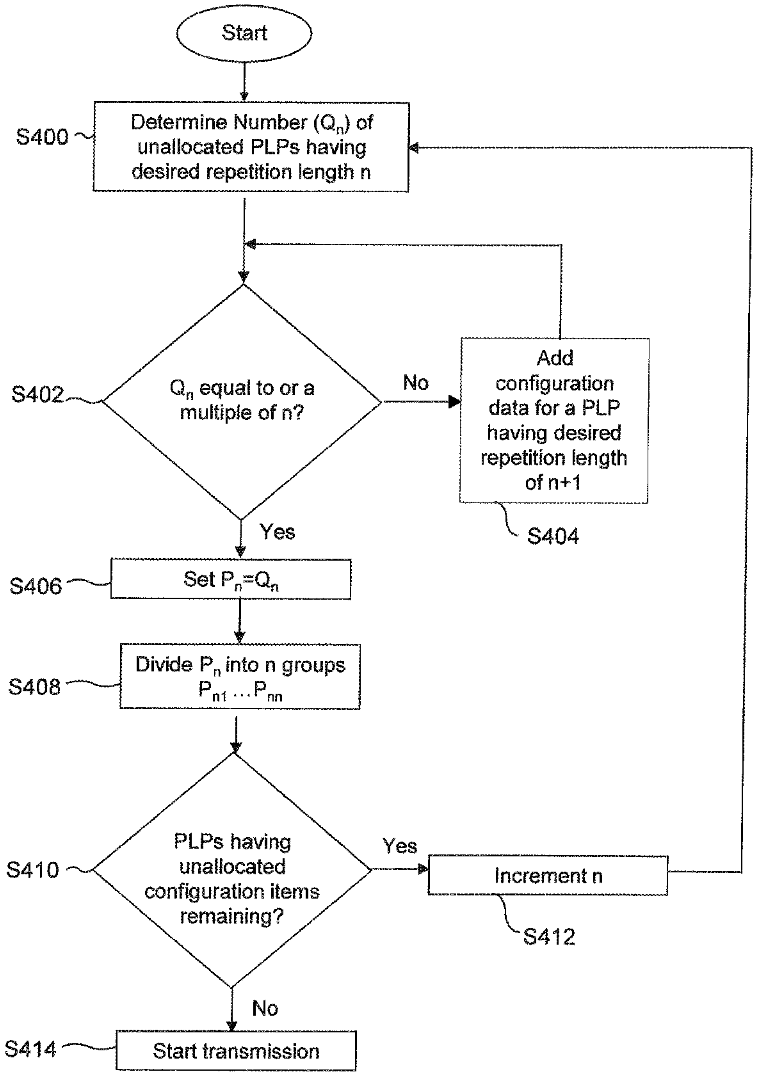
FIG. 4 is a flow diagram showing a process for arranging configuration data items in different types according to a first exemplary embodiment of the present invention.

FIG. 4 is a flow diagram showing a first exemplary method of arranging different types of configuration data item according to an exemplary embodiment of the present invention. At step S400, for a given repetition length n, a set (referred to herein as $S_n$) of a number $Q_n$ of unallocated PLPs having a desired repetition length of n is determined. As mentioned above, the desired repetition length may be determined based on the identification of a service requirement, set by a network operator for example, in relation to each of the PLP.

At step S402, it is determined whether $Q_n$ is equal to or a multiple of n (e.g. if n is 4, it is determined whether $Q_N$ is 4, 8, 12 . . . , or whether it is a number which is not a multiple of 4). If it is determined that $Q_n$ is not equal to n, or a multiple thereof, then configuration data for a PLP having a desired repetition length of n+1 is added to the set $S_n$, so that the value of $Q_n$ increases by 1 at step S404. This step is performed based on the observation that the service for PLP requiring a repetition length of n+1 suffers from no degradation, and in fact is improved, by reduction the repetition length to n. After step S404, the process then returns to step S402, and steps S402 and S404 are repeated until the value of $Q_n$ is determined to be equal to or a multiple of n.

When it is determined at step S402 that $Q_n$ is equal to or a multiple of n, then the number $P_n$ of PLPs for which corresponding configuration data items are transmitted at a repetition length n is set at $Q_n$ at step S406. In other words, the configuration data items included in $S_n$ once the condition that $Q_n$ is equal to or a multiple of n is satisfied are categorized as being of a type having a repetition length n, with $S_1$, $S_2$, $S_3$, and $S_N$ corresponding respectively to data types 204*a*, 204*b*, 204*c* and 204N described above in reference to FIG. 2.

The process then proceeds to step S408 in which the configuration data items included in $S_n$ are further categorized into n groups $P_{n1} \ldots P_{nn}$, corresponding to the data items $P_{nm}$ described above in relation to FIG. 2. Typically, the $P_{nm}$ for any given value of n are selected to include configuration data items relating to the same number of PLPs irrespective of the value of m.

At step S410 it is determined whether there are any PLPs for which the corresponding configuration data items have not yet been allocated (i.e. for which no repetition length has been set) during the process of FIG. 4. If it is determined that there are configuration data items that have not yet been allocated, then the value of n is incremented in step S412 and the process returns to step S400 and repeats using the incremented value of n. If there are no further configuration data items to be allocated, the process proceeds to step S414 where transmission of the data in accordance with the frames arranged in the preceding steps is initiated.

By repeating this process incrementally for values of n between a minimum and a maximum value, configuration data items for all PLPs are categorized into different types having a repetition length which is set at a value equal to or less than a desired repetition length determined based on a service requirement associated with the PLP, ensuring that the quality of service is maintained at or above the desired level.

At the same time, since the number of PLPs having a repetition length less than the desired length is kept to a minimum, the saving in signaling overhead achieved by not repeating all configuration data items in each frame can be maximized.

It should be noted that in the above process it was assumed in step S404 that there existed a PLP having desired repetition length of n+1; in the case that there is no such PLP, configuration data items for a PLPs having a desired repetition of more than n+1 may be used. If the configuration data for all PLPs has already been allocated (i.e. if n is at the maximum value for the PLPs being transmitted), then dummy configuration data items relating to dummy PLPs may instead be used; additionally or alternatively, configuration data relating to one or more already allocated PLPs may be repeated, to ensure that Qn is equal to or a multiple of n.

By dividing, at step S406, each type of configuration data item into n groups such that each group of a given type relates to the same number of PLPs it can be ensured that each of the frames in the frame structure have a constant number of data items i.e. that the signaling capacity for each frame remains constant. This has the advantage that it simplifies scheduling.

Table 1 shows an example of pseudo-code for an algorithm for arranging the configuration data items in a similar manner to that described with reference to FIG. 4.

TABLE 1

```
//Q(n):Set initial configuration vector
//P(n): number of PLPs signaled per frame of repetition length n
//M: total number of PLPs signaled every frame
//N: highest repetition length
Rr(n) = Q(n)/n, n=1:N
Rc(n) = ceil(Rr), n=1:N
R(n) = (Rc(n) - Rr(n))*n, n=1:N
for (i=1:N)
  for (j=i+1:N)
    while ((R(i)>0) and (Q(j)>0))
Q(j) = Q(j) - 1
Q(i) = Q(i) + 1
Rr(n) = Q(n)/n, n=1:N
Rc(n) = ceil(Rr), n=1:N
R(n) = (Rc(n) - Rr(n))*n, n=1:N
    end
  end
end
P(n)=Q(n)/n, n=1:N
M=sum(P(n)), n=1:N
```

Figure 5A:
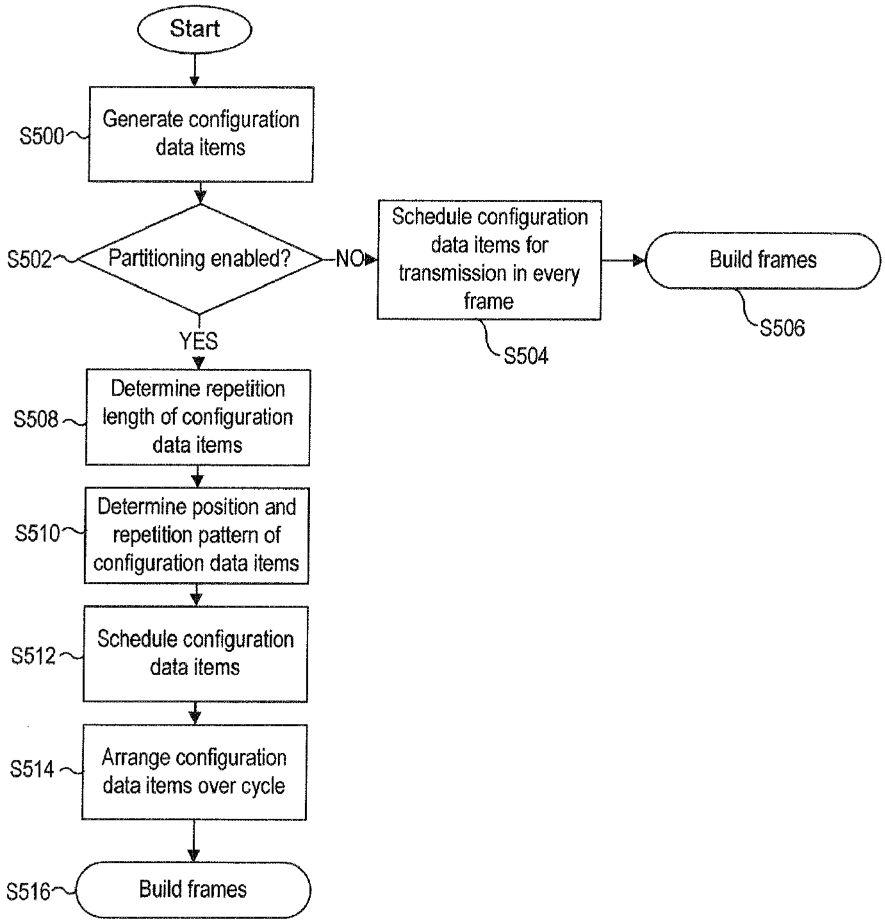
FIG. 5A is a flow diagram showing processes performed by a transmission apparatus according to the first exemplary embodiment of the present invention.

FIG. 5A shows an example of processes performed by a transmission apparatus when transmitting data in accordance with the first exemplary transmission method.

At step S500, configuration data items, which may be in the form of raw L1 config signaling data, are generated. At step S502, the transmission apparatus determines whether partitioning is enabled i.e. whether a transmission method in accordance with the first exemplary transmission method is to be used. If the determination is that such a transmission method is not to be used, the process proceeds to step S504 where the configuration data items are scheduled for transmission in every frame, per conventional methods. The configuration data items are then built into frames of the frame structure (cycle) by a frame builder of the transmission apparatus at step S506, and subsequently transmitted.

If the determination at step S502 is that a method according to the first exemplary transmission method is to be performed, the process proceeds to step S508, where the transmission apparatus determines a repetition length for each PLP to be transmitted. This may be performed according to a method as described above with reference to FIG. 4.

At step S510, the transmission apparatus determines a position within the cycle, and a repetition pattern, for each PLP to be transmitted. For example, it may be determined that the configuration data items for a PLP of repetition length n=2 are included in the first, third and fifth frames of a cycle including six frames.

At Step S512 the transmission apparatus schedules the configuration data items for each PLP. At Step S514, the transmission apparatus arranges the configuration data items over a cycle, as illustrated in FIG. 2, for example. The configuration data items are then built into frames of the cycle by a frame builder of the transmission apparatus at step S516, and subsequently transmitted.

Figure 5B:
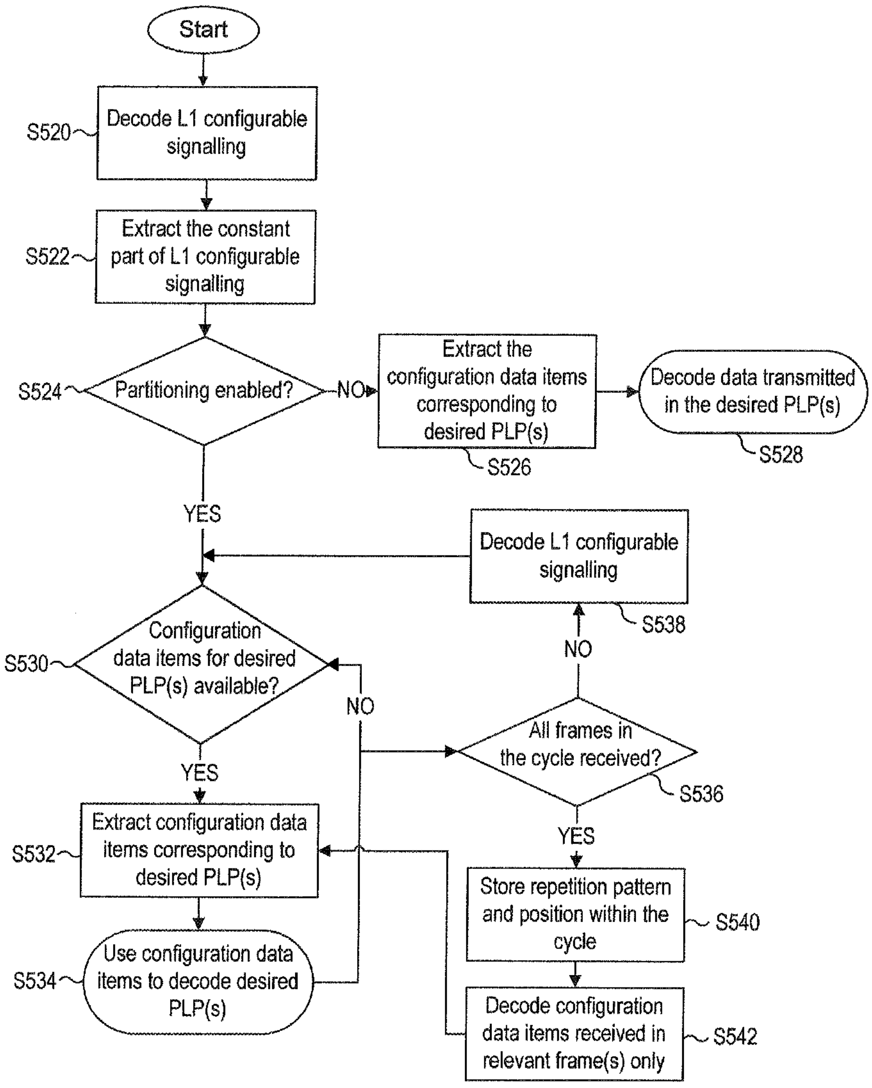
FIG. 5B is a flow diagram showing processes performed by a receiver apparatus according to the first exemplary embodiment of the present invention.

FIG. 5B shows an example of the processes performed by a receiver apparatus when receiving data transmitted in accordance with the first exemplary transmission method.

The process starts at step S520 where the receiver apparatus decodes the L1 configurable signaling received in a first frame of the first cycle of the superframe by which it receives data. At step S522, the constant data 202 of the frame is extracted.

At step S524 the receiver apparatus determines whether partitioning is enabled i.e. whether a transmission method in accordance with the first exemplary transmission method is in use. If the determination is that such a transmission method is not being used, the receiver apparatus determines that the configuration data items corresponding to each PLP are being transmitted in every frame of the cycle. Accordingly, the receiver apparatus proceeds to step S526 and extracts configuration data items corresponding to one or more desired PLP i.e. the one or more PLPs corresponding to the service in relation to which the receiver apparatus is to receive data. The receiver apparatus then proceeds to step S528 in which the extracted configuration data items are used to decode the data transmitted in the desired one or more PLPs. The receiver apparatus then proceeds to step S526 where the configuration data items are scheduled for transmission in every frame, per conventional methods. The configuration data items are then built into frames of the cycle by a frame builder of the transmission apparatus at step S506, and subsequently transmitted.

If the determination at step S524 is that partitioning is enabled, the process proceeds to step S530 where it is determined whether the configuration data items for the desired one or more PLPs are available in the frame currently being processed. If the determination is that the relevant configuration data items are not available, the process proceeds to step S536, described in more detail below.

If the determination is that the relevant configuration data items are available, the receiver apparatus proceeds to step S532, where the configuration data items corresponding to the desired one or more PLPs are extracted. The extracted configuration data items are then used to decode the one or more desired PLPs, at step S534. The receiver apparatus then proceeds to step S536, where it is determined whether all frames in the first cycle of the superframe have been received. If the determination is that not all frames in the cycle have been received, the receiver apparatus decodes the L1 configurable data received in the next frame of the cycle, at step S538. The process then returns to step S530 described above. Steps S530 to S538 may then be repeated iteratively for all frames in the cycle, or until all required configuration data items have been extracted.

If the determination at step S536 is that all frames in the first cycle of the superframe have been received, the receiver apparatus stores the repetition pattern and position within the cycle of the configuration data items required for the desired PLPs at step S540. This enables the receiver apparatus to predict the position within the cycle at which it will subsequently receive the configuration data items which, in combination with the fact that the same pattern of configuration data items is repeated in each cycle, may reduce the error rate of the receiver. As indicated at step S542, the receiver apparatus need then only extract configuration data items from the frames in which the desired configuration data items are predicted to be positioned. This reduces the processing load on the receiver apparatus, and may also enable the receiver apparatus to save power by entering a low power mode, such as a sleep mode, in parts of the cycle in which it is not required to receive data.

Second Exemplary Transmission Method

In the above-described first exemplary transmission method, in cases where $Q_n$ is not equal to n, or a multiple integer thereof, one or more configuration data items are allocated repetition lengths shorter than the desired repetition length. However, in some exemplary embodiments, all configuration data items are allocated repetition lengths equal to the desired repetition length, irrespective of whether or not $Q_n$ is equal to n, or a multiple integer thereof. This may be done by varying the number of PLPs corresponding to a given repetition length from frame to frame, whilst maintaining constant the total number of PLPs per frame, as is now described.

In this example, the frames are arranged in groups, or cycles, each containing a number of frames equal to the total lowest common multiplier (L) of all the desired repetition lengths. The configuration data items are included in data slots (referred to herein as configuration data slots) of the L1-config 110 portion of each frame. Each configuration data item having a repetition length n is included L/n times in each cycle, with each cycle being repeated during transmission. If, having allocated each configuration data item L/n times, the number of PLPs allocated per frame is not constant across the frames of the cycle, one or more additional data items (such as dummy data items corresponding to dummy PLPs) can be added into additional data slots (referred to herein as additional data slots) so that the total number of PLPs (including the dummy PLPs), and the number of corresponding data slots (i.e. the sum of the configuration data slots and the additional data slots), is constant across the frame cycle (and is typically constant across multiple frame cycles). Further, the arrangement of configuration data slots (i.e. their locations within frames and within the cycle of frames) may be the same in each cycle of the super-frame. As described above in relation to the first exemplary transmission method, these features may reduce the error rate of the receiver, and may enable the processing load on the receiver apparatus to be reduced, and/or enable the receiver apparatus to save power.

Figure 6A:
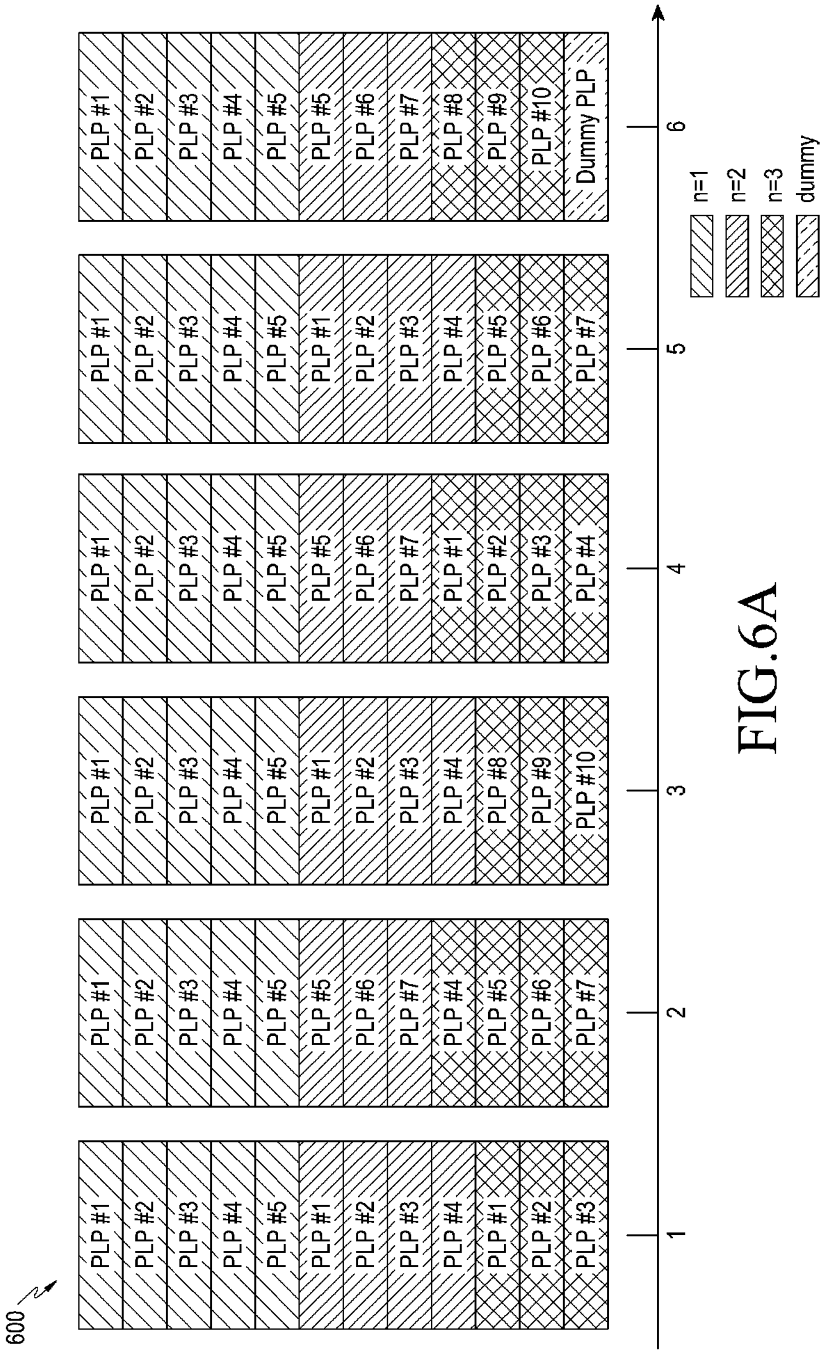
FIG. 6A is a schematic diagram showing a first exemplary arrangement of data configuration items in a sequence of frames according to a second exemplary embodiment of the present invention.

FIG. 6A shows an exemplary arrangement of configuration data items having different repetition lengths in a cycle 600 of frames according to an exemplary embodiment of the present invention. We consider an example in which five PLPs have a desired repetition length n=1, seven PLPs have a desired repetition length of n=2, and ten PLPs have a desired repetition length n=3. In FIG. 6A, the data slots are shown by type (i.e. configuration data slot and additional (dummy) data slot), and according to the repetition length n associated with the data included in the data slot. The PLP index of the PLP to which the data included in the data slots relates is also indicated.

Since the lowest common multiplier (L) of 1, 2 and 3 is 6, there are six frames in the cycle 600. As can be seen from FIG. 6A, configuration data items corresponding to twelve PLPs are included in each frame i.e. there are twelve data slots in each frame. Whilst the number of data slots corresponding to n=1 remains constant across each frame, the corresponding number for each of n=2 and n=3 varies from frame to frame, whilst maintaining a constant total amount of data slots in each frame. Since, in order for each configuration data item to be repeated L/n times, configuration data items corresponding to only 11 PLPs need to be included in the sixth (final) frame of the cycle, an additional PLP may be included in this frame.

Figure 6B:
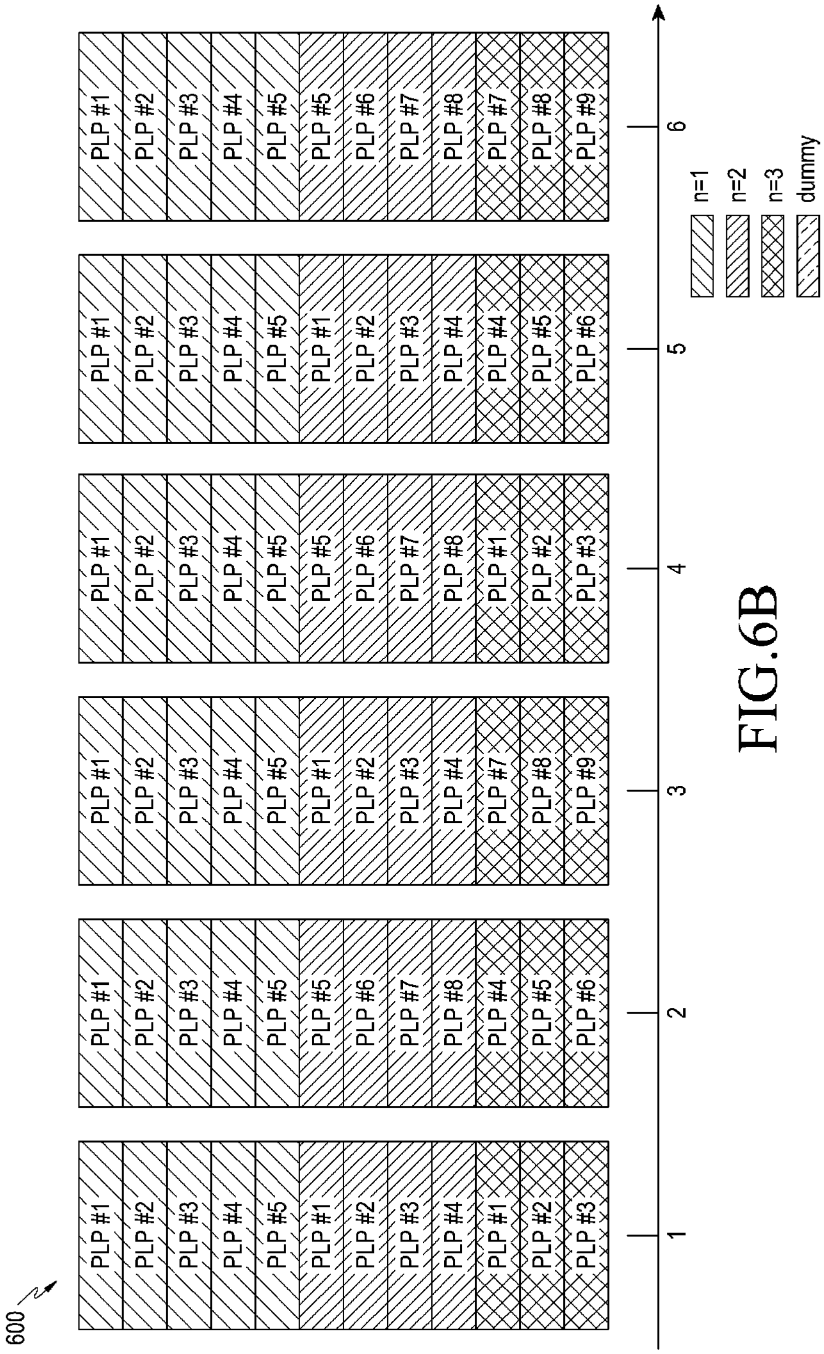
FIG. 6B is a schematic diagram showing a second exemplary arrangement of data configuration items in a sequence of frames according to the first exemplary embodiment of the present invention.

For comparison, FIG. 6B shows configuration data items arranged according to the first exemplary transmission method described above, using the same initial set of desired repetition lengths. In this case, no dummy PLPs are used; instead, configuration data items for one of the PLPs having a desired repetition length of n=3 are allocated an actual repetition length of n=2.

This method described provides many of the same advantages that are provided by the first exemplary transmission method described above. In particular, the overhead savings are the same. This is illustrated by the example of f FIGS. 6A and 6B, in which, in each case, configuration data items corresponding to twelve PLPs are included in each frame (including a dummy PLP in the sixth frame of FIG. 6A).

Furthermore, unlike the method of FIG. 4, it is not necessary to allocate a repetition length lower than a desired repetition length to any configuration data item. This may simplify processing at the transmitter and at the receiver of the transmission, since the repetition length may be set based on a service requirement of the service provider. A network operator implementing this method does not need to deviate from the requirements of the service provider. Further, in some exemplary embodiments, the repetition length may be a fixed attribute of the corresponding PLP; the present method therefore avoids any desirable alteration of this fixed attribute.

It should be noted that, whilst all configuration data items in this method are transmitted at an average repetition length equal to the desired repetition length, the actual interval between frames within the cycle may differ from this number for some configuration data items. For example, in FIG. 6A, the configuration data items corresponding to PLP#4 for n=3 is first transmitted in frame 2 of the cycle, and then again in frame 4, giving an interval of 2 frames. It will again be transmitted in frame 2 of the subsequent cycle, giving an interval of 4 frames since the previous transmission. However, the configuration data items repeated according to this pattern can be maintained in the cluster of configuration data items having the desired repetition length, and it is not necessary to alter the attribute "repetition length" associated with the configuration data items. The receiver of the transmission can be arranged to anticipate the pattern of configuration data items shown in FIG. 6A.

Additionally, since no configuration data items are transmitted at a repetition length which is less than the desired repetition length, additional space is made available in the frame, in the form of additional data items corresponding to the dummy PLPs, which may be used for transmitting "extra" data. To this end, a particular value may be assigned to an identifier in the frames including the additional data items, to identify the additional data items as such. On receipt of an identifier having the assigned value the receiver may either discard the additional data items, if they are "dummy" data items not being used to transmit extra data, or else process the additional data items if they are being used to transmit extra data. The PLP identifier whose value may identify additional data items may be included as a configuration data item in the L1-Config portion 110 of the frame. In some arrangements, the receiver apparatus may not require a particular value to identify the presence of the additional data items; it may only require knowledge of the position within the cycle.

Figure 7:
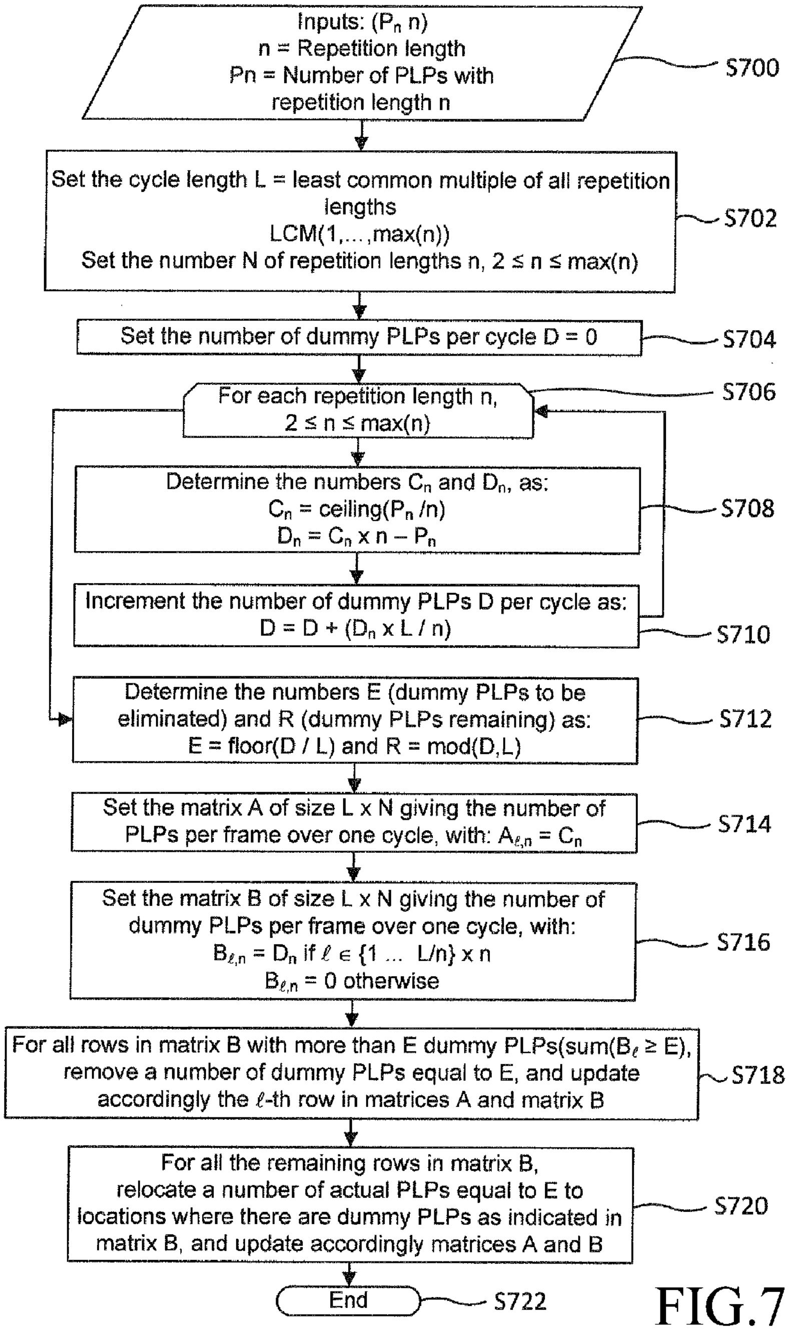
FIG. 7 is a flow diagram showing a process for arranging configuration data items in different types according to the second exemplary embodiment of the present invention.

A method of providing an arrangement of configuration data items and additional data items according to the second exemplary transmission method is now described with reference to FIG. 7. By way of illustration, we also describe how the process steps of FIG. 7 would be implemented with the same input parameters as FIG. 6A.

At step S700, the input parameters are received, namely the number Pn of PLPs having repetition length n. In the example of FIG. 6A, $P_1=5$, $P_2=7$ and $P_3=10$.

At step S702 the cycle length L is set equal to the least common multiple of all repetition lengths n in the cycle. Further, a parameter N is set equal to the number of repetition lengths greater than one. In the example of FIG. 6A, N=2.

At step S704, the number D of additional data slots (e.g. the number of dummy PLPs) per cycle is set at an initial value of zero.

Step S706 starts an iterative procedure, in which the value of D is iterated. At step S708 the values of parameters $C_n$ and $D_n$ are set at:

$$C_n=\text{ceiling}(P_n/n);\text{ and}$$

$$D_n=(C_n\times n)-Pn.$$

At step S710 the value of D is incremented as:

$$D=D+(Dn\times L/n).$$

Steps S708 to S710 are iterated to obtain a total value for D, summed over all values of n greater than 1. In the example of FIG. 6A, the following values are obtained:

$C_2=4$ $C_3=4$ $D_2=1$ $D_3=2$

D=7

This ends the iterative procedure. The process proceeds to step S712, where the number E of additional data slots (dummy PLPs) to be eliminated per frame of the cycle, and the number R of additional data slots to remain in the cycle are determined as:

$$E=\text{floor}(D/L);\text{ and}$$

$$R=\text{mod}(D,L)$$

In the example of FIG. 6A, the following values are obtained:

E=1; and

R=1

At step S714, matrix A representing an initial candidate matrix is defined having size L×N, with elements $A_{l,n}=C_n$. The value of $A_{l,n}$ represents the number of data slots assigned to repetition length n of the lth frame of the candidate cycle.

At step S716, matrix B representing an initial distribution of additional data slots (dummy PLPs) amongst the frames of the cycle is defined having size L×N, with elements $B_{l,n}$, where:

$B_{l,n}=D_n$ if 1 is equal to or an integer multiple of n; and $B_{l,n}=0$ otherwise.

The value of $B_{l,n}$ represents the number of additional data slots assigned to repetition length n of the lth frame of the candidate cycle.

In the example of FIG. 6A, the following matrices are obtained:

$$A == \begin{pmatrix} 4 & 4 \\ 4 & 4 \\ 4 & 4 \\ 4 & 4 \\ 4 & 4 \\ 4 & 4 \end{pmatrix}; \text{ and}$$

$$B == \begin{pmatrix} 0 & 0 \\ 1 & 0 \\ 0 & 2 \\ 1 & 0 \\ 0 & 0 \\ 1 & 2 \end{pmatrix}$$

The process then proceeds to reduce the number of additional data slots is reduced from the candidate cycle. As described above, a number of additional data slots equal to E is removed from each frame of the candidate cycle. This is done in two-step process, as is now described.

At step S718, for each frame of the candidate matrix having a number of additional data items greater than or equal to E, a number of frames equal to E can simply be removed. In the example of FIG. 6A, this step results in the following matrices:

$$A == \begin{pmatrix} 4 & 4 \\ 3 & 4 \\ 4 & 3 \\ 3 & 4 \\ 4 & 4 \\ 3 & 4 \end{pmatrix}; \text{ and}$$

$$B == \begin{pmatrix} 0 & 0 \\ 0 & 0 \\ 0 & 1 \\ 0 & 0 \\ 0 & 0 \\ 0 & 2 \end{pmatrix}$$

It should be noted that, although in this example additional data slots are removed in ascending order of n (i.e. additional data slots removed from the n=2 column in preference to the n=3 column), in some cases a descending order, or any other order, of removal may be used.

As can be seen from the above exemplary matrices, it is not always possible to directly remove the required number (E) of additional data slots from all frames of the candidate frame cycle. In such cases, the process proceeds to step S720, where configuration data items corresponding to a number of configuration data slots equal to E are removed from each frame from which it was not possible to remove E additional data slots, to one or more frames including additional data slots. A corresponding number of additional data items is removed from the frames to which the configuration data items are moved.

In the example of FIG. 6A, this results in configuration data items corresponding to n=3 in the first frame of the sequence being moved to the third frame of the sequence, and configuration data items corresponding to n=4 in the fifth frame of the sequence being moved to the sixth frame of the sequence. The final matrices obtained in this example are as follows:

$$A == \begin{pmatrix} 4 & 3 \\ 3 & 4 \\ 4 & 3 \\ 3 & 4 \\ 4 & 3 \\ 3 & 4 \end{pmatrix}; \text{ and}$$

$$B == \begin{pmatrix} 0 & 0 \\ 0 & 0 \\ 0 & 0 \\ 0 & 0 \\ 0 & 0 \\ 0 & 1 \end{pmatrix}$$

It can be seen that these matrices correspond to the arrangement shown in FIG. 6A. Whilst in this example, an additional (e.g. dummy) data slot has been included in the final frame of the cycle, it should be noted that this is not always the case. Depending on the input parameters, additional data slots may be included at other locations within the cycle.

After completion of the "swapping" procedure of step S720, the process ends at step S722.

Cycles generated according to the above process can be used for transmitting signaling data, by repeating the cycle during the transmission of data.

It should be noted that the process described above with reference to FIG. 7 is by way of example only, and details of the various steps described may vary. For example, in the above example, the value of the parameter N was set equal to the number of repetition lengths greater than 1. Since configuration data items having a repetition length of 1 are repeated in each frame, no re-arrangement of same is required, and it is unnecessary to include the n=1 configuration data items in the above process. However, in some exemplary embodiments the value of N is set equal to the number of repetition lengths including n=1, and subsequent steps altered accordingly.

Figure 8A:
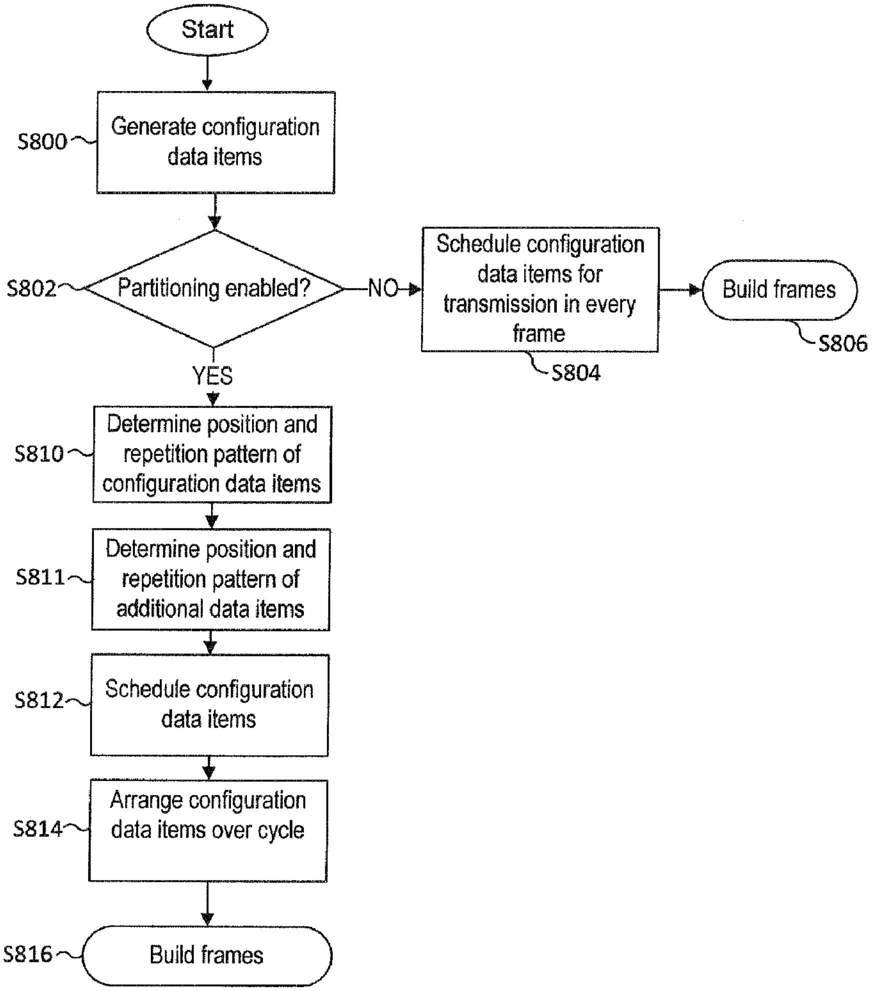
FIG. 8A is a flow diagram showing processes performed by a transmission apparatus according to the second exemplary embodiment of the present invention.

FIG. 8A shows an example of processes performed by a transmission apparatus when transmitting data according to the first exemplary transmission method.

Referring now to FIG. 8, Steps S800 to S806 correspond, respectively, to steps S500 to S506 described above in relation to FIG. 5A. However, in the present example, the step corresponding to step S508 may be omitted; this is because, as described above, in the second exemplary transmission method all configuration data items are assigned the corresponding desired repetition length. Instead the process proceeds to step S810, where the transmission apparatus determines a position within the cycle, and a repetition pattern for each PLP to be transmitted; this step corresponds to step S510, described above.

Since, as described above, in the second exemplary transmission method one or more additional data items may be transmitted, at step S811 the transmission apparatus determines the position and repetition pattern for any such additional data items to be included in the cycle (cycle). Subsequent processing steps S812 to S816 correspond, respectively, to processing steps S512 to S516 described above in relation to FIG. 5A.

Figure 8B:
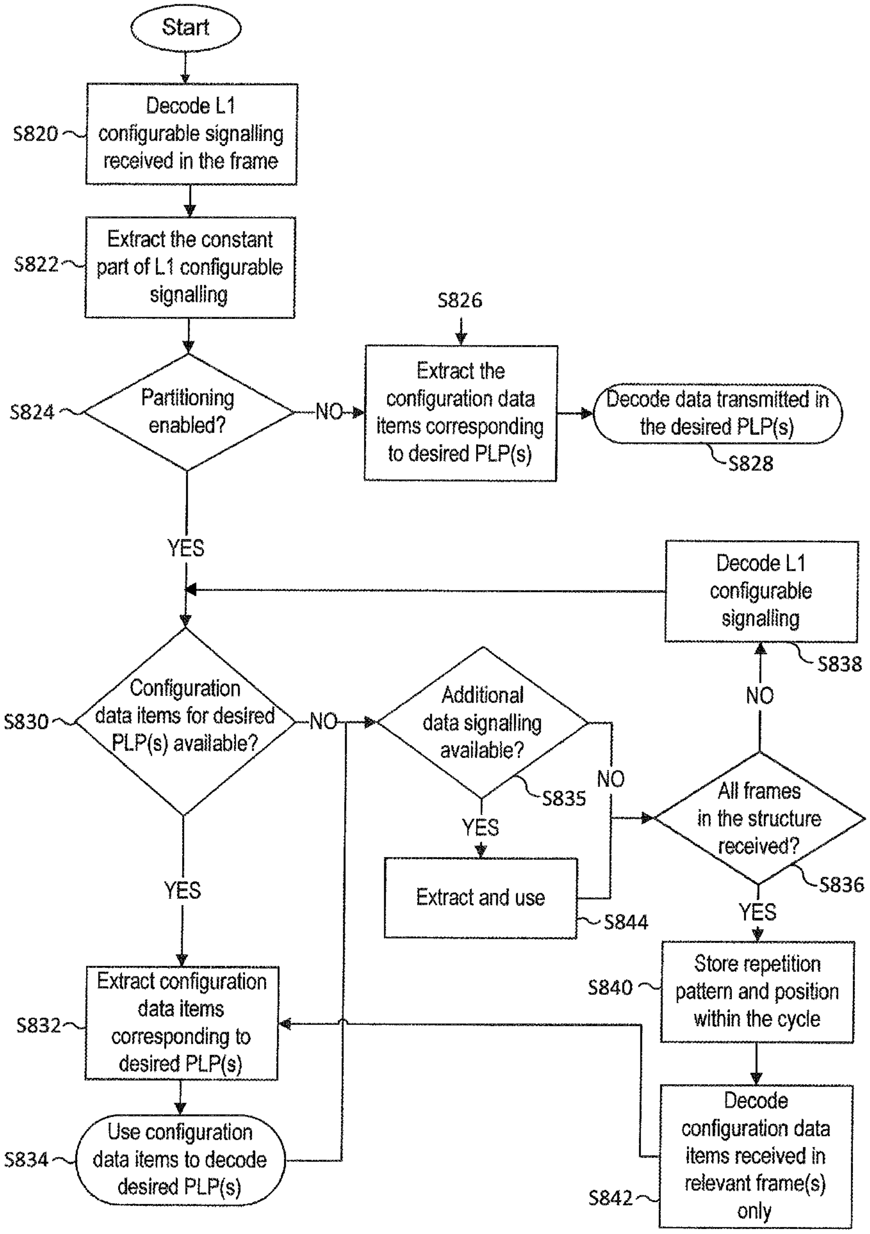
FIG. 8B is a flow diagram showing processes performed by a receiver apparatus according to the second exemplary embodiment of the present invention.

FIG. 8B shows an example of the processes performed by a receiver apparatus when receiving data transmitted in accordance with the first exemplary transmission method. Steps S820 to S834 correspond, respectively, to steps S520 to S534 as described above in relation to FIG. 5B.

However, different from the example of FIG. 5B, if it is determined at step S830 that there are no configuration data items for the desired one or more PLPs in the frame currently being processed, or after decoding the desired one or more PLPs at step S834, the receiver apparatus proceeds to determining whether any additional data signaling, containing additional data items as described above, is available for the currently processed claim. If such data signaling is available, the additional data items included therein are extracted and used at step S844. The process then proceeds to step S836, which corresponds to step S536 described above in relation to FIG. 5B. Subsequent steps S838 to S842 correspond, respectively, to steps S538 to S542 described above in relation to FIG. 5B.

If the determination at step S835 is that additional data signaling is not available, then the receiver apparatus proceeds directly to step S836, without performing step S844.

Third Exemplary Transmission Method

In the first and second exemplary transmission methods described above, all required configuration data items relating to an integral number of PLPs may be included in each frame. This enables the data relating to a given PLP carried in an L1-config signaling portion 110 of a given frame to be self-decodable, as is described in more detail below. In these methods, the size of the part of the L1-signaling portion which is allocated to configuration data items of a given repetition length is determined by the number of data slots included in the relevant part, the data slots being occupied by configuration data items corresponding to actual PLPs, or dummy data corresponding to dummy PLPs, for example.

However, in some exemplary embodiments of the present invention, data configuration items may be divided across multiple frames of a sequence, with the bit size of each part of the frame that is allocated to a configuration data item having a given repetition length being kept at a constant length for each of a sequence of frames. In such exemplary embodiments, for each repetition length n, the sum Total (T) of the bit sizes of the configuration data items having repetition length n is determined and divided by n. For each value of n, an amount of data equal to T/n is allocated to each frame of the sequence. Where T is not divisible by n, additional "dummy" data, for example one or more zeros, may be included in the relevant part one or more of the frames of the sequence, so that the part of the frame allocated to a given value of n remains constant across the sequence of frames.

Figure 9:
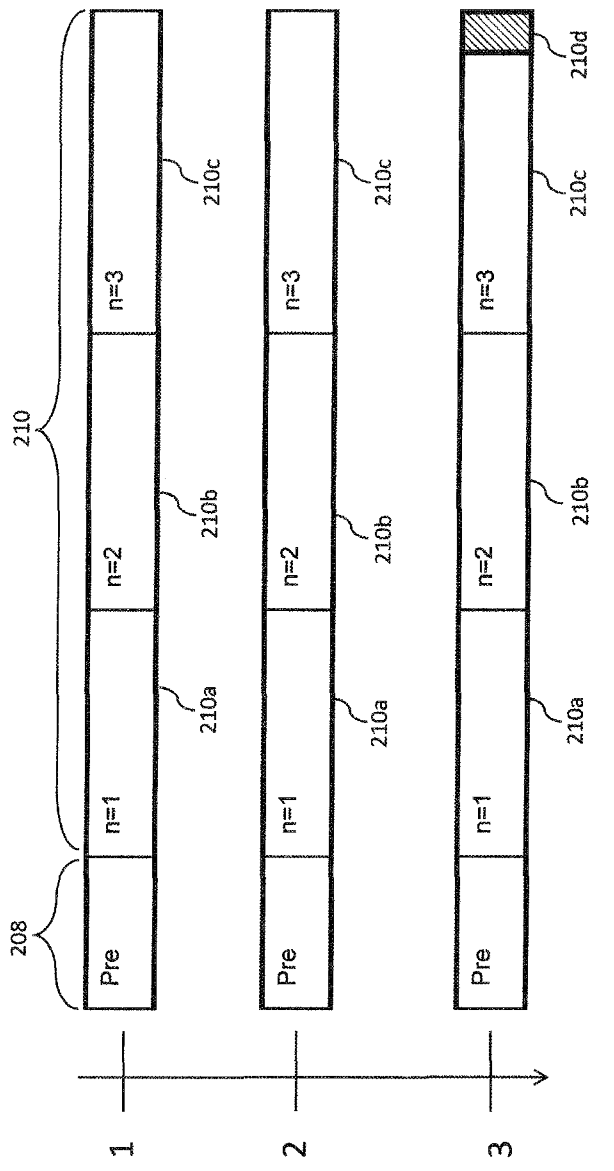
FIG. 9 is a schematic diagram showing a third exemplary arrangement of data configuration items in a sequence of frames according to an exemplary embodiment of the present invention.

FIG. 9 shows an example of configuration data items arranged in a frame sequence according to an exemplary embodiment of the present invention. In FIG. 9, only the L1-pre 208 and L1-Config 210 portions of three frames in a sequence are shown. However, it will be understood that the frames will typically additionally include some or all of the other portions described above in relation to FIG. 2.

In this example, the L1-Config portion 210 includes an n=1 part 210*a*, an n=2 part 210*b*, and an n=3 part 210*c*, for transmitting configuration data items having the corresponding repetition length.

In this example, we assume that the total number of bits to be transmitted at repetition interval n=1 is assumed to be 200 bits, the number at n=2 is assumed to be 280 bits, and the number at n=3 is assumed to be 400 bits. The configuration data items for each value of n are divided up as described above. For n=1, 200 bits of configuration data are transmitted in the n=1 part 210*a* of each frame of the sequence. For n=2, 140 bits of configuration data are transmitted in the n=2 part 210*b* of each frame of the sequence. For n=3, since 400 is not divisible by 3, 134 bits of configuration data are included in the n=3 part 210*c* of the first and second frames of the sequence, with 132 bits being included in the n=3 part 210*c* of the third frame in the sequence. In order to ensure that the length of the n=3 part 210*c* is constant across the sequence, two zeros 210*d* are added at the end of the n=3 part of the third frame in the sequence.

In order that, on receipt, the configuration data items can be correctly collated, and any zeros removed, the constant part (containing the constant data 302) of the L1-Config portion of the frames of the sequence may include an indicator of the bit size of each of the above-described parts 210*a*, 210*b*, 210*c* of the L1-Config portion 210, as well as an indicator of the number of zeros (if any) included in the corresponding part. The L1-Pre portion 208 may include an indicator of the bit size of the constant portion of one or more frames of the sequence, for example.

In the above example, the zeros 210*d* required for the n=3 data were included at the end of the n=3 part 210*c* of the third frame of the sequence. However, in some exemplary embodiments, the zeros (or other dummy data) may be included at another predefined position in the sequence. By including the dummy data at a predefined position in a sequence, processing on receipt of the transmitted data is simplified, since the receiver may simply discard the indicated number of zeros prior to processing the configuration data items.

The third exemplary transmission method allows an even greater saving in transmission overhead than the first and second exemplary transmission methods. This is because, in the present method, it is not either necessary to allocate a repetition length greater than a desired repetition length (as is sometimes the case in the first exemplary transmission method), and nor is it necessary to add any additional data items corresponding to dummy PLPs (as is sometimes the case in the second exemplary transmission method).

It will be understood that the processes described above may be performed by a transmission apparatus arranged to perform the processes. The transmission apparatus may include an input communications interface for receiving data streams, for example different digital video broadcast channels, to be encoded into a frame structure, a processor, or set of processors, for performing processing steps in conjunction, where appropriate, with a data storage device, which may store data such as the desired repetition lengths described above. The transmission apparatus typically also includes an output communications interface for wirelessly transmitting data.

Similarly, the data transmitted by the transmission apparatus is typically received by one or more receiver apparatuses, each comprising an input communications interface for wirelessly receiving the data, a processor, or set of processors, for performing, in conjunction with a data storage means where appropriate, processing of the received signal as is now described, and a video display, an audio transmitter and/or an output communications interface for outputting one or more selected decoded data streams.

On receipt of the data transmitted in a frame structure as described above, the receiver apparatus selects different PLPs to be received, the different PLPs corresponding to different repetition lengths, for example in response to a change of channel at the receiver apparatus. The receiver apparatus receives configuration data items corresponding to each selected PLP, and receives the corresponding PLP using the received corresponding configuration data items.

In the case that additional data corresponding to dummy PLPs are included in one or more frames of the frame structure, as may be the case in the second exemplary transmission method described above, one or more received frames may include a dummy PLP identifier, as described above. In this case, the receiver apparatus may parse the PLP identifier, identify the additional data to which it relates and process the additional data accordingly. In some cases, this may involve simply discarding the additional data. In other cases, as described above, the additional data may include extra data, which the receiver apparatus may be configured to receive and process, on receipt of an identifier value indicating that such extra data is carried.

In the case of the third exemplary transmission method described above, the L1-config portion 210 may be divided into different parts 210$a$, 210$b$, 210$c$, associated with different repetition lengths. At least one frame of the frame structure may include one or more indicators of these lengths, which the receiver apparatus may be arranged to receive. On receipt of same, the receiver apparatus may identify the length of each of the parts 210$a$, 210$b$ and 210$c$ from corresponding indicators, and process the data in the different parts accordingly.

Further, as described above, one or more of the frames of the frame structure may include dummy values, such as a sequence of zeros, for example at the end of the L1-config portion 210 of one or more of the frames. In this case, one or more frames of the frame structure may include an indicator of the number of zeros, so that they can be discarded by the receiver apparatus.

Advantageously, in the first and second exemplary transmission methods described above, the data relating to a given PLP carried in an L1-config signaling portion 210 of a given frame may be self-decodable i.e. contain all data necessary for decoding to commence, so that decoding in relation to a given PLP can be started as soon as the corresponding configuration data items are received. Further, once a first instance of a given configuration data item has been received and decoded, and since the configuration data items are ordered in a predictable way, on the basis of repetition length and/or PLP identifier as described above, the it may be unnecessary to decode subsequent instances of the same configuration data item.

Figure 10:
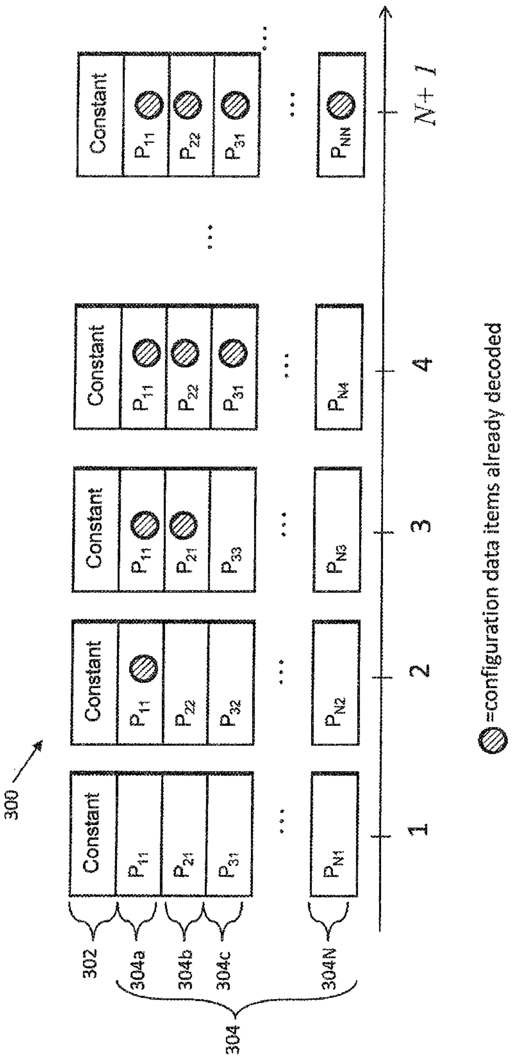
FIG. 10 is a schematic diagram showing data carried in a frame structure being decoded according to an exemplary embodiment of the invention.

As shown in FIG. 10, assuming that each configuration data item is decoded correctly the first time an instance thereof is received, all configuration data items are decoded after N+1 frames, where N is the longest repetition length set for the transmission.

In order to reduce the burden on the processing resources of the receiver apparatus, the first time an instance of a configuration data item is received and decoded, it may be stored in a data storage means of the receiver apparatus with the stored instance being used to identify and receive the corresponding PLP in subsequent frames. Subsequent, repeated, instances of the same configuration data item within a superframe may then be flagged by the receiver to be ignored by the decoder and not decoded. In this exemplary embodiment, the stored instance can then be used to identify and receive the corresponding PLP in subsequent frames within the superfame, even those which follow the frames containing the repeated instances of the configuration data time.

In an alternative exemplary embodiment, each instance of any given configuration data item transmitted in the frame structure 300 may be decoded, to maintain simplicity of receiver operation and/or to reduce decoding errors.

In some exemplary embodiments, a receiver sets one or more values associated with a soft decoder to one or more predetermined values, to indicate that the configuration data item is already known. For example, in exemplary embodiments in which a receiver generates Log Likelihood Ratios which are used as confidence factors in error correction for data items to be decoded in a soft decoder, the Log Likelihood Ratios (LLRs) for the further, repeated, instances of the configuration data items may then be set in the remainder of the superframe to +/−∞, to indicate that these are already known The known configuration data items can be used to facilitate the decoding of other data, such as other data carried in the L1-Config signaling portion 210 and/or data contained in the L1-Dyn signaling portion 212; the fact that some bits in the received data are already known (as indicated by the corresponding LLR having been set to +/−∞) increases the robustness of decoding, in terms of error correction, of other bits in the received data.

Thus, when a given configuration data item has been received in a first set of data (for example, data in a given frame) and decoded, the decoded data can be used to facilitate in a decoding process of further sets of data including the configuration data item; the fact that the bits of the configuration data item are known improves the robustness of error correction in relation further data items included in the further sets of data. These further data items may comprise data items carried in an L1-Config signaling portion 210 of a frame, or another signaling portion, such as an L1-Dyn signaling portion 212, where the latter is coded together the L1-Config signaling portion 210.

When the frames are arranged into superframes, the configuration data may vary from superframe to superframe. Accordingly, in some exemplary embodiments, the receiver apparatus decodes at least the first instance of each configuration data item in each superframe. However, since the configuration data items may change only infrequently, even between different superframes, in some exemplary embodiments the receiver apparatus does not decode the first instance of each configuration data item in each superframe; instead, an indication may be included in, for example, the L1-Dyn signaling portion 212 indicating that the configuration data items has changed, and the receiver apparatus decodes new instances of configuration data in response to receiving this indication. The indication may indicate one or more PLPs whose corresponding configuration data items have changed; in this case, the receiver apparatus may newly decode configuration data items for only the PLPs indicated.

Figure 11:
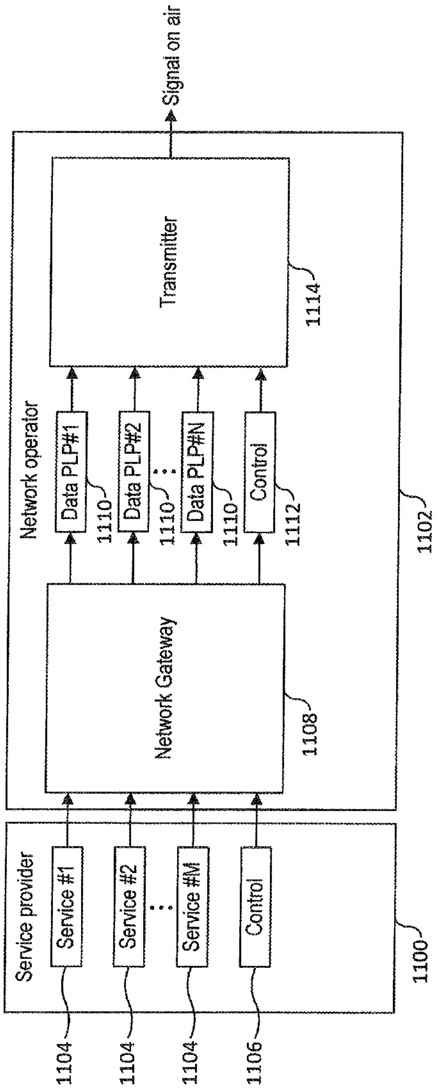
FIG. 11 is a schematic diagram showing a system for use according to exemplary embodiments of the present invention.

As mentioned above, the methods of data transmission described herein may be performed by a network operator in accordance with the requirements of a service provider. FIG. 11 shows components of a system including a service provider 1100 and a network operator 1102 that may be used in exemplary embodiments of the present invention.

Referring now to FIG. 11, The service provider 1100 provides data relating to one or more services 1104 to the network operator 1102, along with control data 1106, which may include service requirements such as a desired repetition length, or data from which a desired repetition length can be derived, such as a delay tolerance, etc.

The network operator 1102 receives data from the service provider at a network gateway 1108. The network gateway additionally performs functions such as mapping service requirements onto PLPs and their service attributes, such as repetition length.

The network gateway 1108 sends data relating to each of one or more PLPs 1110, along with control data 1112 to a transmitter 1114. The control data 1112 may include PLP attributes, such as repetition length, etc.

The transmitter 1114 may perform functions such as generation of signaling, frame building, and transmission of data, for example.

The above exemplary embodiments are to be understood as illustrative examples of the invention. Further exemplary embodiments of the invention are envisaged. For example, FIG. 12 shows an alternative arrangement for the constant data 302 and configuration data 304 included in the L1-Config signaling portion 210 of a frame. Referring now to FIG. 12, in this exemplary embodiment, the number of PLP configurations is limited to a number lower than the number of PLPs in use, and the PLPs are classified according to the PLP configuration ("PLP mode") used. In this way, the configuration data items common to a given PLP mode need not be separately transmitted for each PLP of the given PLP mode. In this exemplary embodiment, the different types of configuration data item may be assigned on a PLP by PLP basis, as described above, or instead on the basis of the different PLP modes.

FIGS. 13A and 13B show further alternative arrangements for the constant data 302 and configuration data 304 included in the L1-Config signaling portion 210 of a frame.

The constant data in the example of FIG. 13A includes an "options flag" data item 1300, which indicates whether a given option with related signaling in L1-CONF is used or not. If the given option is in use, then the signaling fields associated with the option are signaled in L1-CONF; otherwise they are not included. This enables overhead reduction when the given option is not used.

Table 2 provides an example of some different options that may be indicated by this field.

TABLE 2

| Value | Option Enabled |
|---|---|
| xxxxxxx1 | Sub-slicing |
| xxxxxx1x | Auxiliary streams |
| xxxxx1xx | RESERVED_1 field inside the PLP loop |
| xxxx1xxx | RESERVED_2 field inside the PLP MODE loop |
| xxx1xxxx | RESERVED_3 field |
| xx1xxxxx | Partitioning of the PLP loop |
| x1xxxxxx | Reserved for future use |
| 1xxxxxxx | Reserved for future use |

In particular, it should be noted that the value xx1xxxxx indicates that a method of transmission of data in accordance an exemplary embodiment of the present invention is to be performed. This corresponds with data item 1302 in FIG. 13A.

The "PARTITION_CYCLE_LENGTH" data item 1304 indicates the length, in number of frames, of one cycle across which the signaling in the PLP loop of L1-CONF for all the PLPs in the current super-frame is complete. The signaling in the PLP loop of all PLPs in the current super-frame will generally be exactly the same. The signaling in the PLP loop of L1-CONF for each PLP repeats at the same frame position every L frames in the current super-frame, where L is the value given by PARTITION_CYCLE/LENGTH. This value stays constant in at least the current super-frame.

The "PARTITION_NUM_ADD_PLP" data item 1306 indicates the number of additional signaling blocks added in the PLP loop of the current frame in order for each frame in the partition cycle to carry the signaling of an integer number of PLPs for each cluster of PLPs, as detailed below.

The following fields appear only if the OPTIONS_FLAG field is equal to 'xx1xxxxx':

The PLP_PARTITION_CLUSTER_ID data item 1308 indicates the partition cluster of the signaling in the PLP loop associated with the PLP identified by the PLP_ID. The partition cluster ID is defined in table 3.

TABLE 3

| Value | Description |
|---|---|
| 00 | The signaling in the PLP loop associated with the given PLP tolerates 0 frame delay. It shall be carried in every frame of the current super-frame. |
| 01 | The signaling in the PLP loop associated with the given PLP tolerates 1 frame delay. It may be carried in every $2^{nd}$ frame of the current super-frame. |
| 10 | The signaling in the PLP loop associated with the given PLP tolerates 2 frames delay. It may be carried in every $3^{rd}$ frame of the current super-frame. |
| 11 | The signaling in the PLP loop associated with the given PLP tolerates 3 frames delay. It may be carried in every $4^{th}$ frame of the current super-frame. |

The following fields appear in the loop over PARTITION_NUM_ADD_PLP:

RESERVED_2 1310: This 32 bit field is reserved for future use. The length of this field (in this case, 32 bits) is equal to the sum of the lengths of the first six fields in the PLP loop (namely, PLP_ID, PLP_MODE_ID, PLP_ANCHOR_FLAG, PLP_IN_BAND_A_FLAG, PLP_GROUP_ID, FIRST_LF_IDX) in order to guarantee the same amount of signaling in the PLP loop associated with each PLP of PLP_PARTITION_CLUSTER_ID greater than "000".

The following field appears only if the OPTIONS_FLAG field is equal to 'xxxxx1xx':

RESERVED_3 1312: This 8 bit field is reserved for future use. The length of this field (i.e. 8) is equal to the lengths of the field RESERVED_1 in the PLP loop in order to guarantee the same amount of signaling in the PLP loop associated with each PLP of PLP_PARTITION_CLUSTER_ID greater than "000".

PLP_PARTITION_CLUSTER_ID 1314: This 2-bit field indicates the partition cluster of the signaling in the PLP loop associated with the PLP identified by the PLP_ID. The partition cluster ID is defined in table 3 above.

Illustrative Example

The following description relates to an illustrative example of an exemplary embodiment of the present invention, and is provided by way of example.

In order to reduce the overhead of L1-CONF, the signaling in the PLP loop of L1-CONF may be split into equal length partitions, so that each frame carries only one partition of the total signaling in the PLP loop. The L1-CONF data is arranged in two parts, a first part which contains all the signaling data in L1-CONF except for the PLP loop signaling, and a second part which contains the signaling in the PLP loop. Only the second part, i.e. the signaling in the PLP loop, may be subject to partitioning. The first part will always appear in every frame of the super-frame.

A value of the field OPTIONS_FLAG equal to 'xx1xxxxx' indicates that partitioning of the PLP loop in L1-CONF is used.

When partitioning is used, each frame carries the signaling in the PLP loop associated with a number of PLPs equal to the value NUM_PLP_PER_FRAME, which is less than or equal to the total number of PLPs in the current super-frame NUM_PLP_PER_SUPER_FRAME. If partitioning is not used (i.e.

OPTIONS_FLAG='xx0xxxxx'), the two fields NUM_PLP_PER_FRAME and NUM_PLP_PER_SUPER_FRAME have the same value.

The frame may also carry an additional signaling associated with a number of dummy PLPs equal to PARTITION_NUM_ADD_PLP. The summation NUM_PLP_PER_FRAME+PARTITION_NUM_ADD_PLP shall be constant for every frame in the super-frame, in order to guarantee the same amount of L1-CONF signaling in every frame of the current super-frame.

When partitioning is used, every PLP in the super-frame is assigned a partition cluster indicated by the field PLP_PARTITION_CLUSTER_ID. As defined in table 3 above, if PLP_PARTITION_CLUSTER_ID is equal to "000", the signaling in the PLP loop associated with the given PLP shall be transmitted in every frame of the current super-frame, and hence does not tolerate any delay for its acquisition. The PLPs associated with Local Service Insertion (PLP_TYPE="011" or "100") shall be assigned to the first partition cluster PLP_PARTITION_CLUSTER_ID="000", as they require additional signaling fields in the PLP loop compared to the other (i.e. non Local Service Insertion) PLPs and in order to guarantee the same amount of signaling in every frame of the current super-frame.

If the value of PLP_PARTITION_CLUSTER_ID is equal to n (which is strictly greater than 0), then the signaling in the PLP loop associated with the given PLP tolerates n frame delays, and hence may be transmitted every (n+1)-th frame in the super-frame.

In order to ensure that every partition of L1-CONF is self-decodable (i.e. the receiver can decode and use the information as it arrives in every frame of the current super-frame), an integer number of PLPs for each partition cluster n (n>0) is guaranteed in every frame of the current super-frame. If the actual number of PLPs which tolerate n frame delays for the acquisition of their associated signaling in the PLP loop is not equal to or a multiple integer of the partition cluster value n, then some of these PLPs may be assigned or re-assigned to a lower partition cluster value, and hence transmitted at a rate higher than the tolerable rate of every (n+1)-th frame in the super-frame, e.g. every n-th or (n−1)-th frame. Alternatively, all PLPs which tolerate n frame delays may be assigned to the same partition cluster n, and an additional signaling associated with a number of dummy PLPs equal to PARTITION_NUM_ADD_PLP may be added to some partition clusters (n>0) in some frames in the current super-frame. In the latter alternative, in order to maximize overhead reduction, only the minimum number of dummy PLPs should be considered if required. This minimum number PARTITION_NUM_ADD_PLP can be determined from all the numbers of actual PLPs and their corresponding partition cluster values {n} over a period equal to the least common multiplier of all partition cluster values {n}. The additional signaling associated with the number PARTITION_NUM_ADD_PLP of dummy PLPs may be used for some purpose in the future.

If we denote by $P_{actual}(n,l)$ the number of actual PLPs in the partition cluster n (n=0 to N−1) in the l-th frame of the current super-frame, and $P_{dummy}(n,l)$ the number of dummy PLPs associated with the additional signaling in the PLP loop for the partition cluster n (n=0 to N−1) in the l-th frame of the current super-frame, the signaling in the PLP loop of every frame l shall be associated with a constant number of PLPs, given by Q in Equation xx.

$$P_{actual}(n,\ell)+\sum_{n-1}^{N-1}(P_{actual}(n,\ell)+P_{dummy}(n,\ell))=Q \quad \text{Equation 1}$$

The signaling in the PLP loop of L1-CONF for a given PLP will repeat at the same frame position every L frames in the current super-frame, where L is the value of the field PARTITION_CYCLE_LENGTH. From one cycle to another in the current super-frame, the signaling in the PLP loop of all PLPs in the current super-frame will be exactly the same. The partition cycle helps the receiver anticipate the pattern of appearance in the frames of the signaling in the PLP loop associated with the desired PLP. It also helps the receiver know when the full L1-CONF signaling repeats exactly in the current super-frame. The cycle length L is equal to the least common multiplier of all partition cluster values {n}.

Figure 14A:
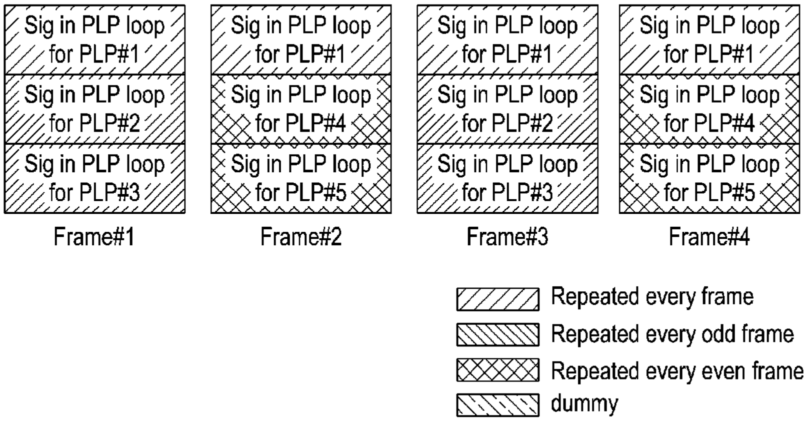
FIG. 14A is a schematic diagram showing an exemplary arrangement of data configuration items in a sequence of frames according to an exemplary embodiment of the present invention.
Figure 14B:
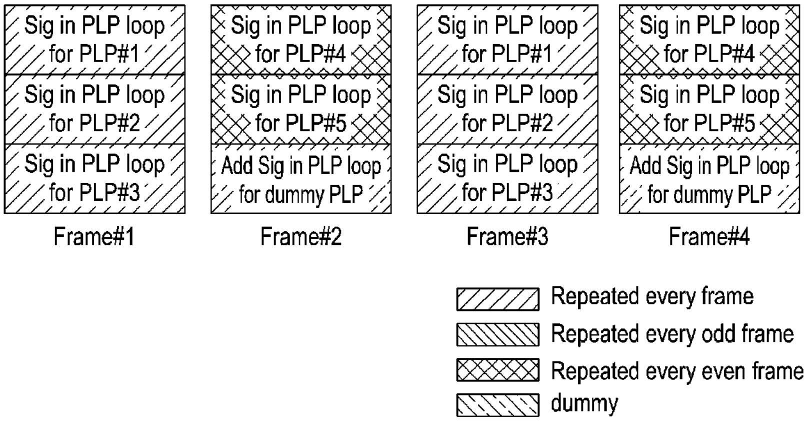
FIG. 14B is a schematic diagram showing an exemplary arrangement of data configuration items in a sequence of frames according to an exemplary embodiment of the present invention.

FIGS. 14A and 14B are schematic diagrams showing an exemplary arrangement of data configuration items in a sequence of frames according to an exemplary embodiment of the present invention;

To provide an example, let us assume a total number of actual PLPs in the super-frame equal to 5. All these 5 PLPs tolerate 1 frame delay for the acquisition of their associated signaling in the PLP loop; hence, ideally, all 5 PLPs should be assigned to the partition cluster n=2. However, the number of PLPs (=5) is not a multiple of the partition cluster value (n=2). In order to guarantee a self-decodable partitioning with an equal amount of L1-CONF signaling in every frame, two equivalent alternatives may be considered:

The first alternative assigns 1 PLP to the partition cluster n=1, and all the remaining 4 PLPs to the partition cluster n=2. Thus, the signaling of 1 PLP (PLP#1) will be repeated in every frame, whilst the signaling of 4 PLPs will be split into two partitions of 2 PLPs. The signaling of the first 2 PLPs (e.g. PLP#2, PLP#3) will then be repeated in odd frames (e.g. 1, 3, 5, 7) whilst the signaling of the other two PLPs (i.e. PLP#4 and PLP#5) will be repeated in even frames (e.g. 2, 4, 6, 8). This is illustrated in FIG. 14A.

In this second alternative, all 5 PLPs are assigned to the partition cluster n=2, an additional signaling associated with 1 dummy PLP is added in the partition cluster n=2. The signaling of the first 3 PLPs (e.g. PLP#1, PLP#2, PLPL#3) will then be repeated in odd frames (i.e. 1, 3, 5, 7, etc.), whilst the signaling of the remaining two PLPs (i.e. PLP#4 and PLP#5) and the additional signaling associated with the dummy PLP will be repeated in even frames (e.g. 2, 4, 6, 8). This is illustrated in FIG. 14B.

If partitioning is not used, every frame will have a PLP loop with a signaling amount equal to 5×A, where A denotes the amount of signaling per PLP in the PLP loop. If partitioning is used, every frame will have a PLP loop with a signaling amount equal to 3×A, in both alternatives. The overhead reduction of the PLP loop is therefore equal to ((5−3)×A)/(5×A)=40%. By accounting for the amount (=C) of signaling in the constant part of L1-CONF (i.e. the part which is repeated in every frame), the overall overhead reduction amounts to (2×A)/(C+5×A).

By way of example, exemplary embodiments of the invention will now be described in the context of a Digital Video Broadcasting Next Generation Handheld (DVB-NGH) system, in which, in one example exemplary embodiment, additional data for reception by DVB-NGH receivers is transmitted within Future Extension Frame (FEF) slots currently contained within the 2nd generation terrestrial DVB-T2 system. In an alternative example exemplary embodiment, it is envisaged that the concepts herein described may be equally applied to a stand-alone DVB-NGH system that is not designed to 'piggy-back' on such an existing DVB-T2 system. However, it will be understood that the examples described herein are by way of example only, and that other exemplary embodiments may involve other wireless broadcast systems or unicast systems. Furthermore, it is envisaged that alternative example exemplary embodiments may be applied to other data transmission systems, and thus are not limited to the use for transmission of digital video signals.

In the context of exemplary embodiments of the present invention, the following non-limiting explanation of terms may be used to describe certain example exemplary embodiments. A physical frame/slot may, in some examples, be considered to be a duration in time on a given RF frequency where the signal corresponding to the target delivery system is present (transmitted). A FEF/additional slot, may, in some examples, be considered to be a duration in time on a given RF frequency where the signal of the target delivery system is not present (not transmitted). A physical super-frame may, in some examples, be considered to be an entity including a number of physical frames and FEFs. The physical configuration may, in some examples, only change at the boundaries of two physical super-frames. A logical frame, may, in some examples, be considered to be a conceptual container with a fixed number of Quadrature Amplitude Modulation (QAM) cells and a given structure for the carriage of data into the physical frames of the target delivery system. A logical super-frame, may, in some examples, be considered to be an entity that includes a number of logical frames. The logical signaling information may in some examples only change at the boundaries of two logical super-frames. A logical channel, may, in some examples, be considered to be a flow of logical frames all of substantially the same size and transmission properties for the carriage of data over the target delivery system. A logical channel group, may, in some examples, be considered to be a group of logical channels such that the physical frames which carry the logical frames of one logical channel in the group are separable in time from the physical frames which carry the logical frames of another logical channel in the group (i.e. zero overlap in time). A transport stream, may, in some examples, be considered to be a stream of data for an ensemble of services which are delivered to the end users by the delivery system (e.g. DVB-NGH). A transport stream may be structured by the delivery system into a number of logical channels defined in accordance with the services requirements.

Figure 15:
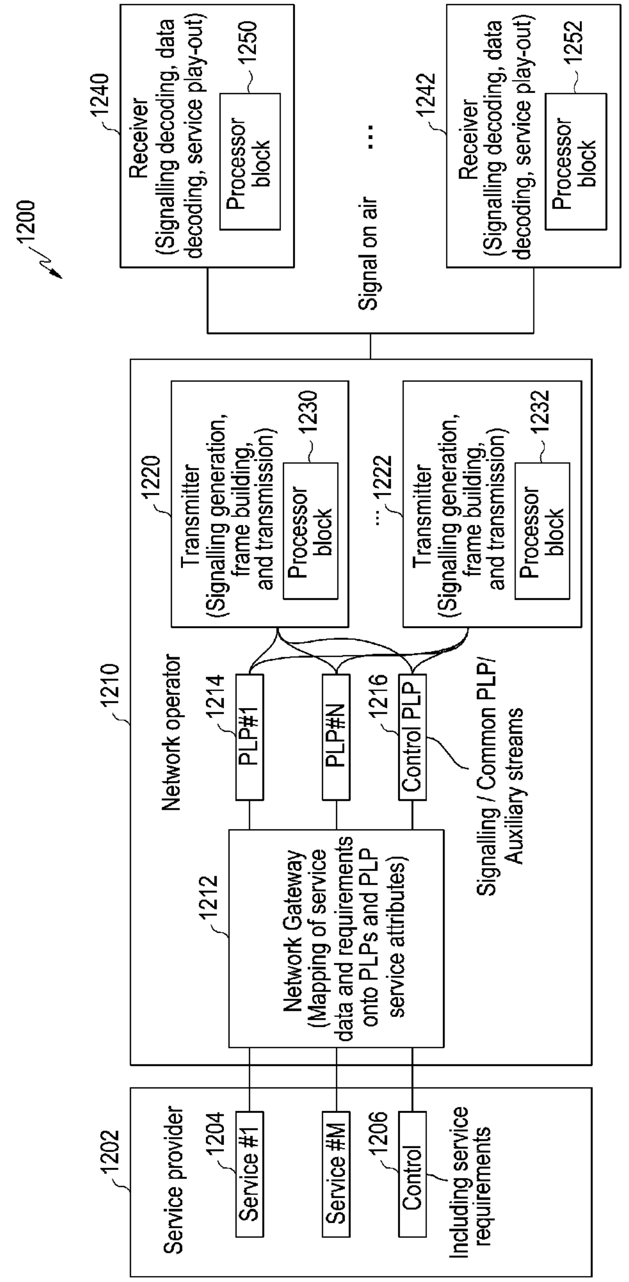
FIG. 15 illustrates an overview of some elements of a digital video broadcasting system adapted according to some example exemplary embodiments of the present invention.

FIG. 15 is shown outline of a wireless broadcasting system 1200 according to one exemplary embodiment of the present invention.

Referring to FIG. 15, the architecture comprises a service provider 1202 that provides a plurality of services #1~#M 1204 and a control channel 1206 that, in some examples, includes service requirement information. The service provider 1202 provides the services and control information to a broadcasting network operator 1210 via, say, a network gateway 1212. The network gateway 1212 may be arranged to provide mapping of service data and requirements onto PLPs and PLP service attributes, as shown. In one example, the mapping of service data may comprise mapping services and/or service components.

The network gateway 1212 is operably coupled to a plurality of transmitters 1220, 1222 via a plurality of physical layer pipes #1~#N 1214 and a control PLP 1216 that may, in some examples, carry signaling, common PLP data and/or auxiliary streams. As illustrated, each transmitter 1220, 1222 comprises at least a signal processor block 1230, 1232 configured to perform, inter-alia, signaling generation, frame building and transmission, as described below.

The transmitters 1220, 1222 of the network operator 1210 then transmit/broadcast over the air the wireless signals, e.g. DVB-NGH signals, to receiver communication units 1240, 1242, such as DVB-NGH handsets. The receiver communication units 1240, 1242 comprise respective signal processing function blocks 1250, 1252 to process and decode the received signals, as described below.

The DVB system comprises many other receivers and transmitters, which for clarity purposes are not shown.

In accordance with example exemplary embodiments of the invention, the signal processor blocks 1230, 1232 of the transmitters 1220, 1222 and the corresponding signal processing function blocks 1250, 1252 of the receiver communication units 1240, 1242 have been adapted to improve transmission and reception of data streams in digital video broadcasting systems.

Figure 16:
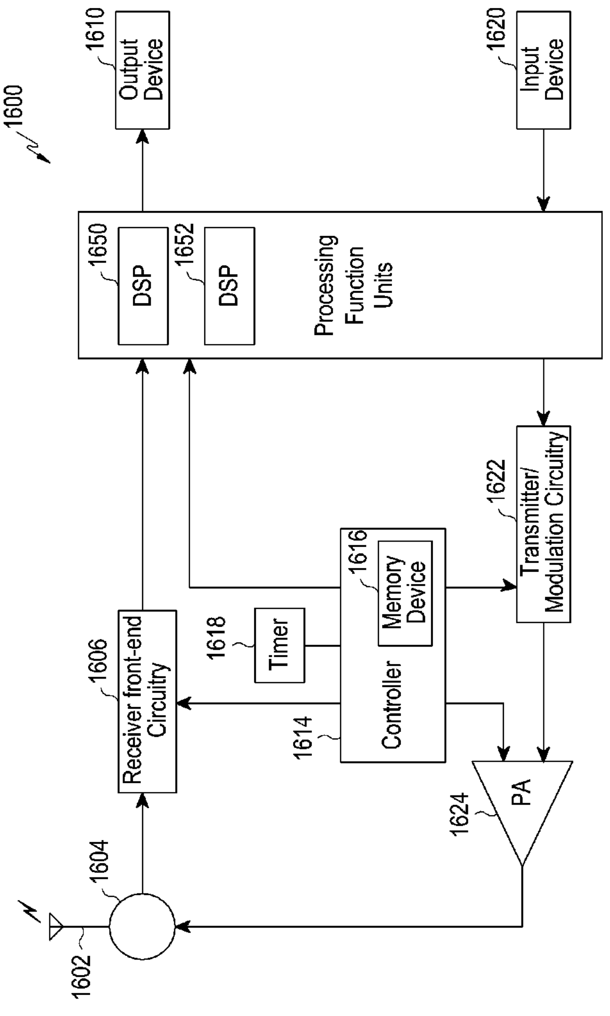
FIG. 16 illustrates an overview of some elements of a digital video broadcasting unit adapted according to some exemplary embodiments of the present invention.

FIG. 16 illustrates a block diagram of a receiver wireless communication unit according to a preferred exemplary embodiment of the present invention.

Referring to FIG. 16, The receiver wireless communication unit 1600 is, in one example exemplary embodiment, a DVB-NGH unit that contains an antenna 1602 preferably coupled to a duplex filter or antenna switch 1604 that provides isolation between receive and transmit chains within the receiver 1600.

The receiver chain, as known in the art, includes receiver front-end circuitry 1606 (effectively providing reception, filtering and intermediate or base-band frequency conversion). The front-end circuitry 306 is serially coupled to a signal processing function 1650, 1652. An output from the signal processing function block 1650, 1652 is provided to a suitable output device 1610, such as a screen or flat panel display, for example to display DVB signals. The receiver chain also includes a controller 1614 that maintains overall subscriber unit control. The controller 1614 is also coupled to the receiver front-end circuitry 1606 and the signal processing function block 1650, 1652 (generally realized by a Digital Signal Processor (DSP)). The controller is also coupled to a memory device 1616 that selectively stores operating regimes, such as decoding/encoding functions, synchronization patterns, code sequences, and the like.

In accordance with exemplary embodiments of the invention, the memory device 1616 stores configuration/profile information, by the receiver a radio communication unit 1600 and processed by signal processing function block 1650, 1652. Furthermore, a timer 1618 is operably coupled to the controller 1614 to control the timing of operations (e.g. reception of time-dependent signals) within the receiver communication unit 1600, particularly with regard to receiving DVB-NGH signals.

Some communication units may also comprise transmitter portions, which for completeness may comprise an input device 1620, such as a keypad, coupled in series through transmitter/modulation circuitry 1622 and a power amplifier 1624 to the antenna 1602. The transmitter/modulation circuitry 1622 and the power amplifier 1624 may be operationally responsive to the controller 1614. Clearly, the various components within the receiver 300 can be realized in discrete or integrated component form, with an ultimate structure therefore being merely an application-specific or design selection.

In accordance with exemplary embodiments of the invention, receiver front-end circuitry 1606, together with, and under the control and guidance of, the signal processing function 1650, 1652, memory device 1616, timer function 1618 and controller 1614 have been adapted to receive and process DVB-NGH of the receiver 1600.

A skilled artisan will appreciate that a wireless transmitter, such as network operator transmitters 1220, 1222 of FIG. 15, will comprise at least similar functional blocks as the transmitter portion of communication unit 1600, albeit that the receiver signal processing functions 1250, 1252 will be arranged to encode and generate DVB signals, frames, super-frames, etc. rather than decode them.

Figure 17:
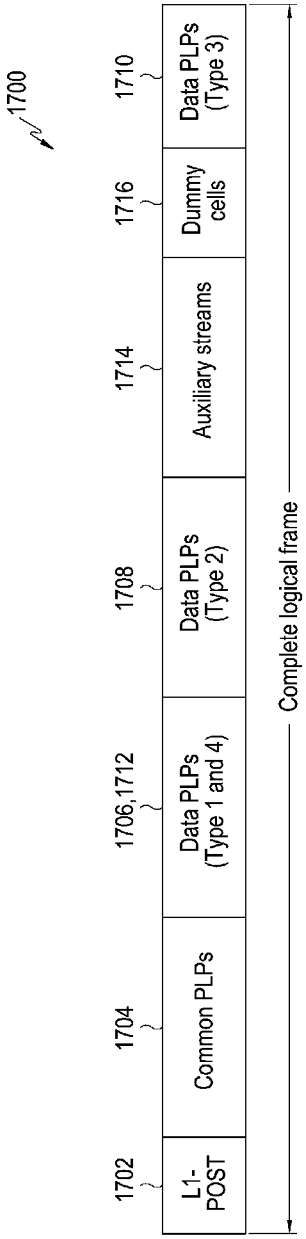
FIG. 17 illustrates one example of a logical frame structure according to some exemplary embodiments of the present invention.

FIG. 17 illustrates one example of a structure of a logical frame 1700 according to some exemplary embodiments of the present invention. In this example exemplary embodiment, the logical frame 1700 may be encoded and configured by a signal processor in a network entity, such as signal processing block 1230, 1232 in the network operator's transmitters 1220, 1222. Similarly, the logical frame may be received and decoded at the receiving communication unit 1600 of FIG. 16, say by signal processing function 1250, 1252 of FIG. 15.

For simplicity purposes only, the hereinafter description may describe a feature in terms of an operation of a transmitter signal processing block 1230, 1232, and it is envisaged that a skilled artisan would readily appreciate that substantially the reverse operation will be performed by the corresponding receiving signal processing block 1250, 1252. In such cases, only one side of the operation may be described, and the reverse side operation is inherently implied.

The Logical Frame (LF) 1700 is defined as a data container including an L1-POST signaling field 1702, multiple Physical Layer Pipes (PLPs), followed by, in some optional examples, one or more auxiliary streams 1714, further followed by, in some optional examples, one or more dummy cells 1716, further followed by, in some optional examples, some PLPs of specific types 1717 (doesn't illustrated by FIG. 17). Together, the signal processing logic may arrange the one or more auxiliary streams 1714 and one or more dummy cells 1716 to exactly fill the remaining capacity of the logical frame 1700. In some examples, the auxiliary streams may be moved to the physical frames, e.g. for the purpose of supporting power level messages, synchronization purposes or for exceptional cases. In some examples, the total number of cells used for auxiliary streams and dummy cells may be set to not exceed 50% of the total capacity of the logical frame. In other examples, the signal processing logic may set the total number of cells used for auxiliary streams and dummy cells to a predetermined other percentage of the total capacity of the logical frame, or perhaps dynamically set (for example according to the prevailing operating conditions).

Thus, each logical frame 1700 starts with L1-POST signaling 1702. In this example, the L1-POST signaling 1702 is followed by one or more common PLP(s) 1704, and thereafter, in order, Type 1 and Type 4 data PLPs (as illustrated) 1706, 1712, Type 2 data PLPs 1708, auxiliary streams 1714, dummy cells 1716 and Type 3 data PLPs 1710. In some examples, it is envisaged that not each type of data PLP will be sent/received in a logical frame, and thus not each of the data PLPs 1706, 1708, 1710, and 1712 may be contained in every logical frame 1700.

In one example, the logical frame 1700 commences with those cells employing L1-POST signaling, whereas in other example implementations some cells may not employ L1-POST signaling. Thereafter, the logical frame 1700 can comprise any from the group comprising common PLPs 1704, different types of data PLPs (Type 1, 2, 3, 4) 1706, 1708, 1710, 1712, auxiliary stream 1714 and dummy cells 1716, whichever of these are applicable.

In other examples, the signal processing logic may dynamically change the locations of the PLPs themselves within the logical frame 1700, say from logical frame to logical frame.

In some examples, a use of the aforementioned logical frame 1700 may ease mapping of logical frames to physical frames.

Figure 18:
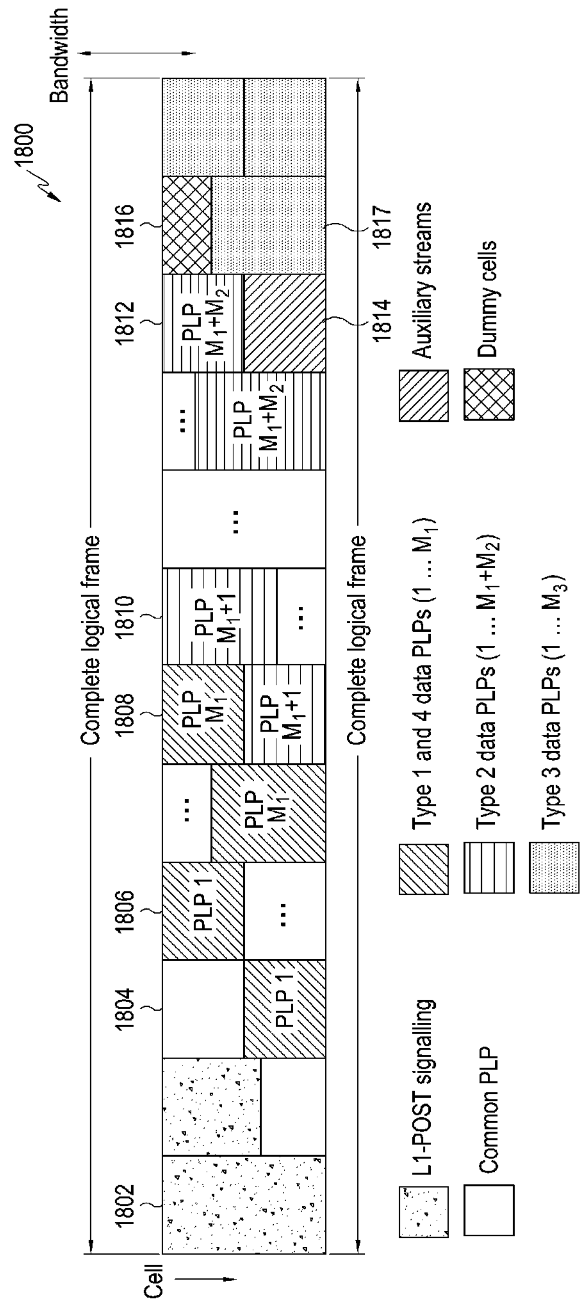
FIG. 18 illustrates one example of a mechanism for mapping PLPs in a logical frame structure according to some exemplary embodiments of the present invention.

FIG. 18 illustrates one example of a mapping arrangement 500 for mapping PLPs in a logical frame structure, for example the logical frame structure of FIG. 17, according to some exemplary embodiments of the present invention. The example mapping arrangement 1800 illustrates a complete logical frame comprising code portions providing L1-POST signaling 1802 and Common PLP portions 1804. The mapping arrangement 1800 also illustrates one example of code portions providing Type-1 and Type-4 data PLPs 1806-1808, Type-2 data PLPs 1810-1812, auxiliary data streams 1814, Dummy cells 1816, and Type-3 data PLPs 1817. In one example, the Common PLP portions 1804, data Type-1, Type-3 and Type-4 PLPs have exactly one sub slice per logical frame, as illustrated. A sub-slice is defined as a 'group of cells' from a single PLP, which before interleaving, is transmitted on cells with consecutive addresses in the logical frame. In this manner, the cells of a Type 1 PLP are always adjacent to each other. The cells of a Type 2 PLP may be spread in blocks across the logical frame. A Type-2 PLP may have multiple sub-slices in the logical frame, where the sub-slices are spread in the logical frame for the sake of increased diversity when mapped onto the RF signal.

In one example, in a practical scenario, the data Type-2 PLPs 1810, 1812 have more than one sub slice per logical frame, as illustrated. In one example, the sub slices of the PLPs, as well as the auxiliary streams 1814 and dummy cells 1816 may be mapped by the signal processor into the cells of the logical frame as follows:

The logical frame 1800 commences with the L1 POST signaling 1802.

The common PLPs 1804 may be transmitted at the beginning of the logical frame 1800, immediately after the L1-POST Signaling portion 1802.

Data PLPs of Type-1 with some piggy-backed by Data PLPs of Type-4 1806, 1808 may be transmitted after the common PLPs 504.

Data PLPs of Type-2 1810, 1812 are transmitted after the data PLPs of Type-1 and Type-4 1806, 1808.

The auxiliary stream or streams 1814, if any, follow the Data Type-2 1810, 1812, and this can be followed by dummy cells 1816.

Data Type-3 PLP 1817, if any, are transmitted after the dummy cells 1816.

Again, together, the L1-POST signaling, PLPs, auxiliary streams and dummy cells are configured by the signal processor to exactly fill the capacity of the logical frame 1800.

Figure 19:
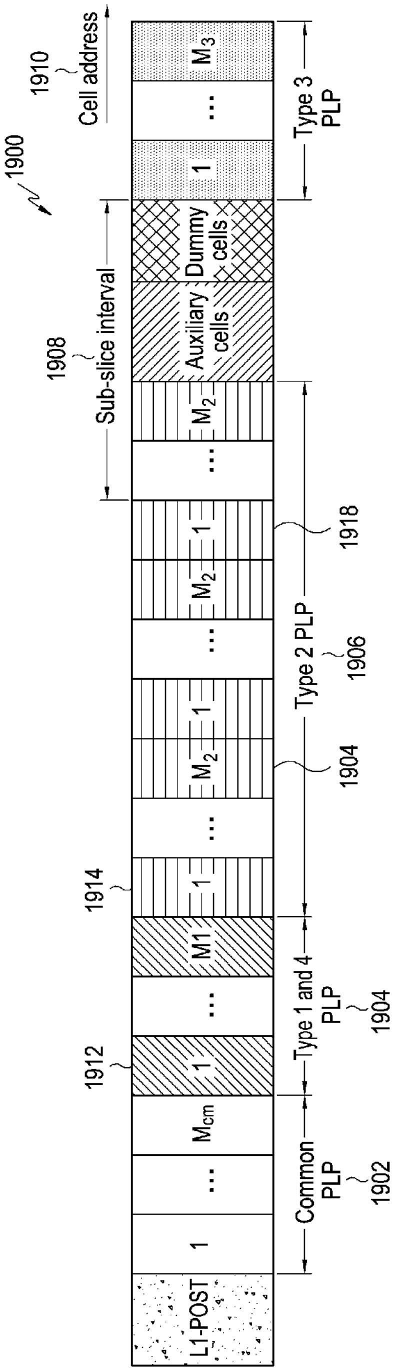
FIG. 19 illustrates one example of a mechanism for mapping PLPs in a logical frame structure with identified frame types according to exemplary some embodiments of the present invention.

Referring now to FIG. 19, one example of a mapping arrangement 1900 is illustrated for mapping PLPs in a logical frame structure 1900 with identified frame types in accordance with some exemplary embodiments of the invention. In the logical frame structure 1900, the cells of the L1-POST signaling are mapped by the signal processor into the first part of the logical frame 1900. The cells of the Common PLPs 1902 may be mapped by the signal processor into the second part of the logical frame 1900 (e.g. they shall have lower cell addresses than for the other types of PLP). The cells of any one Common PLP 1902 for a particular logical frame 1900 may be mapped sequentially into a single contiguous range of cell addresses of the logical frame, in order of increasing address. The cells of a Type-1 PLP 1904, together with a piggy-backing Type-4 PLP, if any, for a particular logical frame 1900 may also be mapped sequentially into a single contiguous range of cell addresses of the logical frame, by the signal processor, in order of increasing address. The cells of all the Type-1 and Type-4 PLPs 1904 may follow after the common PLPs 1902, if any, and before any Type-2 PLPs 1906, auxiliary streams, dummy cells, or Type-3 PLPs, if any. In one example, the cells of a Type-2 PLP 1906 for a particular logical frame 1900 may also be divided into a number of sub-slices, each sub-slice included in a sub-slice interval 1908 for all Type-2 PLPs, as illustrated. Each sub slice 1916 of a PLP may be mapped by the signal processor to a contiguous range of cell addresses of the logical frame 1900, in order of increasing address. In one example, the cells of the first sub slice 1914 of the first Type-2 PLP may be configured by the signal processor to start after the last cell of the last Type-1 PLP 1904. These shall be followed by the cells of the first sub slice of the other Type-2 PLPs, followed by the cells 1918 of the second sub slice for each PLP in turn, with the PLPs taken in the same order. This arrangement configured by the signal processor continues until the last sub slice of the last PLP has been mapped.

Figure 20:
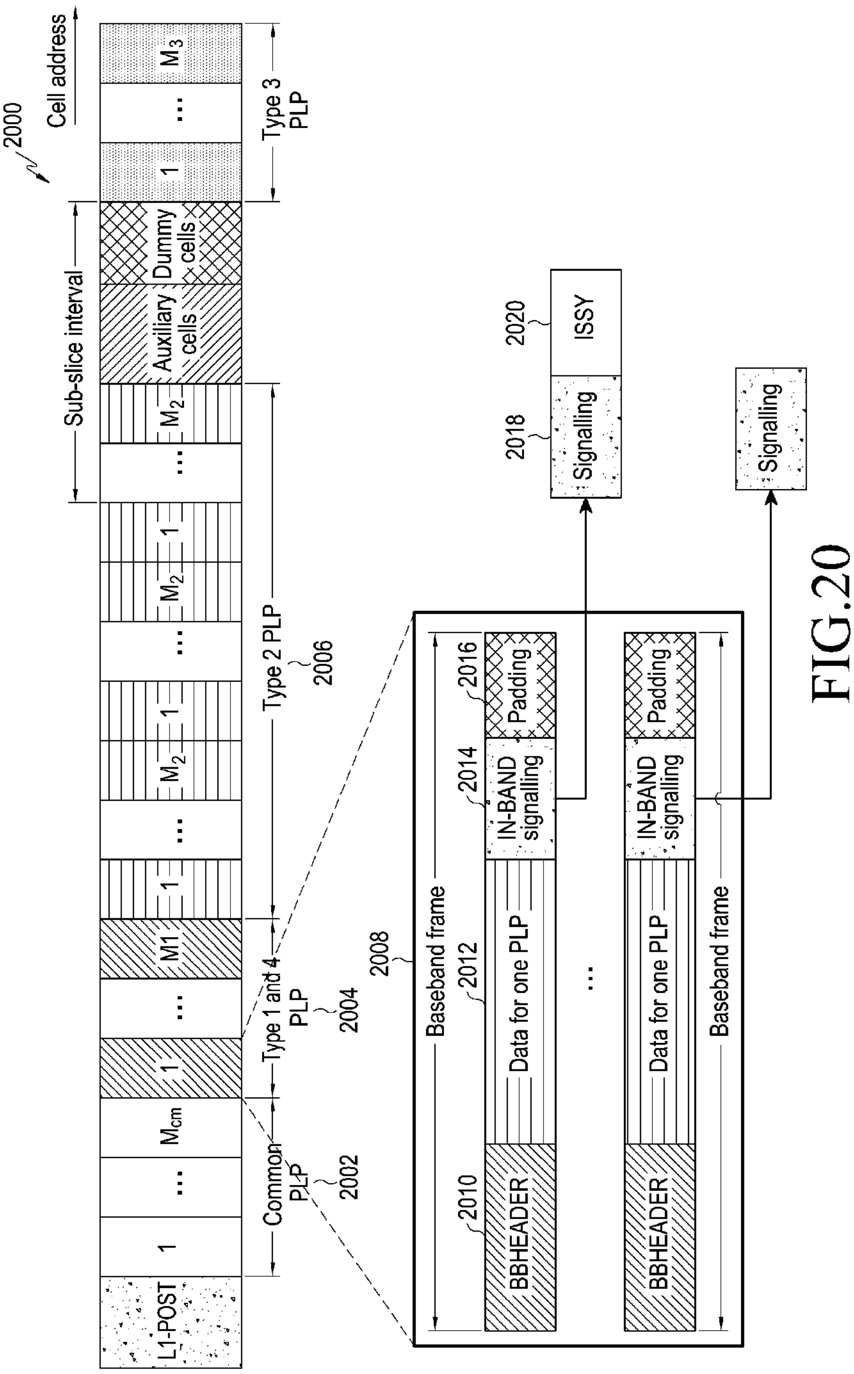
FIG. 20 illustrates one example of a mechanism for incorporating an input stream synchronization field in a logical frame structure according to some exemplary embodiments of the present invention.

FIG. 20 illustrates one example of a logical frame structure 2000 incorporating an Input Stream SYnchronization (ISSY) field 2020 in a logical frame structure according to some exemplary embodiments of the present invention. The example logical frame structure 2000 comprises a L1-POST signaling field followed by the common PLPs 2002, followed by Type-1 and Type-4 PLPs 2004, Type-2 PLPs 2006, auxiliary streams, dummy cells, and Type-3 PLPs. A first Type-1 PLP in the logical frame structure 2000 comprises a plurality of BaseBand (BB) frames 2008. The baseband frames 2008 comprise a BB header field 2010 followed by data for one PLP 2012, in-band signaling 2014 and additional padding 2016. In this example, the in-band signaling 2014 of at least one (e.g. the first) baseband frame comprises a signaling portion 2018 and the ISSY field 2020. Thereafter, the subsequent baseband frames 2008 also comprise a baseband header field 2010 followed by data for one PLP 2012, in-band signaling 2014 (that does not contain an ISSY field 2020) and additional padding 716.

In one example, the illustrated 3-byte ISSY field 2020 may carry the value of a counter clocked at, say, a modulator clock rate 1/T and can be used by the receiver to regenerate the correct timing of the regenerated output stream. In one example, an ISSY field 2020 may be transmitted in the in-band signaling Type-B of at least one (e.g. the first) baseband frame of a given PLP in one logical frame 2000. In the event of multiple associated PLPs in one logical frame 2000, then an ISSY field 2020 may be transmitted in the in-band signaling Type-B of at least one (the first) baseband frame of at least one PLP, say the anchor PLP. In this manner, the logical frame structure 2000 incorporating an Input Stream SYnchronization (ISSY) field 2020 may reduce any signaling overhead, primarily due to the fact that all the data packets for the multiple associated PLPs in one logical frame experience similar delay and/or jitter.

Figure 21:
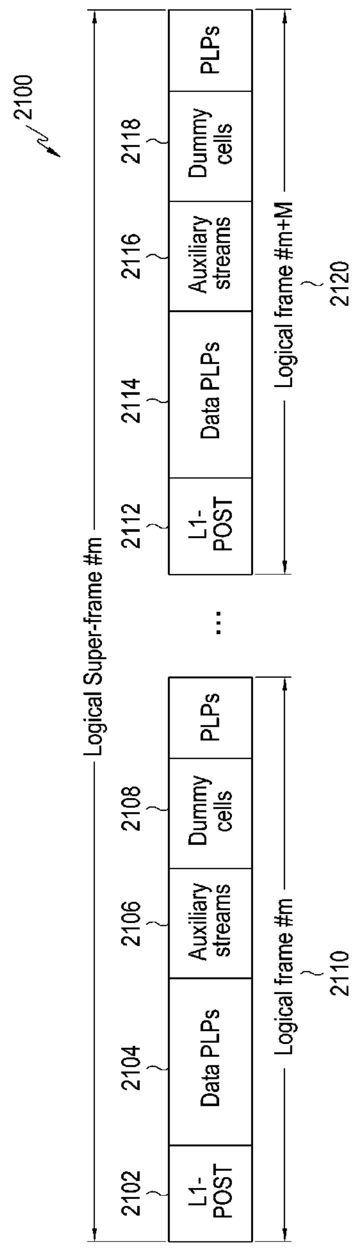
FIG. 21 illustrates one example of a logical super-frame structure according to some exemplary embodiments of the present invention.

FIG. 21 illustrates one example of a logical super-frame structure 2100 according to some exemplary embodiments of the present invention. The number of logical frames #m 2110, 2120 (with only two shown in the simplified example for clarity purposes only) in the example logical super-frame 2100 may be a configurable parameter that is signaled in the configurable signaling (L1-CONF), as configured by the signal processor. In this example, the maximum number of logical frames 2110, 2120 in a given logical super-frame 2100 is equal to '255'.

Typically, an L1-Pre may be transmitted and carry a minimum amount of information about the frame format, thereby resulting in a small overhead. With L1-Pre, the NGH receiver knows the start/end of the NGH physical slot, as well as when the next NGH logical frame is scheduled and its duration.

In one example, all parameters defined in L1-PRE to signal the L1-POST signaling format 2102, 2112, and the configurable part (as compared to the other component of L1-dynamic) of L1-POST (L1-CONF), may be changed by the signal processor only at the border of two logical superframes 2100. It is worth clarifying that the concepts of L1-Pre, L1-configurable and L1-dynamic are only previously known in the context of physical frames.

Thus, in one example, if the receiver receives only the in band Type-A, a counter (such as a counter contained within timer 1618 of FIG. 16) may be configured to indicate the next logical super frame 800 with changes in L1 configurable parameters. In this manner, the receiver may be able to check the new L1-CONF parameters from the L1-POST 2102, 2112 in the first logical frame of the announced logical super-frame 2100, where the change applies.

In some examples, a data PLP 2104, 2114 does not have to be mapped into every logical frame. In such a situation, the data PLP 2104, 2114 may be configured by the signal processor to jump over multiple logical frames 2110, 2120 in the logical super-frame 2100. This frame interval (HUMP) may be determined by the PLP_LF_INTERVAL parameter, and the first logical frame where the data PLP appears is determined by PLP_FIRST_LF_IDX parameter. The parameters PLP_LF_INTERVAL and PLP_FIRST_LF_IDX may be signaled in the configurable signaling L1-CONF. In order to have unique mapping of the data PLPs 2104, 2114 between logical super-frames 2100, the number of logical frames 2110, 2120 per logical super-frame 2100 may be configured by the signal processor to be divisible by a factor of 'PLP_LF_INTERVAL' for every data PLP 2104, 2114. In one example, the data PLPs 2104, 2114 may be mapped by the signal processor to the logical frames 2110, 2120 for which: (LF_IDX−PLP_FIRST_LF_IDX) mod PLP_LF_INTERVAL=0.

In one example, the number of logical frames in a logical super-frame may be chosen by the signal processor so that for every data PLP there is an integer number of Forward Error Correction (FEC) blocks per logical super frame.

One example of L1-CONF may be:

PLP_ANCHOR_FLAG: In one example, this may be a 1 bit field that indicates if the PLP identified by PLP_ID is an anchor PLP for all its associated PLPs. For example, the value '1' may indicate an anchor PLP.

PLP_IN_BAND_A_FLAG: In one example, this may be a 1 bit field indicates whether the current PLP carries in band type A signaling information. In one example, when this field is set to the value '1', the associated PLP carries in band type A signaling information. In one example, when this field is set to the value '0', in band type A signaling information may not be carried. If the value of PLP_ANCHOR_FLAG is set to '0' (i.e. not an anchor PLP), the value of PLP_IN BAND_A_FLAG may then be set to '0'.

PLP_TYPE: In one example, this may be a 3 bit field that may indicate the type of the associated PLP_MODE. PLP_TYPE may be signaled according to Table 4 below:

TABLE 4

| Signaling format for the PLP_TYPE field. | |
|---|---|
| Value | Type |
| 000 | Common PLP |
| 001 | Data PLP Type 1 |
| 010 | Data PLP Type 2 |
| 011 | Data PLP Type 3 |
| 100 | Data PLP Type 4 |
| 101 to 111 | May be reserved for future use |

PLP_ISSY_MODE: In one example, this may be a 2-bit field that may indicate whether an ISSY-BF, ISSY-LF, or ISSY-UP mode is used for the given PLP. The mode may be signaled according to Table 5 below:

TABLE 5

| Signaling format for the PLP_ISSY_MODE | |
|---|---|
| Value | PLP mode |
| 00 | ISSY-BF mode |
| 01 | ISSY-LF mode |
| 10 | ISSY-UP mode |
| 11 | Reserved for future use |

IN-BAND TYPE A

L1_POST_DELTA: In one example, this may be a 24-bit field that may indicate the gap, in QAM cells, between the last cell carrying L1-PRE signaling and the first cell of the first logical frame starting in the current NGH frame. The value (HEX) FFFFFF means that no new logical frame starts in the current NGH frame.

LC_NEXT_FRAME_DELTA: In one example, this may be a 24 bit field that may indicate the relative timing in T periods between the current NGH frame and the next NGH frame that carries the current logical channel.

PLP_RF_IDX_NEXT: For LC type D PLPs, in one example, this may be a 3-bit field that may indicate the RF frequency of the current PLP in the one after the next logical frame (n+2) where the PLP occurs. The value may be interpreted according to the LC_CURRENT_FRAME_RF_IDX of L1-PRE. For LC types A, B and C this field may be reserved for future use.

Figure 22:
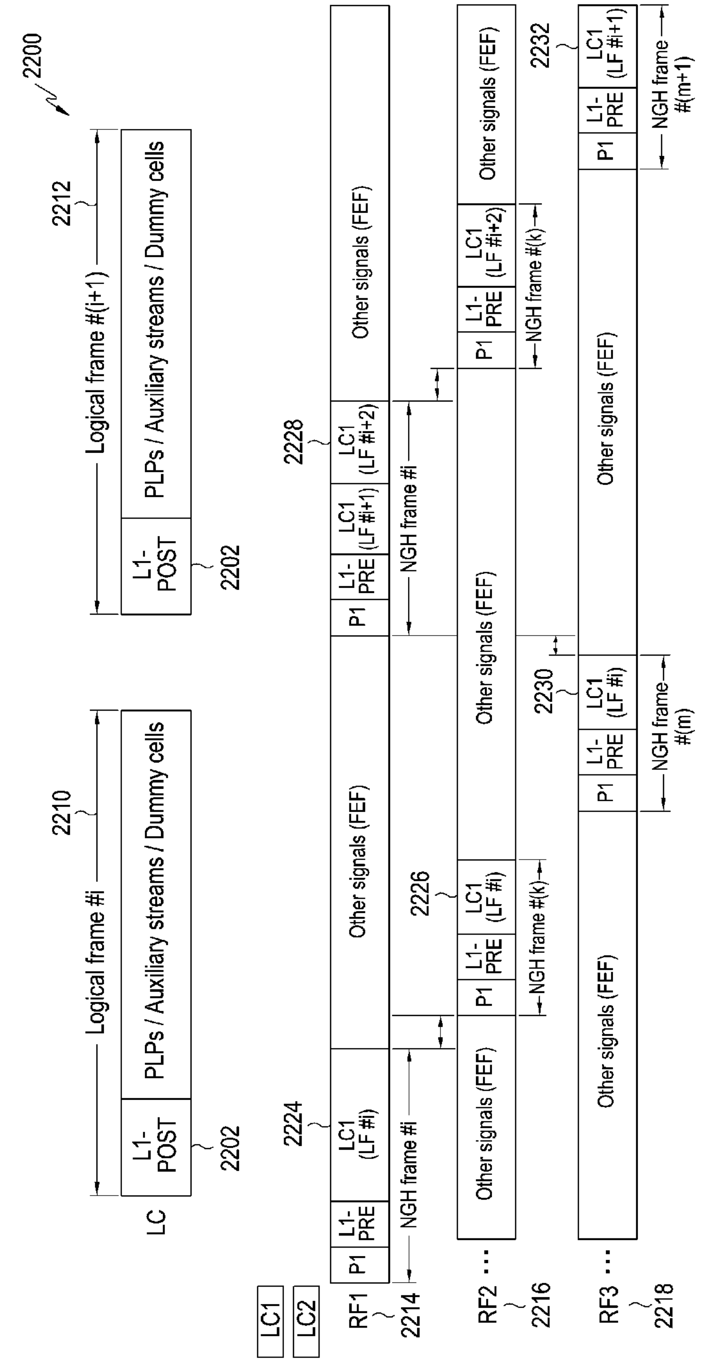
FIG. 22 illustrates one example of a logical channel structure comprising a sequence of logical frames according to some exemplary embodiments of the present invention.

FIG. 22 illustrates one example of a logical channel structure 2200 comprising a sequence of logical frames 2210, 2212 according to some exemplary embodiments of the present invention.

However, in this example, a Logical Channel (LC) 2200 is defined as a sequence of logical frames 2210, 212, each starting with L1-POST signaling 2202. In this example, the LC 2200 may be transmitted over a pattern of '1' to 'N' RF frequencies available in the network (with only three RF frequencies, RF1 2214, RF2 2216, RF3 2218 shown in the simplified example for clarity purposes only). There may be a number M of logical channels in one transport stream in the network.

Four types of logical channels are defined, namely, Type A, Type B, Type C, and Type D that dictate mapping on to physical frames.

Thus, the logical channels can be arranged in groups, where it may (and sometimes always) be possible to receive all logical channel members of a group with a single receive tuner, thereby allowing, say, receiver 1600 to decode both logical channels.

Each group of logical channels is identified by a unique identifier LC_GROUP_ID.

In the illustrated example, the first Logical Channel (LC1) 2224, 2226, 2228 and the second Logical Channel (LC2) 2230, 2232 belong to the same group, with LC1 2224, 2226, 2228 being configured as Type-C and LC2 being configured as Type-A. Of note is that the signal processor (in the transmit side) has constructed the logical channels with zero overlap in the time domain.

Figure 23:
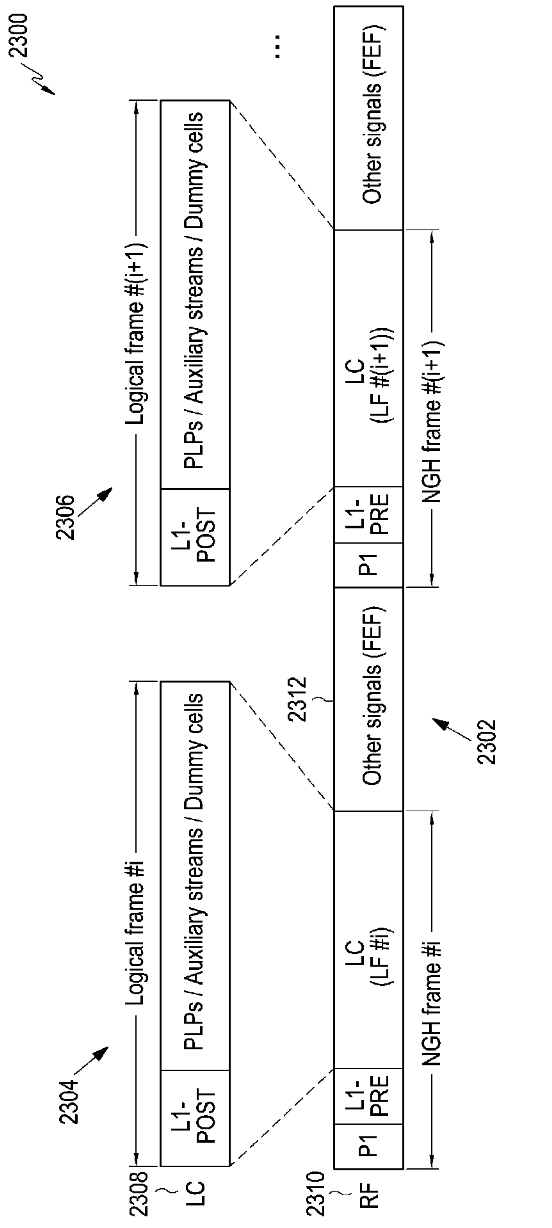
FIG. 23 illustrates one example of a logical channel Type-A structure comprising a sequence of logical frames according to some exemplary embodiments of the present invention.

FIG. 23 illustrates one example of a logical channel Type-A structure 2300 comprising a sequence of logical frames according to some exemplary embodiments of the present invention.

Referring to FIG. 23, in one example, a Logical Channel (LC) Type-A is configured by the signal processor to correspond to a case whereby each logical frame, LF, 2304, 2306 of the logical channel 2308 is mapped to one physical DVB-NGH frame 2310 on a single RF channel 2302. Thus, in this manner, each physical DVB-NGH frame 2310 may be configured by the signal processor to contain cells from only one logical frame 2304, 2306 of the logical channel 2308. All physical frames that carry the logical frames 2304, 2306 of a given logical channel 2308 may be configured by the signal processor to have the same length and the same L1-PRE signaling, except for example the Frame Index Number (FRAME_IDX). In this manner, a 1:1 mapping of logical frames to physical DVB-NGH frames can be achieved. Of note is that the Future Extension Field (FEF) 2312 in the logical channel Type-A structure 2300 is a FEF of DVB-NGH and not that of a DVB-T2 system.

Thus, in the illustrated example in FIG. 23, the LC 2308 of Type A is mapped to all cells of one LF 2304, which are carried in one physical frame 2310, with the same physical frame 2310 being subsequently used to carry the all cells of a second LF 2306 (from the same LC 2308 of Type A).

For a logical channel Type-A, each logical frame is synchronized to one physical frame in such a way that the first logical frame cell is mapped to the first physical frame data cell (lowest data cell address in the physical frame) and the last logical frame cell is mapped to the last physical frame data cell (highest data cell address in the physical frame). All logical frames are carried on a single RF frequency. A sequence of logical frames is therefore carried on a sequence of physical frames, with exactly one logical frame per physical frame carrying the given logical channel.

Figure 24:
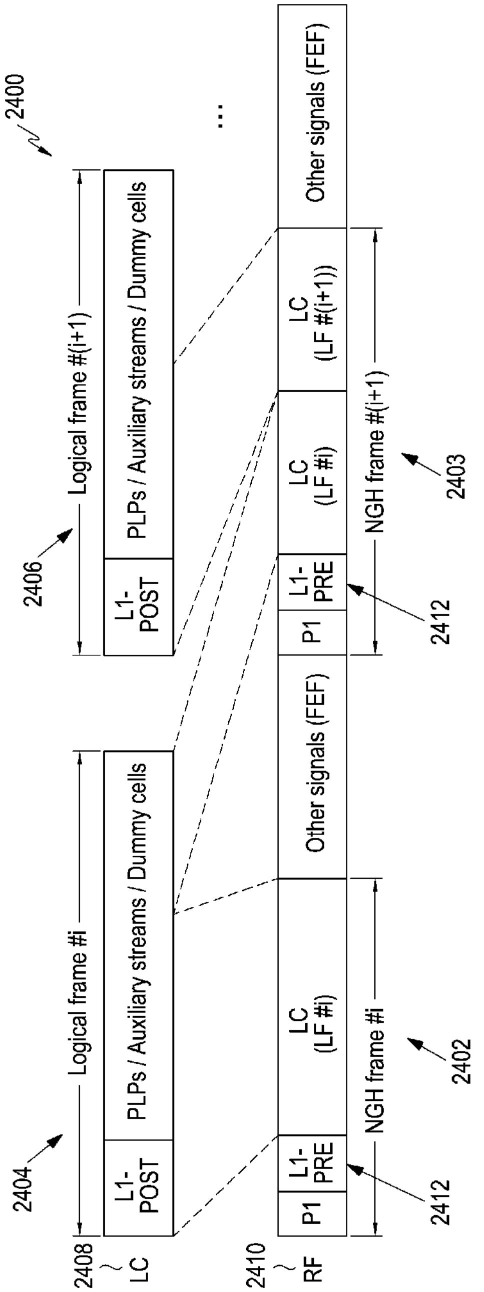
FIG. 24 illustrates one example of a logical channel Type-B structure comprising a sequence of logical frames according to some exemplary embodiments of the present invention.

FIG. 24 illustrates one example of a logical channel Type-B structure 1100 comprising a sequence of logical frames according to some exemplary embodiments of the present invention.

Referring now to FIG. 24, in one example, a logical channel Type-B is configured by the signal processor to correspond to a case whereby each logical frame 2404, 2406 of the Logical Channel (LC) 1108 is mapped to multiple (N) DVB-NGH physical frames 2402, 2403 on a single RF channel 2410. In this example, the signal processor has arranged for the physical frames to be of equal length. In this example, the signal processor has arranged for each logical frame to therefore map in parts onto multiple DVB-NGH physical frames 2402, 2403 on the same RF channel 2410, and hence each DVB-NGH physical frame 2402, 2403 may contain cells from multiple logical frames 2404, 2406 of the same logical channel 2408. In this example, the signal processor may configure all DVB-NGH physical frames to have the same L1-PRE signaling 2412, which in one example may preclude the fields L1_POST_DELTA, and FRAME_IDX. Thus, in this example, one logical frame may be time-multiplexed into two or more DVB-NGH physical frames.

For a logical channel Type-B, the stream of logical frame cells is mapped to the stream of physical frame data cells in such a way that the first cell of a logical frame is mapped to any of the data cells in a physical frame. A cell of the logical frame stream that appears P cells later than the mentioned first cell shall be mapped to a physical frame stream cell that appears P cells later than the physical frame cell to which the mentioned first logical frame was mapped. If the logical frame is not completed in the current physical frame it continues on the following physical frame of the same logical channel from the first data cell of that physical frame. If the logical frame is completed in the current physical frame the following logical frame of the same logical channel starts immediately after without any gap. All logical frames are carried on a single RF frequency. Logical channel type B is a superset of logical channel type A, which it includes as a special case.

Figure 25:
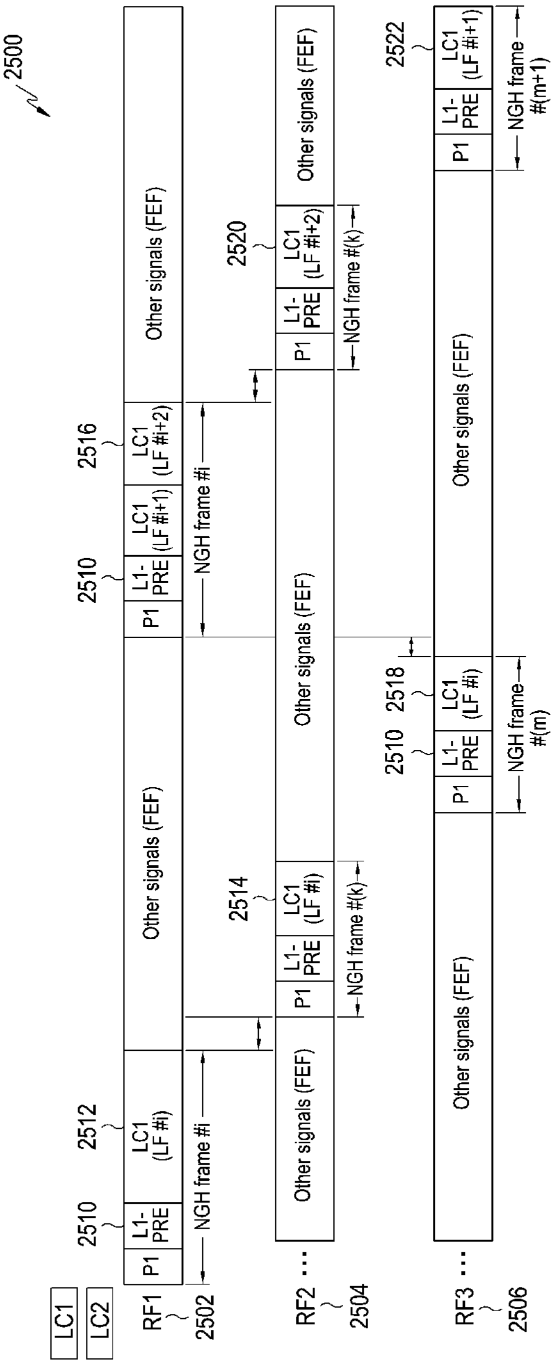
FIG. 25 illustrates one example of a logical channel Type-C structure comprising a sequence of logical frames according to some exemplary embodiments of the present invention.

FIG. 25 illustrates one example of a logical channel Type-C structure 2500 comprising a sequence of logical frames according to some exemplary embodiments of the present invention.

Referring now to FIG. 25, a logical channel Type-C 2500 is configured by the signal processor to correspond to a case whereby each logical frame of a first logical channel 2512, 2514, 2516 and each logical frame of a second logical channel 2518, 2520, and 2522 is mapped to multiple (N) physical DVB-NGH frames on Multiple (M) RF channels RF1 2502, RF2 2504, and RF3 2506. In one example, the physical DVB-NGH frames from different RF channels 2502, 2504, and 2506 may be separated by the signal processor in time to allow for reception with one single tuner (not shown). In one illustrated example, the physical DVB-NGH frames from different RF channels 2502, 2504, and 2506 may be configured by the signal processor to be of different lengths.

In this example, each logical frame may therefore map in parts onto multiple DVB-NGH physical frames on Multiple (M) RF channels 2502, 2504, and 2506, and hence each physical DVB-NGH frame may contain cells from multiple logical frames of the same logical channel.

In one example, all physical DVB-NGH frames may be configured by the signal processor to have the same L1-PRE signaling 2510, which in one example may preclude the fields L1_POST_DELTA, LC_CURRENT_FRAME_POSITION, LC_CURRENT_FRAME_RF_IDX, LC_NEXT_FRAME_RF_IDX, and FRAME_IDX.

Thus, in the illustrated example, a first Logical Channel (LC1) and a second Logical Channel (LC2) are both of Type-C, and may be members of the same LC group. In the illustrated example, LC1 is first sent in the first RF channel, RF1, 2502, then the second RF channel, RF2, 2504 and then the first RF channel, RF1 2502 again. This process is repeated.

In the illustrated example, LC2 is first sent in the third RF channel, RF3 2506, then the second RF channel, RF2 2504 and then the third RF channel, RF3 2506 again. This process is also repeated. In this manner, each logical channel has its own ‘cycle and its own frequency set that is used. Of note in FIG. 25 is that the (transmit) signal processor leaves a time gap for the receiver to switch between different RF channels, hence using both time and frequency multiplexing of signals.

For a logical channel Type-C, the logical frames are mapped in the same way as for logical channels type B, except that the physical frames used to carry the logical channel may be transmitted on different RF frequencies and that successive physical frames using different RF frequencies need to be time separated. Logical channel type C is a superset of logical channel type B, which it includes as a special case.

Figure 26:
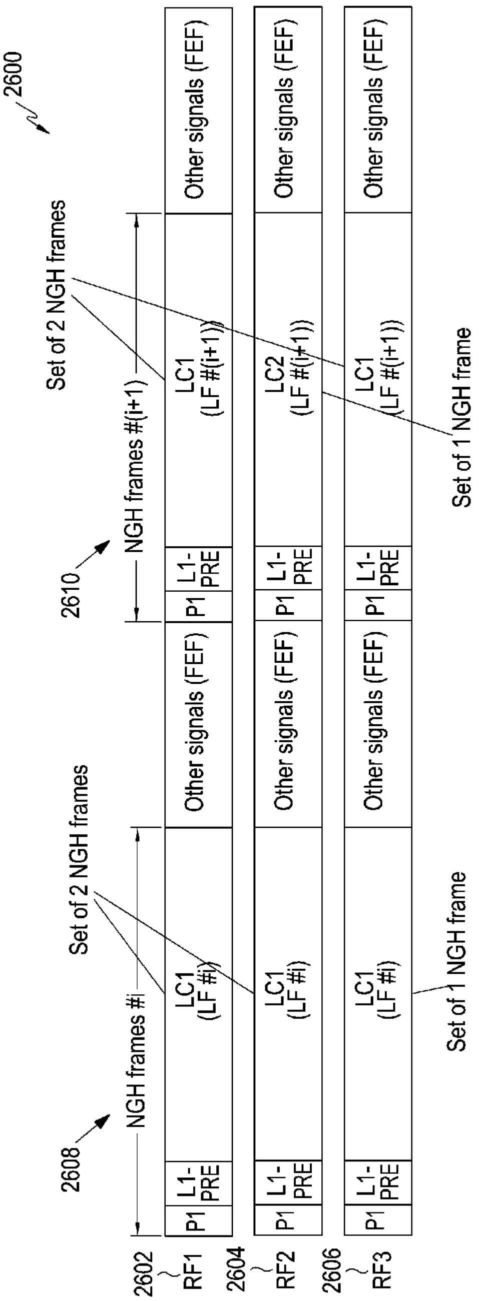
FIG. 26 illustrates one example of a logical channel Type-D structure comprising a sequence of logical frames according to some exemplary embodiments of the present invention.

FIG. 26 illustrates one example of a logical channel Type-D structure 2600 comprising a sequence of logical frames 2608, 2610 according to some exemplary embodiments of the present invention.

Referring now to FIG. 26, in the example, a logical channel Type-D is configured by the signal processor to correspond to a case whereby each logical frame of the logical channel is mapped one-to-one to multiple (N) physical DVB-NGH frames (with only three physical DVB-NGH frames at a time 2608, 2610 shown in the simplified example for clarity purposes only) on multiple (N) RF frequencies (with only three RF frequencies 2602, 2604 and 2606 shown in the simplified example for clarity purposes only). The physical DVB-NGH frames 2608, 2610 may be configured by the signal processor to be of equal-length and time-synchronized. In this manner, the time synchronization may ensure that the preamble P1 symbol of each of the physical DVB-NGH frames 2608, 2610, carries the logical channel, using the same frame index and shall start at the same time. In one example, physical DVB-NGH frame 2608, 2610 may be configured by the signal processor to contain cells from only one logical frame, whereby in one example each logical frame may be configured to be available on all simultaneous physical frames. In this example, therefore, one logical frame is mapped on to a set of physical DVB-NGH frames time synchronized, each mapped on to one RF channel.

A logical frame of a logical channel Type-D is arranged in a single logical frame matrix, with LC_NUM/RF columns and LC_LF_SIZE/LC_NUM_RF rows. The parameters LC_NUM_RF and LC_LF_SIZE are provided in L1-PRE signaling, and may represent respectively the number of RF frequencies and the size in cells of one logical frame for the given logical channel. Each logical frame of a logical channel Type-D is synchronized to one set of parallel physical frames, with one physical frame per RF frequency, in such a way that each column of the logical frame is mapped to the cells of its corresponding RF frequency with the first cell of the logical frame mapped to the first physical frame data cell (lowest data cell address in the physical frame) and the last logical frame cell mapped to the last physical frame data cell (highest data cell address in the physical frame). A sequence of logical frames is therefore carried in a sequence of sets of physical frames, with exactly one logical frame per each set of physical frames, and one physical frame per RF frequency. The set of RF frequencies that are used to carry a given logical Type-D is configurable.

FIGS. 27A and 27B illustrate one example table of a L1-Pre signaling field in a logical channel structure 2700 according to some exemplary embodiments of the present invention.

Referring now to FIGS. 27A and 27B, in this example, all time synchronized physical frames may be configured to have the same L1-PRE signaling, except for the aforementioned fields. A number of new fields contained within the example table of a L1-Pre signaling field in a logical channel structure 2700 are introduced by the signal processor:

L1_POST_DELTA: In one example, this may be a 24-bit field that indicates a gap, in QAM cells, between the last cell carrying L1-PRE signaling and the first cell of the first logical frame starting in the current NGH frame. The value (HEX) FFFFFF may be configured to mean that no new logical frame starts in the current NGH frame.

LC_GROUP_ID: In one example, this may be a 2 bit field that provides an IDentifier (ID) of the group of logical channels the current logical channel (carried in the current NGH frame) belongs to. In some examples, it may be possible to receive with a single tuner all the logical channels member of a logical channel group.

LC_NUM: In one example, this may be a 3 bit field that indicates a total number of logical channels member(s) of the current LC group (i.e. which ID is given by LC_GROUP_ID) which may be carried in the current NGH frame. In one example, the minimum value of LC_NUM may be set to equal '1'.

LC_ID: In one example, this may be a 3 bit field that indicates an identifier (ID) of the current logical channel carried in the current DVB-NGH frame. In one example, the value of LC_ID may be configured to range from '0' to 'LC_NUM-1'.

LC_TYPE: In one example, this may be a 3 bit field indicates the type of the current logical channel carried in the current NGH frame.

LC_NUM_RF: In one example, this may be a 3 bit field indicates NRF, the number of RF channels used by the current logical channel. The frequencies may be listed within the configurable parameters of the L1-POST signaling.

LC_CURRENT_FRAME_RF_POS: In one example, this may be a 3 bit field that indicates the position of the RF channel of the current DVB-NGH frame in the cycle of RF channels used by the current logical channel.

LC_CURRENT_FRAME_RF_IDX: In one example, this may be a 3 bit field that indicates an index of the RF channel of the current DVB-NGH frame used to carry the current logical channel.

LC_NEXT_FRAME_RF_IDX: In one example, this may be a 3 bit field that indicates an index of the RF channel of the next DVB-NGH frame used to carry the current logical channel.

LC_NEXT_FRAME_DELTA: In one example, this may be a 24 bit field that indicates a relative timing in T periods between the current NGH frame and the next NGH frame that carries the current logical channel.

FIG. 28 illustrates one example table of logical channel types (LC-Types) 2800 according to the exemplary embodiments of the present invention as introduced by the signal processor.

Referring now to FIG. 28,

LC_TYPE-A 2802: In one example, this may be a 3 bit field that indicates a logical channel that is carried on a single RF channel. Each logical frame of the logical channel is carried in one NGH frame. This is the case when bundling is not used either in the time or frequency domains.

LC_TYPE-B 2804: In one example, this may be a 3 bit field that indicates a logical channel that is carried on a single RF channel. Each logical frame of the logical channel may be carried in one or more NGH frames. This is the case when bundling is used in the time domain (e.g. across the NGH frames on a single RF channel).

LC_TYPE-C 2806: In one example, this may be a 3 bit field that indicates a logical channel may be carried on one or more RF channels. Each logical frame of the logical channel may be carried in one or more NGH frames on one or more RF channels. This is the case when bundling is used in the time and frequency domains (i.e. across the NGH frames in the time domain on multiple RF channels).

LC_TYPE-D 2808: In one example, this may be a 3 bit field that indicates a logical channel may be carried on one or more RF channels. Each logical frame of the logical channel may be carried in one set of parallel and time-synchronized NGH frames, with one NGH frame per RF frequency. This is the case when Time Frequency Slicing (TFS) is used (i.e. across a set of time-synchronized NGH frames, each on a different RF frequency).

As illustrated, other available bit patterns may be reserved for future use 2810.

Figure 29:
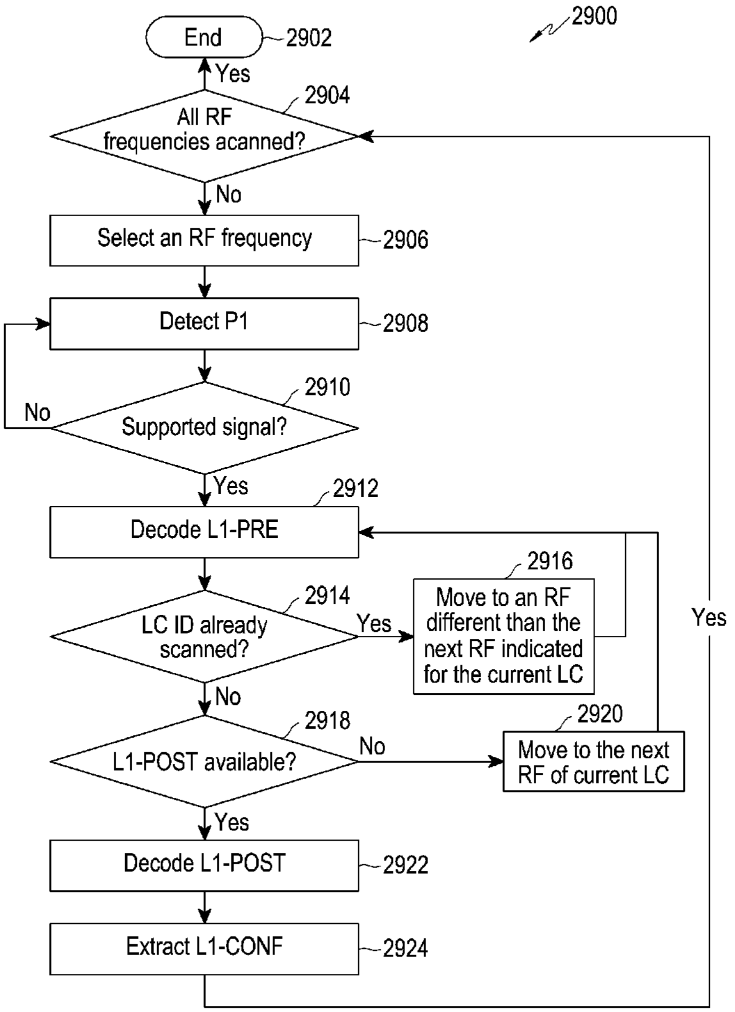
FIG. 29 illustrates one example flowchart of an initial scanning operation of a receiver receiving a logical channel according to some exemplary embodiments of the present invention.

FIG. 29 illustrates one example flowchart of an initial scanning operation 2900 of a receiver receiving a logical channel according to some exemplary embodiments of the present invention.

Referring now to FIG. 29, the signal processor, say signal processor 1250, 1252 of FIG. 16, determines at 2904 whether all RF frequencies have been scanned. If all RF frequencies have not been scanned in 2904, the signal processor 1250, 1252 selects an RF frequency at 2906. The signal processor 1250, 1252 then detects P1 at 2908, and determines whether the selected RF frequency from 1606 is a supported signal at 2910. If the signal is supported, the signal processor 1250, 1252 decodes L1-PRE 2912. Otherwise, If the signal is not supported, the signal processor returns to 2908 and detects P1. Once L1-PRE has been decoded at 2912, the signal processor 1250, 1252 determines whether LC ID has already been scanned at 2914. If the LC ID has already been scanned at 2914, the signal processor 1250, 1252 moves to an RF different than the next RF indicated for the current LC at 2916, before returning to 2912 to decode L1-PRE. If the LC ID has not already been scanned in 1614, the signal processor 1250, 1252 determines whether L1-POST is available at 1618.

If L1-POST is not available in 2918, the signal processor 1250, 1252 moves to the next RF of the current LC in 2920, and returns to 2912 to decode L1-PRE. If L1-POST is available, the signal processor 1250, 1252 decodes L1-POST 2922, and extracts L1-CONF at 2924 before returning to 2904 to determine if all RF frequencies have been scanned. If all RF frequencies have been scanned, the signal processor 1250, 1252 ends the initial scanning operation at 2902.

Thus, in this manner during the initial scanning phase, the receiver is able to acquire the frequency hopping pattern used by each LC (the RF channels used by each LC, and the pattern and cycle of repetition, the order, indexes, center frequencies, etc. in 2924).

Figure 30:
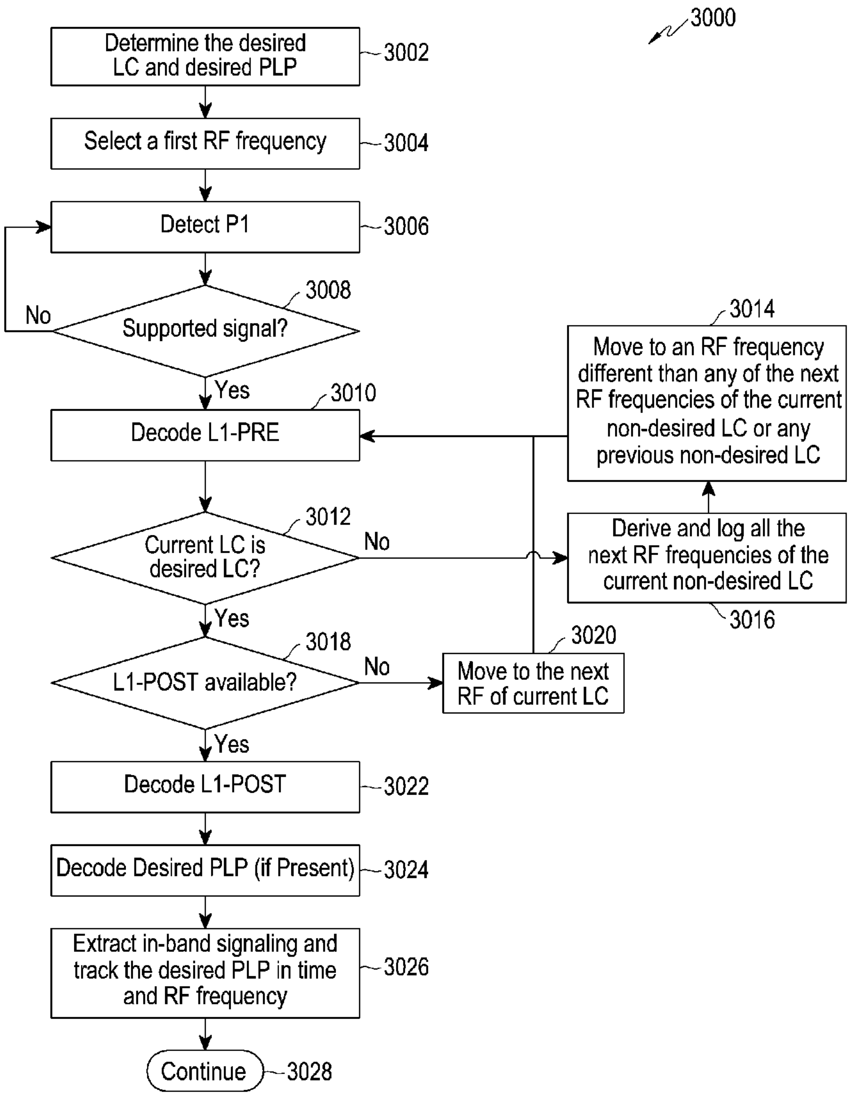
FIG. 30 illustrates one example flowchart of a normal continuous reception operation of a receiver receiving a logical channel according to some exemplary embodiments of the present invention.

FIG. 30 illustrates one example flowchart of a normal reception operation 3000 of a receiver receiving a logical channel according to some exemplary embodiments of the present invention.

Referring now to FIG. 30, The signal processor, say signal processor 1250, 1252 of FIG. 16, determines, at 3002, the desired LC and PLP. The signal processor 1250, 1252 then selects a first RF frequency at 3004, before detecting P1 at 3006. The signal processor 1250, 1252 then determines whether (or not) the signal is supported at 3008. If the signal is not supported in 3008, the signal processor 1250, 1252 returns to 3006 and detects P1 again. If the signal is supported in 3008, the signal processor 1250, 1252 decodes L1-PRE field at 3010. At 3012 the signal processor 1250, 1252 determines whether (or not) the current LC is the desired LC. If the current LC is not the desired LC at 3012, the signal processor 1250,1252 then derives and logs all the next RF frequencies of the current non-desired LC at 3016, and moves to an RF frequency different than any of the next RF frequencies of the current non-desired LC or any previous non-desired LC at 3014, before returning to 3110 to decode L1-PRE.

If the current LC is the desired LC at 3012, the signal processor 1250, 1252 then determines whether (or not) L1-POST is available at 3018. If L1-POST is not available, the signal processor 1250, 1252 moves to the next RF channel of the current LC at 3020 before returning to 3010 to decode L1-PRE.

If L1-POST is available at 3018, the signal processor 1250, 1252 then decodes L1-POST at 3022 and decodes the desired PLP, if present, at 3024. The signal processor 1250, 1252 then extracts in-band signaling and tracks the desired PLP in time and frequency at 3026, before continuing to 3028.

Thus, during this continuous reception phase, the receiver does not need to decode L1-PRE and parse it in every NGH frame, as it is able to locate the LFs of the desired LC. The L1-PRE signaling related to LC and mapping of its LF onto NGH frames advantageously allows for faster acquisition at the initial scanning phase and initial reception phase.

One example of the signaling field of the configurable L1-POST signaling (L1-CONF) is illustrated below in Table 6:

TABLE 6

| | |
|---|---|
| OPTIONS_FLAG | 8 |
| NUM_STREAMS | 8 |
| NUM_PLP_MODES | 8 |
| NUM_PLP_PER_LSF | 8 |
| NUM_PLP_PER_LF | 8 |
| LC_NUM_LF | 8 |
| LC_LF_SIZE | 22 |
| IF OPTIONS_FLAG="xx1xxxxx"{ | |
| PARTITION_CYCLE_LENGTH | 4 |
| PARTITION_NUM_ADD_PLP | 4 |
| } | |
| IF OPTIONS_FLAG="xxxxxxx1"{ | |
| SUB_SLICES | 15 |
| } | |
| for i=0..LC_NUM_RF−1{ | |
| LC_RF_IDX | 3 |
| LC_RF_POS | 8 |
| FREQUENCY | 32 |
| } | |
| for i=0..NUM_PLP_PER_LF{ | |
| PLP_ID | 8 |
| STREAM_ID | 8 |
| PLP_MODE_ID | 6 |
| PLP_ANCHOR_FLAG | 1 |
| PLP_IN_BAND_A_FLAG | 1 |
| PLP_GROUP_ID | 8 |
| PLP_FIRST_LF_IDX | 8 |
| PLP_LF_INTERVAL | 8 |
| IF PLP_TYPE="011" { | |
| REUSE_FACTOR | 4 |
| REUSE_ID | 4 |
| } | |
| IF PLP_TYPE="100" { | |
| ALPHA | 3 |
| REUSE_FACTOR | 3 |
| REUSE_SNUM | 3 |
| NATIONAL_PLP_ID | 8 |
| } | |
| IF OPTIONS_FLAG="xxxxx1xx"{ | |
| RESERVED_1 | 8 |
| } | |
| IF OPTIONS_FLAG="xx1xxxxx"{ | |
| PLP_PARTITION_CLUSTER_ID | 2 |
| } | |
| } | |
| IF OPTIONS_FLAG="xx1xxxxx"{ | |
| for i=0..PARTITION_NUM_ADD_PLP{ | |
| RESERVED_2 | 48 |
| IF OPTIONS_FLAG="xxxxx1xx"{ | |
| RESERVED_3 | 8 |
| } | |
| PLP_PARTITION_CLUSTER_ID | 2 |
| } | |
| } | |
| for i=0..NUM_PLP_MODE−1{ | |
| PLP_MODE_ID | 6 |
| PLP_TYPE | 6 |
| PLP_PAYLOAD_TYPE | 8 |
| PLP_NPDI | 1 |
| PLP_ISSY_MODE | 2 |
| PLP_FEC_TYPE | 2 |
| PLP_COD | 4 |
| PLP_ROTATION | 1 |
| PLP_NON_UNIFORM_CONST | 1 |
| IF S1 = "111" and S2 = "000x" or "011x" { | |
| PLP_MIMO_TYPE | 4 |
| IF PLP_MIMO_TYPE = "0001" or "0010" { | |
| PLP_NUM_BITS_PER_CHANNEL_USE | 3 |
| } | |
| ELSE { | |
| PLP_MOD | 3 |
| } | |
| } | |
| ELSE { | |
| PLP_MOD | 3 |
| } | |
| PLP_NUM_BLOCKS_MAX | 10 |
| TIME_IL_LENGTH | 8 |
| TIME_IL_TYPE | 1 |
| IF S1 = "111" and S2 = "001x" or "0x0x" { | |
| TIME_IL_LATE_LENGTH | 3 |
| NUM_ADD_IUS_PER_LATE_FRAME | 4 |
| } | |
| } | |
| IF OPTIONS_FLAG="xxxxxx1x"{ | |
| NUM_AUX | 4 |
| AUX_CONFIG_RFU | 8 |
| for i=0..NUM_AUX−1{ | |
| AUX_STREAM_TYPE | 4 |
| AUX_PRIVATE_CONF | 28 |
| } | |
| } | |
| RESERVED_5 | 8 |

A number of new fields contained within the example table of a L1-CONF signaling field in a logical channel structure 2700 are introduced by the signal processor:

LC_NUM_LF: This 8 bit field indicates the number of logical frames in the current logical super frame of the current logical channel. The minimum value of this field shall be '1'.

LC_LF_SIZE: This 22 bit field indicates the size, in QAM cells, of every logical frame in the current logical super frame of the current logical channel.

The following fields appear in the frequency loop:

LC_RF_IDX: This 3 bit field indicates the index of each FREQUENCY listed within this loop. The LC_RF_IDX value is allocated a unique value between 0 and LNC_NUM_RF 1. In the case of frequency bundling or slicing across multiple RF channels (i.e. LC_TYPE='01x' and LC_NUM_RF>1), this field indicates the index of each frequency within the structure of the current logical channel.

LC_RF_POS: This 8 bit field indicates the positions of each FREQUENCY listed within this loop in one cycle of RF channels used to carry the logical frames of the current logical channel. If the current logical channel uses only one single RF channel (i.e. LC_NUM_RF=1), the value of this field shall be equal to '11111111'. A value equal to "1" at the i-th bit position in the sequence of 8 bits representing this field indicates that the RF channel with index given by LC_RF_IDX is used at the i-th position in the cycle of RF channels to carry the logical frames of the current logical channel. The maximum length of one cycle of RF channels to carry the logical frames of a given logical is 8.

FREQUENCY: This 32 bit field indicates the center frequency in Hz of the RF channel whose index is LC_RF_IDX. The order of the frequencies within the logical channel structure is indicated by the LC_RF_IDX. The value of FREQUENCY may be set to '0', meaning that the frequency is not known at the time of constructing the signal. If this field is set to 0, it shall not be interpreted as a frequency by a receiver.

The FREQUENCY fields can be used by a receiver to assist in finding the signals which form a part of the logical channel structure when multiple RF channels are used (i.e. LC_TYPE='01x' and LC_NUM_RF>1). Since the value will usually be set at a main transmitter but not modified at a transposer, the accuracy of this field shall not be relied upon.

PLP_FIRST_LF_IDX: This 8 bit field indicates the index of the first logical frame of the logical super-frame which carries the current PLP. The value of PLP_FIRST_LF_IDX shall be less than the value of PLP_LF_INTERVAL.

PLP_LF_INTERVAL: This 8 bit field indicates the interval (HUMP) in a number of logical frames between any two logical frames carrying cells from the corresponding PLP within the logical super frame. For PLPs which do not appear in every logical frame of the logical super frame, the value of this field shall equal the interval between successive logical frames. For example, if a PLP appears on logical frames 1, 4, 7 etc., this field would be set to '3'. For PLPs which appear in every logical frame, this field shall be set to '1'.

One example of the signaling field of the dynamic L1-POST signaling (L1-DYN) is illustrated below in Table 7:

TABLE 7

| | |
|---|---|
| LF_IDX | 8 |
| IF OPTIONS_FLAG="xxxxxxx1"{ | |
| SUB_SLICE_INTERVAL | 22 |
| } | |
| TYPE_2_START | 22 |
| L1CONF_CHANGE_COUNTER | 8 |
| RESERVED_1 | 8 |
| for i=0..NUM_PLP_PER_LSF−1{ | |
| PLP_RF_IDX_NEXT | 3 |
| for j=0..TIME_IL_LENGTH−1{ | 8 |
| PLP_NUM_BLOCKS | 8 |
| IF OPTIONS_FLAG="xxx1xxxx"{ | |
| RESERVED_2 | 8 |
| } | |
| } | |
| } | |
| IF OPTIONS_FLAG="xxxxxx1x"{ | |
| for i=0..NUM_AUX−1{ | |
| AUX_RFU | 48 |
| } | |
| } | |
| RESERVED_3 | 8 |

A number of new fields contained within the example table of a L1-DYN signaling field in a logical channel structure 2700 are introduced by the signal processor:

LF_IDX: This 8 bit field is the index of the current logical frame within the current logical super frame. The index of the first logical frame of the logical super frame shall be set to '0'.

In some examples, some or all of the steps illustrated in the flowcharts may be implemented in hardware and/or some or all of the steps illustrated in the flowchart may be implemented in software. One example of the signaling field of the in-band signaling Type-A is illustrated below in Table 8:

TABLE 8

| Field | Size |
|---|---|
| PADDING_TYPE ('00') | 2 bits |
| PLP_L1_CHANGE_COUNTER | 8 bits |
| RESERVED_1 | 8 bits |
| L1_POST_DELTA | 24 bits |
| LC_NEXT_FRAME_DELTA | 24 bits |
| CURRENT_PLP_SUB_SLICE_INTERVAL | 22 bits |
| CURRENT_PLP_START_RF_IDX | 3 bits |
| CURRENT_PLP_START | 22 bits |
| CURRENT_PLP_NUM_BLOCKS | 10 bits |
| NUM_ASSOC_PLP | 2 bits |
| For i=0..NUM_ASSOC_PLP−1 { | |
| PLP_ID | 8 bits |
| PLP_START | 22 bits |
| PLP_NUM_BLOCKS | 10 bits |

TABLE 8-continued

| Field | Size |
|---|---|
| RESERVED_2 | 8 bits |
| } | |
| IF LC_TYPE = "011"{ | |
| For j=0..NUM_PLP_PER_LF−1 { | |
| RF_IDX | 3 bits |
| } | |
| } | |
| NUM_OTHER_PLP_IN_BAND | 8 bits |
| For i=0..NUM_OTHER_PLP_IN_BAND−1 { | |
| PLP_SUB_SLICE_INTERVAL | 22 bits |
| PLP_START_RF_IDX | 3 bits |
| For j=0..MAX_TIME_IL_LENGTH−1 { | |
| PLP_ID | 8 bits |
| PLP_START | 22 bits |
| PLP_NUM_BLOCKS | 10 bits |
| PLP_ANCHOR_FLAG | 1 bit |
| } | |
| RESERVED_3 | 8 bits |
| } | |
| For j=0..MAX_TIME_IL_LENGTH−1 { | |
| TYPE_2_START | 22 bits |
| } | |

L1_POST_DELTA: This 24-bit field indicates the gap, in QAM cells, between the last cell carrying L1-PRE signaling and the first cell of the first logical frame starting in the current NGH frame. The value (HEX) FFFFFF means that no new logical frame starts in the current NGH frame.

LC_NEXT_FRAME_DELTA: This 24 bit field indicates the relative timing in T periods between the current NGH frame and the next NGH frame which carries the current logical channel.

PLP_RF_IDX_NEXT: For LC type D PLPs this 3-bit field indicates the RF frequency of the current PLP in the one after the next logical frame where the PLP occurs. The value shall be interpreted according to the parameter LC_CURRENT_FRAME_RF_IDX of L1-PRE. For LC types A, B and C this field shall be reserved for future use.

Figure 31:
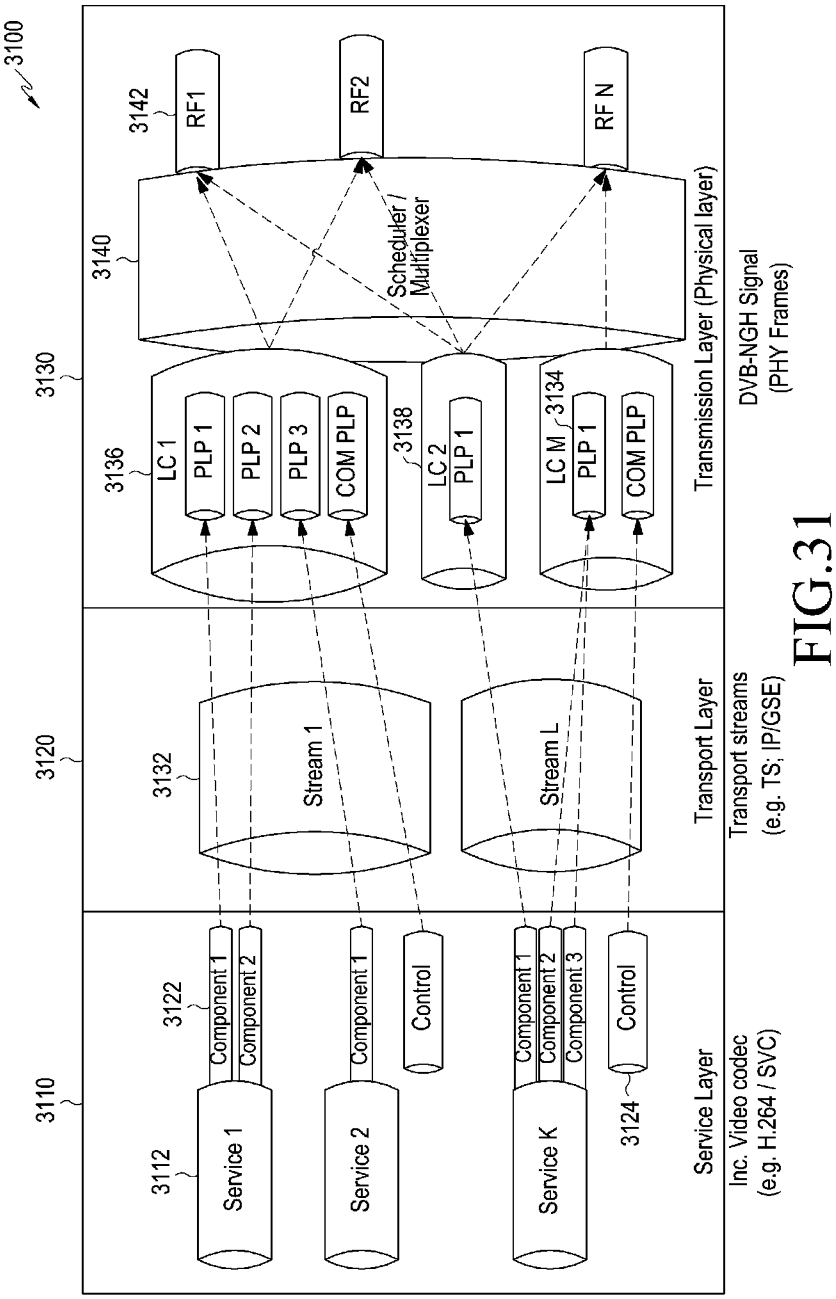
FIG. 31 illustrates a general overview on the stages for the transport of the data services in the delivery system according to some exemplary embodiments of the present invention.

FIG. 31 illustrates a general overview 3100 on the stages for the transport of the data services in the delivery system according to some exemplary embodiments of the present invention.

Referring now to FIG. 31, a first stage involves the mapping of the data services 3112 from the service layer 3110 to data PLPs 3132 in the transmission layer 3130 across the transport layer 3120. The various data services 3112 are split into component parts 3122 in the transport layer 3120 and mapped to PLPs 3132. Control data 3124 in the transport layer 3120 is also mapped to one or more common PLPs 3134 in the transmission layer 3130.

A second stage maps the PLPs 3132, 3134 onto the logical channels, for example a first LC (LC1) 3136 and a second LC (LC2) 3138, according to some exemplary embodiments of this invention.

A third stage provides the mapping of the logical channels 3136, 3138 on the physical frames at the different RF channels 3142 used by the delivery system via a scheduler/multiplexer function 3140, according to some exemplary embodiments of this invention.

Although some aspects of the invention have been described with reference to their applicability to a Digital Video Broadcasting Next Generation Handheld (DVB-NGH) system, it will be appreciated that the invention is not limited to this particular wireless broadcasting system. It is envisaged that the concept described above may be applied to any other wireless broadcasting and communication systems. Also, although some aspects of the invention have been described with reference to their applicability to a Digital Video Broadcasting Next Generation Handheld (DVB-NGH) system that 'piggy-backs' on to an existing DVB-T2 system, for example using the previously allocated further extension fields (FEF), it will be appreciated that the invention may equally be applied to a new stand-alone DVB-NGH (or similar) system.

With regard to the existing DVB-T2 system the aforementioned concepts describe (at least) one or more of the following novel features (in each of the receive side and transmit side by configuration and control, processing encoding or decoding of respective processors):

Concept of logical frame with fixed capacity in QAM cells and structure of the logical frame with L1-POST (logical signaling), common PLPs, data PLPs (of different types, in order), auxiliary streams, and dummy cells;

Concept of logical super-frame, where the configurable signaling remains constant within one logical super-frame, and other characteristics;

ISSY field (in-band type B) carried in every logical frame of the LC for synchronization purposes;

Concept of logical channel with bundling and slicing over the time and frequency domains and different logical channel types for mapping of the logical frames and logical super-frames onto the physical frames;

Concept of logical channel group, where all LC members of the group have their slots enough separated in time so that they can be received with one single tuner (e.g. so receiver can receive multiple LCs of the same LC group with one single tuner);

Optimized Layer 1 Signaling to Reflect all the Above Features.

Thus, the aforementioned example exemplary embodiments of the invention have described signal processors in both the transmit and receive side to facilitate each of the above new concepts and/or new data formats. The respective signal processors have been described with respect to the transmit or receive communication units, together with the associated methods of operation of the processors. These methods of operation may also be stored in executable code to be performed by any computer-based product.

Figure 32:
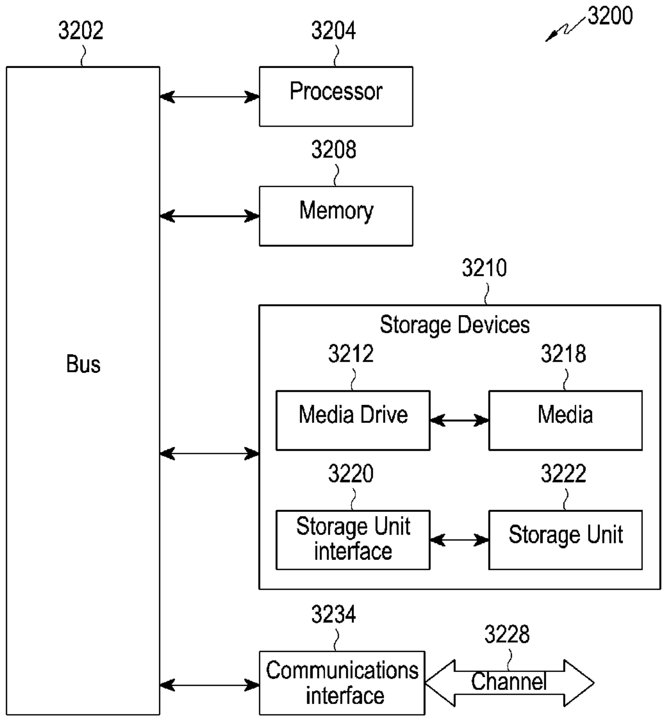
FIG. 32 illustrates a typical computing system that may be employed to implement signal processing functionality according to exemplary embodiments of the present invention.

FIG. 32 illustrates a typical computing system 3200 that may be employed to implement signal processing functionality according to exemplary embodiments of the present invention. Computing systems of this type may be used in access points and wireless communication units. Those skilled in the relevant art will also recognize how to implement the exemplary embodiments of the present invention using other computer systems or architectures.

Referring now to FIG. 32, Computing system 3200 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 3200 can include one or more processors, such as a processor 3204. Processor 3204 can be implemented using a general or special-purpose processing engine such as, for example, a microprocessor, microcontroller or other control module. In this example, processor 3204 is connected to a bus 3202 or other communications medium.

Computing system 3200 can also include a main memory 3208, such as Random Access Memory (RAM) or other dynamic memory, for storing information and instructions to be executed by processor 3204. Main memory 3208 also may be used for storing temporary variables or other intermediate information during execution of instructions to be executed by processor 3204. Computing system 3200 may likewise include a Read Only Memory (ROM) or other static storage device coupled to bus 3202 for storing static information and instructions for processor 3204.

The computing system 3200 may also include information storage system 3210, which may include, for example, a media drive 3212 and a removable storage interface 3220. The media drive 3212 may include a drive or other mechanism to support fixed or removable storage media, such as a hard disk drive, a floppy disk drive, a magnetic tape drive, an optical disk drive, a Compact Disc (CD) or Digital Video Drive (DVD) read or write drive (R or RW), or other removable or fixed media drive. Storage media 3218 may include, for example, a hard disk, floppy disk, magnetic tape, optical disk, CD or DVD, or other fixed or removable medium that is read by and written to by media drive 3212. As these examples illustrate, the storage media 3218 may include a computer-readable storage medium having particular computer software or data stored therein.

In alternative exemplary embodiments, information storage system 3210 may include other similar components for allowing computer programs or other instructions or data to be loaded into computing system 3200. Such components may include, for example, a removable storage unit 3222 and an interface 3220, such as a program cartridge and cartridge interface, a removable memory (for example, a flash memory or other removable memory module) and memory slot, and other removable storage units 3222 and interfaces 3220 that allow software and data to be transferred from the removable storage unit 3218 to computing system 3200.

Computing system 3200 can also include a communications interface 3224. Communications interface 3224 can be used to allow software and data to be transferred between computing system 3200 and external devices. Examples of communications interface 3224 can include a modem, a network interface (such as an Ethernet or other NIC card), a communications port (such as for example, a Universal Serial Bus (USB) port), a PCMCIA slot and card, etc. Software and data transferred via communications interface 3224 are in the form of signals which can be electronic, electromagnetic, and optical or other signals capable of being received by communications interface 3224. These signals are provided to communications interface 3224 via a channel 3228. This channel 3228 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 3208, storage device 1918, or storage unit 3222. These and other forms of computer-readable media may store one or more instructions for use by processor 3204, to cause the processor to perform specified operations. Such instructions, generally referred to as 'computer program code' (which may be grouped in the form of computer programs or other groupings), when executed, enable the computing system 3200 to perform functions of exemplary embodiments of the present invention. Note that the code may directly cause the processor to perform specified operations, be compiled to do so, and/or be combined with other software, hardware, and/or firmware elements (e.g., libraries for performing standard functions) to do so.

In an exemplary embodiment where the elements are implemented using software, the software may be stored in a computer-readable medium and loaded into computing system 3200 using, for example, removable storage drive 3222, drive 3212 or communications interface 3224. The control module (in this example, software instructions or computer program code), when executed by the processor 3204, causes the processor 3204 to perform the functions of the exemplary embodiments of the present invention as described herein.

In particular, it is envisaged that the aforementioned inventive concept can be applied by a semiconductor manufacturer to any integrated circuit comprising a signal processor configured to perform any of the aforementioned operations. Furthermore, the inventive concept can be applied to any circuit that is able to configure, process, encode and/or decode signals for wireless distribution. It is further envisaged that, for example, a semiconductor manufacturer may employ the inventive concept in a design of a stand-alone device, such as a digital signal processor, or Application-Specific Integrated Circuit (ASIC) and/or any other sub-system element.

It will be appreciated that, for clarity purposes, the above description has described exemplary embodiments of the invention with reference to different functional units and processors. However, it will be apparent that any suitable distribution of functionality between different functional units or processors, for example with respect to the signal processor 1250, 1252, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. Aspects of the invention may optionally be implemented, at least partly, as computer software running on one or more data processors and/or digital signal processors or configurable module components such as FPGA devices. Thus, the elements and components of an exemplary embodiment of the invention may be physically, functionally and logically implemented in any suitable way. Indeed, the functionality may be implemented in a single unit, in a plurality of units or as part of other functional units.

Although the present invention has been described in connection with some exemplary embodiments, it is not intended to be limited to the specific form set forth herein. Rather, the scope of the present invention is limited only by the accompanying claims. Additionally, although a feature may appear to be described in connection with particular exemplary embodiments, one skilled in the art would recognize that various features of the described exemplary embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Thus, signal processors, communication units, a communication system and methods relating to transmission and reception of data streams in digital video broadcast systems have been described, wherein the aforementioned disadvantages with prior art arrangements have been substantially alleviated.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data in a communication system, the method comprising:

determining, by a transmitting apparatus, a type from a plurality of types indicating a mapping relation between at least one logical channel and at least one Radio Frequency (RF) channel; and transmitting, by the transmitting apparatus, at least one logical frame of the determined type on at least one RF channel mapped to the at least one logical frame based on the determined type.

2. The method of claim 1, wherein if the determined type is a first type, each of logical frames included in a logical channel of the first type is mapped to a sequence of physical frames on a single RF channel.

3. The method of claim 2, wherein all cells included in each of the logical frames, is carried in a single physical frame on the single RF channel.

4. The method of claim 1, wherein the mapping relation comprises a plurality of types, the types is divided based on a number of RF channels or a number of physical frames mapped to each logical frame included the logical channel.

5. The method of claim 1, wherein the one logical frame may be time-multiplexed into two or more physical frames.

6. The method of claim 5, wherein if the determined type is a second type, each of logical frames included in a logical channel of the second type is mapped to a plurality of physical frames on a single RF channel, and wherein each of the plurality of physical frames is the same length.

7. The method of claim 5, wherein each of the plurality of physical frames of the second type comprises at least one of cells from multiple logical frames included in a logical channel of the second type, a same pre-signaling field(L1-PRE), an L1_POST_DELTA, LC_NEXT_FRAME_RF_IDX, LC_CURRENT_FRAME_POSITION, LC_CURRENT_FRAME_RF_IDX, and FRAME_IDX.

8. The method of claim 5, wherein if the determined type is a third type, each logical frame in included logical channels of the third type is mapped to a plurality of physical frames on a plurality of RF channels.

9. The method of claim 8, wherein a length of each of the plurality of physical frames is the same, each of the plurality of the physical frames comprises cells from the multiple logical frames or a same pre-signaling field(L1-PRE).

10. The method of claim 1, wherein if the determined type is a fourth type, each of logical frames included in a logical channel of the fourth type is mapped to each physical frame included in each of multiple physical channels.

11. The transmitter of claim of claim 1, wherein the one logical frame may be time-multiplexed into two or more physical frames.

12. The transmitter of claim 11, wherein if the determined type is a second type, each of logical frames included in a logical channel of the second type is mapped to a plurality of physical frames on a single RF channel, and wherein each of the plurality of physical frames is the same length.

13. The transmitter of claim 11, wherein each of the plurality of physical frames of the second type comprises at least one of cells from multiple logical frames included in a logical channel of the second type, a same pre-signaling field(L1-PRE), an L1_POST_DELTA, LC_NEXT_FRAME_RF_IDX, LC_CURRENT_FRAME_POSITION, LC_CURRENT_FRAME_RF_IDX, and FRAME_IDX.

14. The transmitter of claim 11, wherein if the determined type is a third type, each logical frame in included logical channels of the third type is mapped to a plurality of physical frames on a plurality of RF channels.

15. The transmitter of claim 14, wherein a length of each of the plurality of physical frames is same, each of the plurality of the physical frames comprises cells from the multiple logical frames or a same pre-signaling field (L1-PRE).

16. A transmitter for transmitting data in a communication system, wherein the transmitter is arranged to:

determine a type from a plurality of types indicating a mapping relation between at least one logical channel and at least one Radio Frequency (RF) channel; and transmit at least one logical frame of the determined type on at least one RF channel mapped to the at least one logical frame based on the determined type.

17. The transmitter of claim 16, wherein if the determined type is a first type, each of logical frames included in a logical channel of the first type is mapped to a sequence of physical frames on a single RF channel.

18. The transmitter of claim 17, wherein all cells included in each of the logical frames, is carried in a single physical frame on the single RF channel.

19. The transmitter of claim 16, wherein the mapping relation comprises a plurality of types, the types is divided based on a number of RF channels or a number of physical frames mapped to each logical frame included the logical channel.

20. The transmitter of claim 16, wherein if the determined type is a fourth type, each of logical frames included in a logical channel of the fourth type is mapped to each physical frame included in each of multiple physical channels.

* * * * *